(12) United States Patent
Nurijanyan

(10) Patent No.: US 10,271,057 B2
(45) Date of Patent: Apr. 23, 2019

(54) SYSTEM AND METHODS FOR IMAGE/VIDEO COMPRESSION

(71) Applicant: Vahagn Nurijanyan, North York (CA)

(72) Inventor: Vahagn Nurijanyan, North York (CA)

( * ) Notice: Subject to any disclaimer, the term of this patent is extended or adjusted under 35 U.S.C. 154(b) by 162 days.

(21) Appl. No.: 14/533,040

(22) Filed: Nov. 4, 2014

(65) Prior Publication Data

US 2016/0127734 A1 May 5, 2016

(51) Int. Cl.
*H04N 19/186* (2014.01)
*G06T 9/00* (2006.01)
*H04N 19/174* (2014.01)

(52) U.S. Cl.
CPC ............ *H04N 19/186* (2014.11); *G06T 9/00* (2013.01); *H04N 19/174* (2014.11)

(58) Field of Classification Search
CPC combination set(s) only.
See application file for complete search history.

(56) References Cited

U.S. PATENT DOCUMENTS

| | | | | |
|---|---|---|---|---|
| 5,264,848 A * | 11/1993 | McGuffin | ................ | H03M 7/30 341/51 |
| 5,559,557 A * | 9/1996 | Kato | .................... | H04N 19/159 375/240.03 |
| 6,008,847 A * | 12/1999 | Bauchspies | ............. | H03M 7/42 375/240.01 |
| 6,983,051 B1 * | 1/2006 | Rhoads | ............. | G06Q 20/1235 380/252 |
| 7,515,762 B2 * | 4/2009 | Suzuki | ................. | H04N 19/172 382/246 |
| 7,885,988 B2 * | 2/2011 | Bashyam | ................ | H03M 7/30 707/812 |
| 8,254,708 B2 * | 8/2012 | Shimauchi | ........... | H04N 19/176 382/239 |
| 9,667,839 B2 * | 5/2017 | Chang | .................... | H04N 1/648 |
| 2005/0141747 A1 * | 6/2005 | Shi | ........................ | G06T 1/0028 382/100 |
| 2005/0226518 A1 * | 10/2005 | Suzuki | ................. | H04N 19/172 382/246 |
| 2005/0232504 A1 * | 10/2005 | Suzuki | ................. | H04N 19/176 382/246 |

(Continued)

*Primary Examiner* — Anand P Bhatnagar
(74) *Attorney, Agent, or Firm* — Heer Law; Christopher D. Heer

(57) ABSTRACT

The present invention relates to system, methods and computer programs for image/video encoding and compression suitable for various image/video types as indexed-color, grayscale and true color (red, green, blue (RGB) and cyan, magenta, yellow, black (CMYK image)) images/video of any bit depth. More particularly, the invention consists of dividing the image/video into plurality of partitions and encoding and compressing each image partition; image partition lines or video stream separately to provide plurality of compressed units.

The invention is referring to regularities found in the structure of (grayscale and) color images: the regularities are found for the encoded stream(s) by the empiric way, analyzing statistical data of the encoded streams. It becomes possible to exploit the regularities (natural properties) of the image/video and make compression rate more efficient. Besides increasing lossless or lossy compression rate, they can be used for photo correction (for having more accurate images).

20 Claims, 37 Drawing Sheets

(56) References Cited

U.S. PATENT DOCUMENTS

| | | | | |
|---|---|---|---|---|
| 2008/0050025 A1* | 2/2008 | Bashyam | ................ | G06T 9/002 382/238 |
| 2008/0095453 A1* | 4/2008 | Suzuki | ................ | H04N 19/172 382/246 |
| 2008/0247462 A1* | 10/2008 | Demos | ................ | H04N 19/597 375/240.03 |
| 2015/0358646 A1* | 12/2015 | Mertens | ............... | H04N 1/6058 382/166 |

* cited by examiner

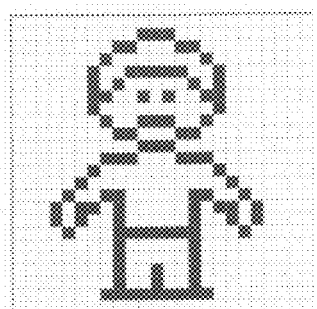
FIG. 1 Screen
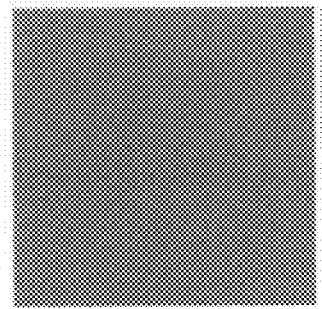
FIG. 2.1 The Screen
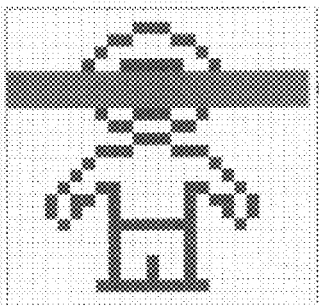
FIG. 2.2 Slice of the Screen
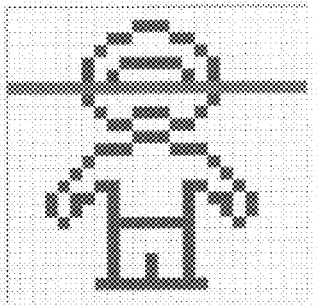
FIG. 2.3 The Screen Line
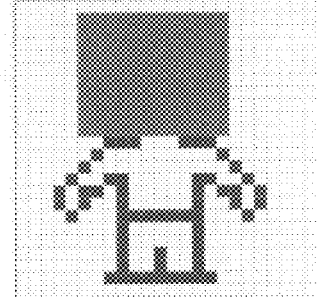
FIG. 2.4 Rectangle of the Screen
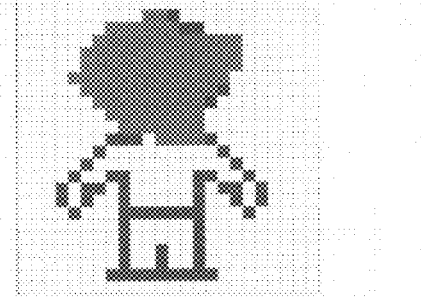
FIG. 2.5 Any Area of the Screen
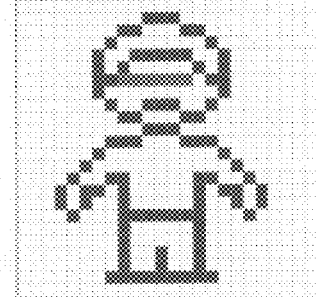
FIG. 2.6 Any Line of the Screen
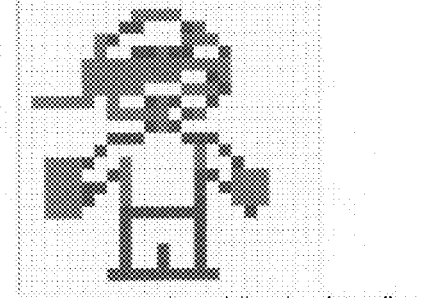
FIG. 2.7 Any Set of Pixels of the Screen
FIG. 2 Image Partitions or Video Streams (which are Reflections of Video Partitions on the Screen) of Different Shape

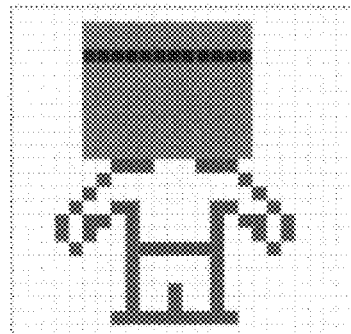
FIG. 3.1 Image Stream '2'
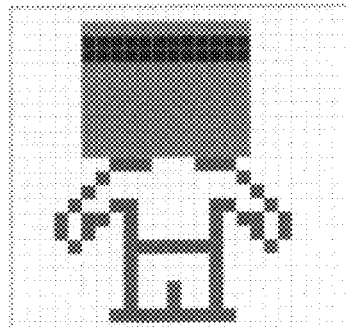
FIG. 3.2 Neighboring Image Streams '1' and '2'
FIG. 3 Image Streams (Black Selections)
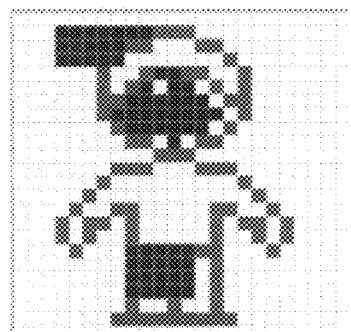
FIG. 4.1 Video Stream
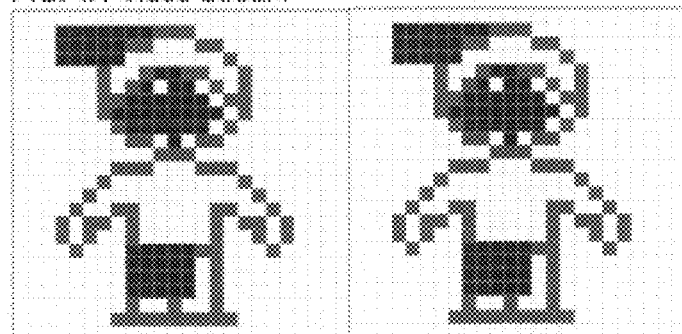
FIG. 4.2 Neighboring Video Frames/Streams 'i-1' and 'i' (having similar shapes)
FIG. 4 Video Streams (Black Selections)

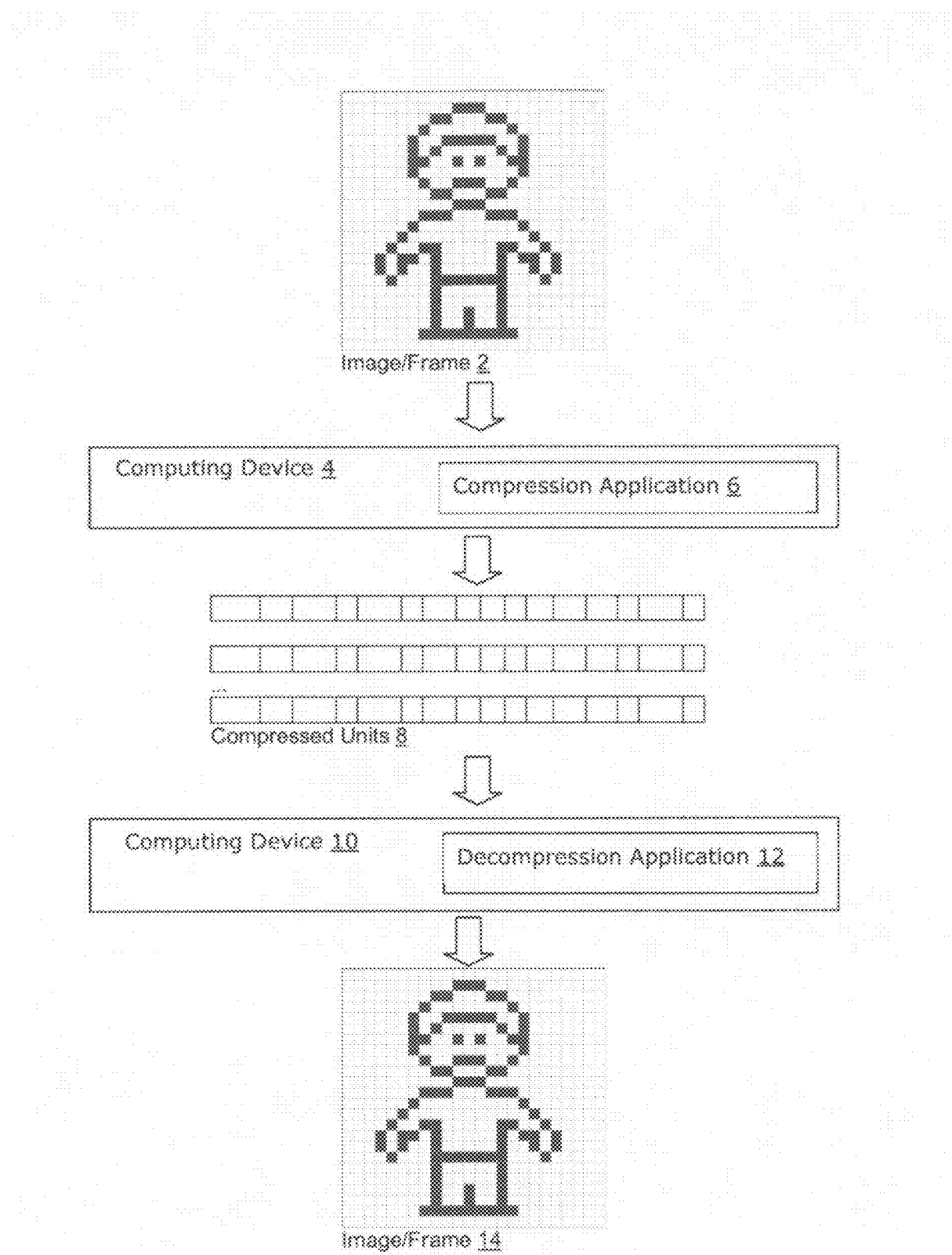
FIG. 5 Compression/Decompression System 0

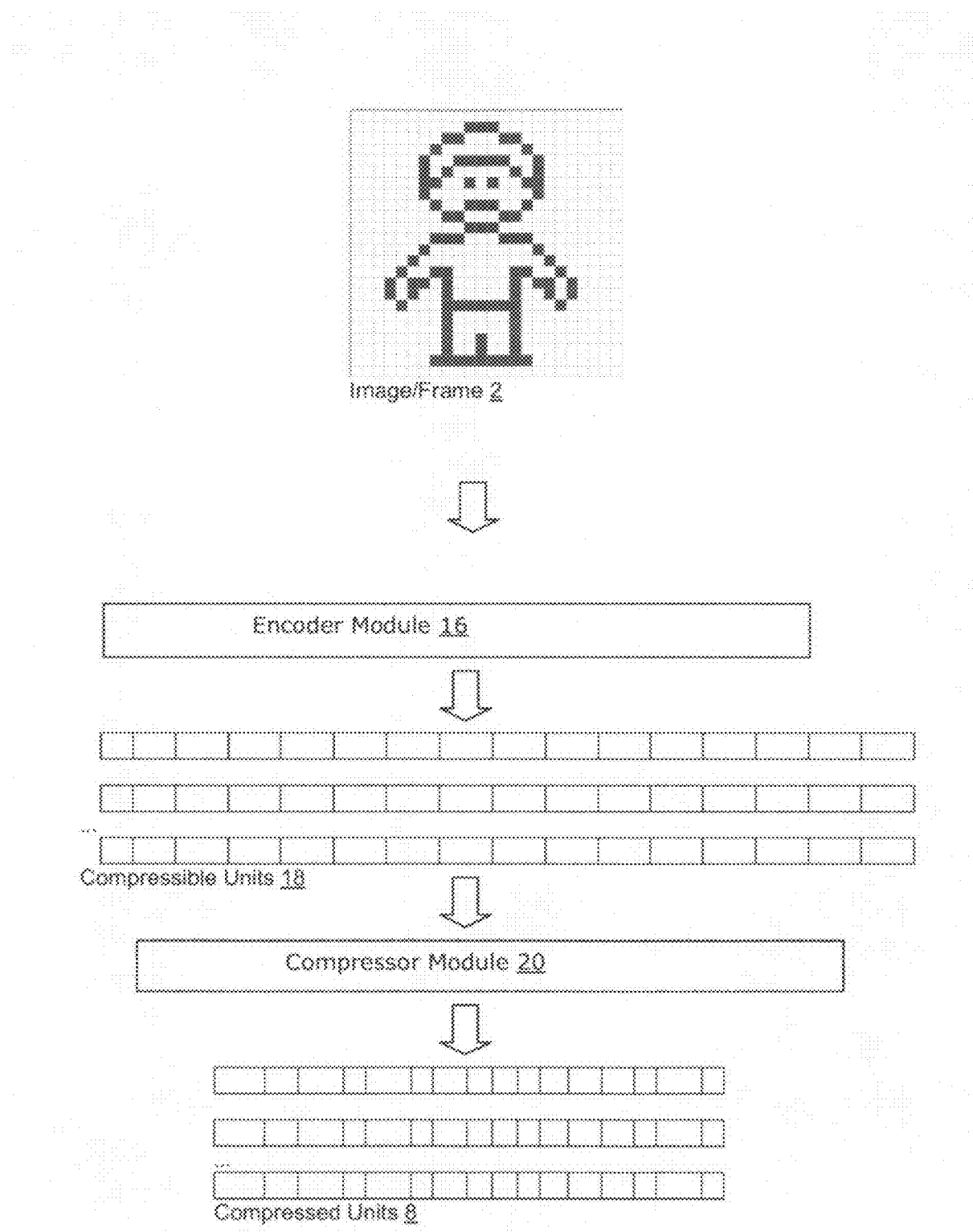
FIG. 6 Compression Application 6

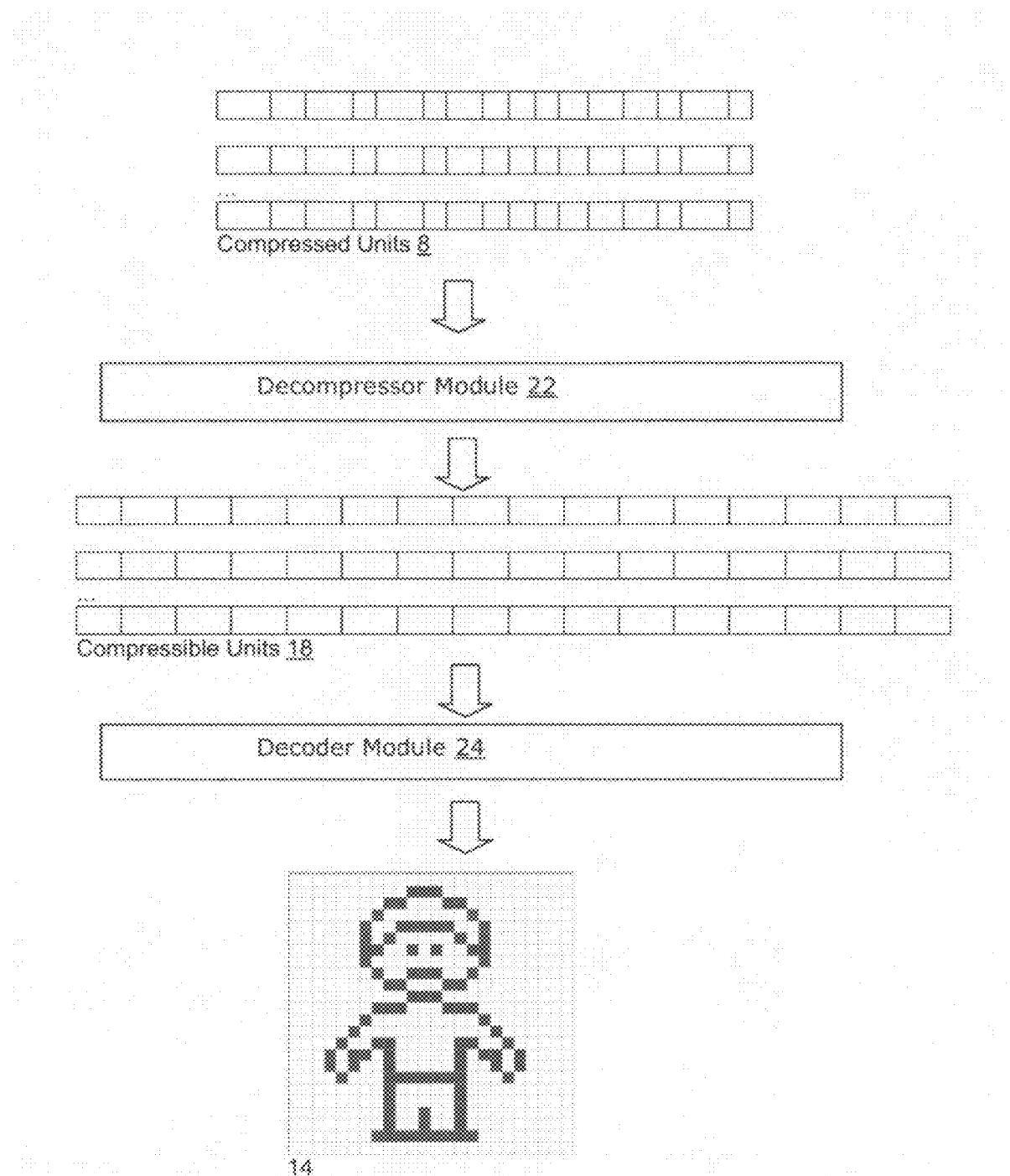
FIG. 7 Decompression Application 12

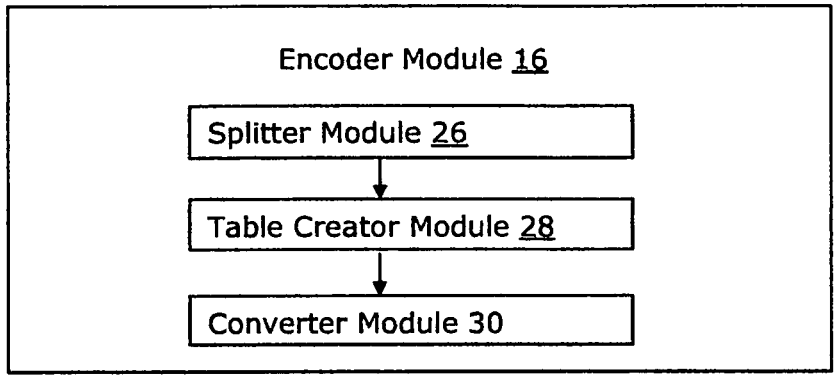
FIG. 8 Encoder Module 16
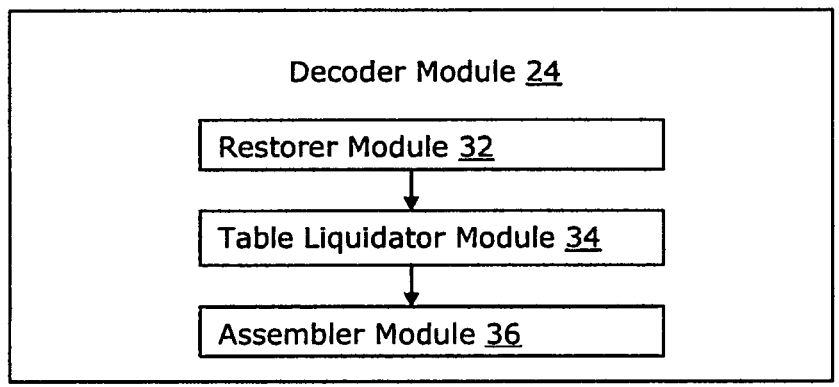
FIG. 9 Decoder Module 24
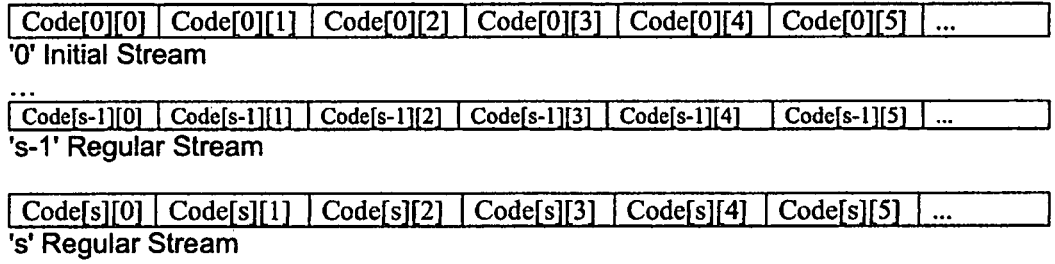
FIG. 10     Streams 38 of the Partition

| {255,0,128} | {255,255,255} | {0,0,0} | {128,128,64} | {10,64,100} | {64,128,128} | {100,10,1} |

Original Palette Table 42

| \Palette Table | {255,0,128} | {255,255,255} | {0,0,0} | {128,128,64} | {10,64,100} | {64,128,128} | {100,10,1} |
|---|---|---|---|---|---|---|---|
| SortValue({255,0,128}, color_i) | 0 | 81154 | 81409 | 36609 | 64905 | 52865 | 40354 |
| SortValue({255,255,255}, color_i) | 81154 | 0 | 195075 | 68739 | 120531 | 68739 | 148566 |
| SortValue({0,0,0}, color_i) | 81409 | 195075 | 0 | 36864 | 14196 | 36864 | 10101 |
| SortValue({128,128,64}, color_i) | 36609 | 68739 | 36864 | 0 | 19316 | 8192 | 18677 |
| SortValue({10,64,100}, color_i) | 64905 | 120531 | 14196 | 19316 | 0 | 7796 | 20817 |
| SortValue({64,128,128}, color_i) | 52865 | 68739 | 5664 | 8192 | 7796 | 0 | 31349 |
| SortValue({100,10,1}, color_i) | 40354 | 148566 | 10101 | 18677 | 20817 | 31349 | 0 |

Sort Values 44

| {255,0,128} | {128,128,64} | {100,10,1} | {64,128,128} | {10,64,100} | {255,255,255} | {0,0,0} |
| {255,255,255} | {128,128,64} | {64,128,128} | {255,0,128} | {10,64,100} | {100,10,1} | {0,0,0} |
| {0,0,0} | {100,10,1} | {10,64,100} | {128,128,64} | {64,128,128} | {255,0,128} | {255,255,255} |
| {128,128,64} | {64,128,128} | {100,10,1} | {10,64,100} | {255,0,128} | {0,0,0} | {255,255,255} |
| {10,64,100} | {64,128,128} | {0,0,0} | {128,128,64} | {100,10,1} | {255,0,128} | {255,255,255} |
| {64,128,128} | {0,0,0} | {10,64,100} | {128,128,64} | {100,10,1} | {255,0,128} | {255,255,255} |
| {100,10,1} | {0,0,0} | {128,128,64} | {10,64,100} | {64,128,128} | {255,0,128} | {255,255,255} |

Rearranged Palette Tables 46

| DecoderTable[0] | 0 | 3 | 6 | 5 | 4 | 1 | 2 |
| DecoderTable[1] | 1 | 3 | 5 | 0 | 4 | 6 | 2 |
| DecoderTable[2] | 2 | 6 | 4 | 3 | 5 | 0 | 1 |
| DecoderTable[3] | 3 | 5 | 6 | 4 | 0 | 2 | 1 |
| DecoderTable[4] | 4 | 5 | 2 | 3 | 6 | 0 | 1 |
| DecoderTable[5] | 5 | 2 | 4 | 3 | 6 | 0 | 1 |
| DecoderTable[6] | 6 | 2 | 3 | 4 | 5 | 0 | 1 |

Decoder Tables 48

| EncoderTable[0] | 0 | 5 | 6 | 1 | 4 | 3 | 2 |
| EncoderTable[1] | 3 | 0 | 6 | 1 | 4 | 2 | 5 |
| EncoderTable[2] | 5 | 6 | 0 | 3 | 2 | 4 | 1 |
| EncoderTable[3] | 4 | 6 | 5 | 0 | 3 | 1 | 2 |
| EncoderTable[4] | 5 | 6 | 2 | 3 | 0 | 1 | 4 |
| EncoderTable[5] | 5 | 6 | 1 | 3 | 2 | 0 | 4 |
| EncoderTable[6] | 5 | 6 | 1 | 2 | 3 | 4 | 0 |

Encoder Tables 50

FIG. 11  1-dimensional arrangements of indexed-color palette table 40

| {255,0,128} | {255,255,255} | {0,0,0} | {128,128,64} | {10,64,100} | {64,128,128} | {100,10,1} |
|---|---|---|---|---|---|---|

Original Palette Table 42

| \Palette Table | {255,0,128} | {255,255,255} | {0,0,0} | {128,128,64} | {10,64,100} | {64,128,128} | {100,10,1} |
|---|---|---|---|---|---|---|---|
| SortValue({255,0,128}, {255,0,128},color_i) | 2*0= 0 | 2*81154= 162308 | 2*81409= 162818 | 2*36609= 73218 | 2*64905= 129810 | 2*52865= 105730 | 2*40354= 80708 |
| SortValue({255,0,128}, {255,255,255},color_i) | 0+81154= 81154 | 81154+0= 81154 | 81409+ 195075= 276484 | 36609+68739= 105348 | 64905+ 120531= 185436 | 52865+68739= 121604 | 40354+ 148566= 188920 |
| SortValue({255,0,128}, {0,0,0},color_i) | 0+81409= 81409 | 81154+195075= 276229 | 81409+0= 81409 | 36609+36864= 73473 | 64905+ 14196= 79101 | 52865+36864= 89729 | 40354+ 10101= 50455 |
| SortValue({255,0,128}, {128,128,64},color_i) | 0+36609= 36609 | 81154+68739= 149893 | 81409+ 36864= 118273 | 36609+0= 36609 | 64905+19316= 84221 | 52865+8192= 61057 | 40354+ 18677= 59031 |
| SortValue({255,0,128}, {10,64,100},color_i) | 0+64905= 64905 | 81154+120531= 201685 | 81409+ 14196= 95605 | 36609+19316= 55925 | 64905+0= 64905 | 52865+7796= 60661 | 40354+ 20817= 61171 |
| SortValue({255,0,128}, {64,128,128},color_i) | 0+52865= 52865 | 81154+68739= 149893 | 81409+ 5664= 87073 | 36609+8192= 44801 | 64905+7796= 72701 | 52865+0= 52865 | 40354+ 31349= 71703 |
| SortValue({255,0,128}, {100,10,1},color_i) | 0+40354= 40354 | 81154+148566= 229720 | 81409+ 10101= 91510 | 36609+18677= 55286 | 64905+20817= 85722 | 52865+31349= 84214 | 40354+0= 40354 |
| ... | ... | ... | ... | ... | ... | ... | ... |

Sort Values 54

| {255,0,128} | {128,128,64} | {100,10,1} | {64,128,128} | {10,64,100} | {255,255,255} | {0,0,0} |
|---|---|---|---|---|---|---|
| {255,0,128} | {255,255,255} | {128,128,64} | {64,128,128} | {10,64,100} | {100,10,1} | {0,0,0} |
| {100,10,1} | {128,128,64} | {10,64,100} | {255,0,128} | {0,0,0} | {64,128,128} | {255,255,255} |
| {255,0,128} | {128,128,64} | {100,10,1} | {64,128,128} | {10,64,100} | {0,0,0} | {255,255,255} |
| {128,128,64} | {64,128,128} | {100,10,1} | {255,0,128} | {10,64,100} | {0,0,0} | {255,255,255} |
| {128,128,64} | {255,0,128} | {64,128,128} | {100,10,1} | {10,64,100} | {0,0,0} | {255,255,255} |
| {255,0,128} | {100,10,1} | {128,128,64} | {64,128,128} | {10,64,100} | {0,0,0} | {255,255,255} |
| ... | ... | ... | ... | ... | ... | ... |

Rearranged Palette Tables 56

| DecoderTable[0,0] | 0 | 3 | 6 | 5 | 4 | 1 | 2 |
|---|---|---|---|---|---|---|---|
| DecoderTable[0,1] | 0 | 1 | 3 | 5 | 4 | 6 | 2 |
| DecoderTable[0,2] | 6 | 3 | 4 | 0 | 2 | 5 | 1 |
| DecoderTable[0,3] | 0 | 3 | 6 | 5 | 4 | 2 | 1 |
| DecoderTable[0,4] | 3 | 5 | 6 | 0 | 4 | 2 | 1 |
| DecoderTable[0,5] | 3 | 0 | 5 | 6 | 4 | 2 | 1 |
| DecoderTable[0,6] | 0 | 6 | 3 | 5 | 4 | 2 | 1 |
| ... | ... | ... | ... | ... | ... | ... | ... |

Decoder Tables 58

| EncoderTable[0,0] | 0 | 5 | 6 | 1 | 4 | 3 | 2 |
|---|---|---|---|---|---|---|---|
| EncoderTable[0,1] | 0 | 1 | 6 | 2 | 4 | 3 | 5 |
| EncoderTable[0,2] | 3 | 6 | 4 | 1 | 2 | 5 | 0 |
| EncoderTable[0,3] | 0 | 6 | 5 | 1 | 4 | 3 | 2 |
| EncoderTable[0,4] | 3 | 6 | 5 | 0 | 4 | 1 | 2 |
| EncoderTable[0,5] | 1 | 6 | 5 | 0 | 4 | 2 | 3 |
| EncoderTable[0,6] | 0 | 6 | 5 | 2 | 4 | 3 | 1 |
| ... | ... | ... | ... | ... | ... | ... | ... |

Encoder Tables 60

FIG. 12    2-dimensional arrangements of indexed-color palette table 52

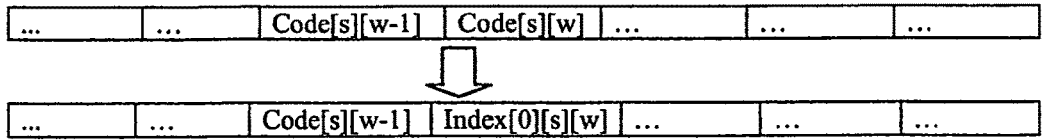
Index[0][s][w]=EncoderTable[Code[s][w-1]][Code[s][w]]
FIG. 13.1 Encoding
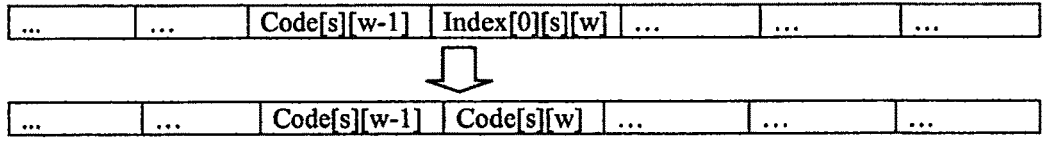
Code[s][w]=DecoderTable[Code[s][w-1]][Index[0][s][w]]
FIG. 13.2 Decoding
FIG. 13   Horizontal Indexing Encoding/Decoding of Code 62
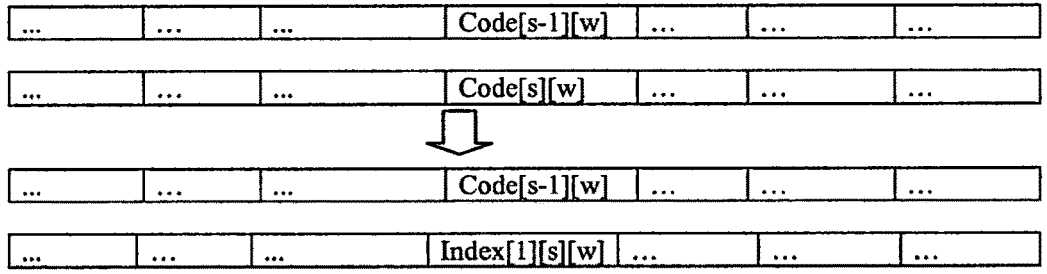
Index[1][s][w]=EncoderTable[Code[s-1][w]][Code[s][w]]
FIG. 14.1 Encoding
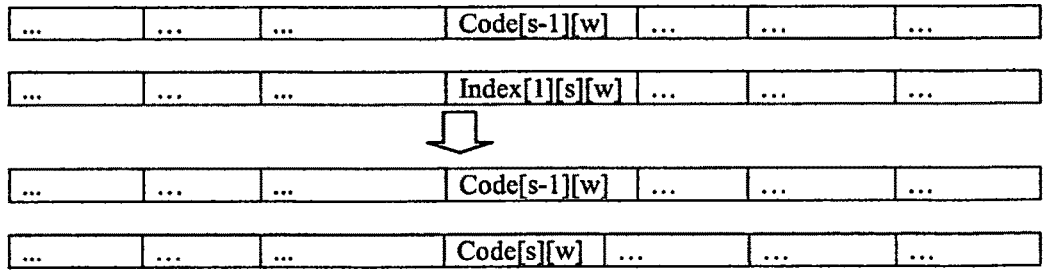
Code[s][w]=DecoderTable[Code[s-1][w]][Index[1][s][w]]
FIG. 14.2 Decoding
FIG. 14   Vertical Indexing Encoding/Decoding of Code 64

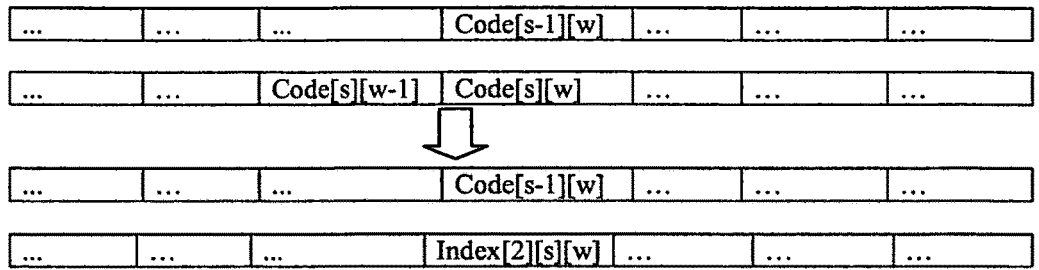

Index[2][s][w]=EncoderTable[Code[s][w-1],Code[s-1][w]][Code[s][w]]

FIG. 15.1 Encoding

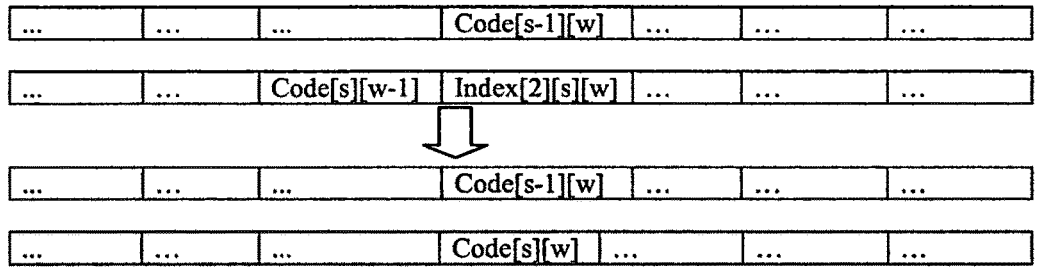

Code[s][w]=DecoderTable[Code[s][w-1],Code[h-1][w]][Index[2][s][w]]

FIG. 15.2 Decoding

FIG. 15 Triangular Singular Encoding/Decoding of Code 66

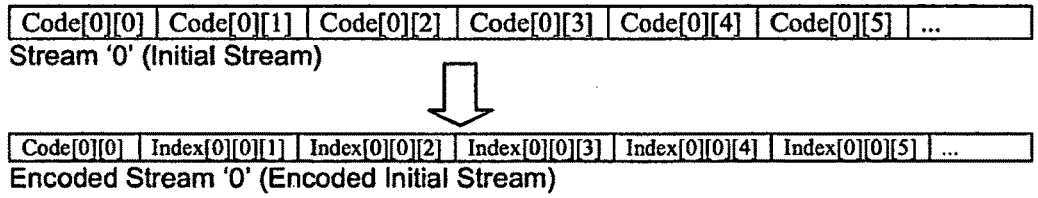

FIG. 16.1 Common Illustration

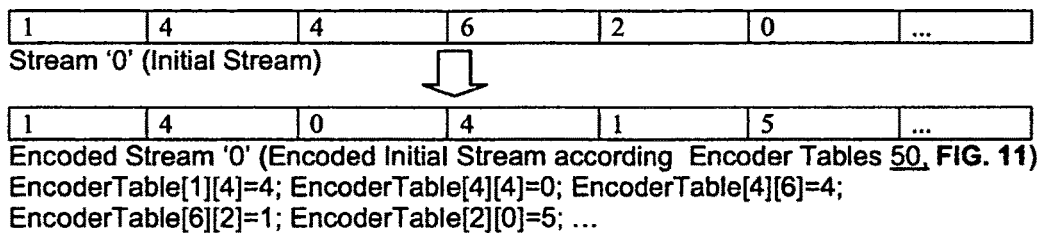

Encoded Stream '0' (Encoded Initial Stream according Encoder Tables 50, FIG. 11)
EncoderTable[1][4]=4; EncoderTable[4][4]=0; EncoderTable[4][6]=4;
EncoderTable[6][2]=1; EncoderTable[2][0]=5; ...

FIG. 16.2 Sample

FIG. 16 Encoding Initial Indexed-Color Stream

| Code[s-1][0] | Code[s-1][1] | Code[s-1][2] | Code[s-1][3] | Code[s-1][4] | Code[s-1][5] | ... |

Stream 's-1' (Initial/Regular Stream)

| Code[s][0] | Code[s][1] | Code[s][2] | Code[s][3] | Code[s][4] | Code[s][5] | ... |

Stream 's' (Regular Stream)

Streams 38

| Index[1][s][0] | Index[m1][s][1] | Index[m2][s][2] | Index[m3][s][3] | Index[m4][s][4] | Index[m5][s][5] | ... |

Encoded Stream 's' (Encoded Regular Stream)

FIG. 17    Encoding Regular Indexed-Color Stream

| 128 | 120 | 200 | 120 |
|---|---|---|---|
| 64 | 2 | 255 | 200 |
| 170 | 170 | 8 | 5 |

Codes of Image Partition/Video Stream 70

| 2 | 5 | 8 | 64 | 120 | 128 | 170 | 200 | 255 |

Palette Table 68

| 5 | 4 | 7 | 4 |
|---|---|---|---|
| 3 | 0 | 8 | 7 |
| 6 | 6 | 2 | 1 |

FIG. 18    Creation and Usage of the Palette Table

| ... | ... | Code[s-1][w-1] | Code[s-1][w] | ... | ... | ... |

Stream 's-1'

| ... | ... | Code[s][w-1] | Code[s][w] | ... | ... | ... |

Stream 's'

Streams 70

FIG. 19    Procodes 72

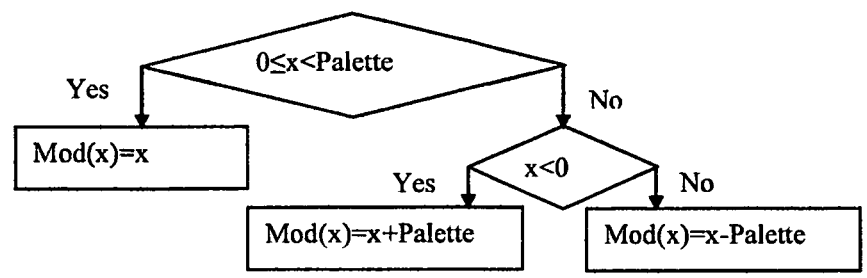
FIG. 20   Algorithm of Calculating Mod(x)
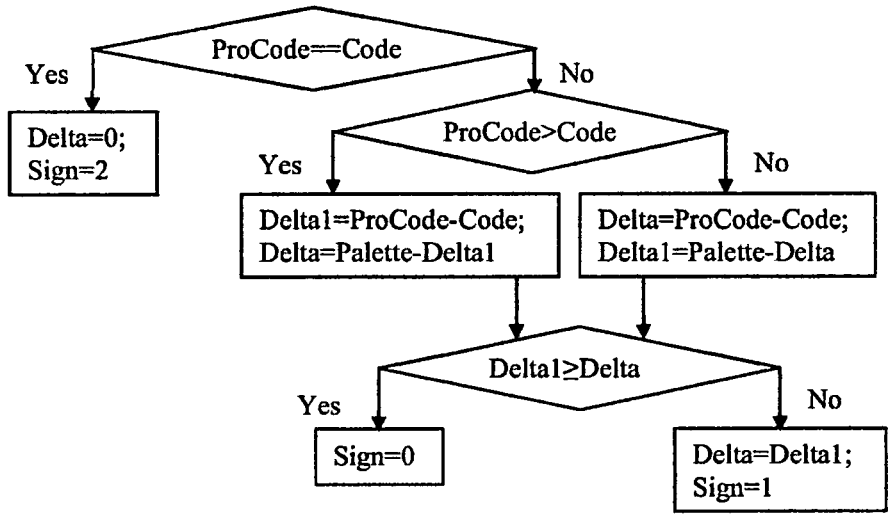
FIG. 21   EncodeCode Algorithm 74

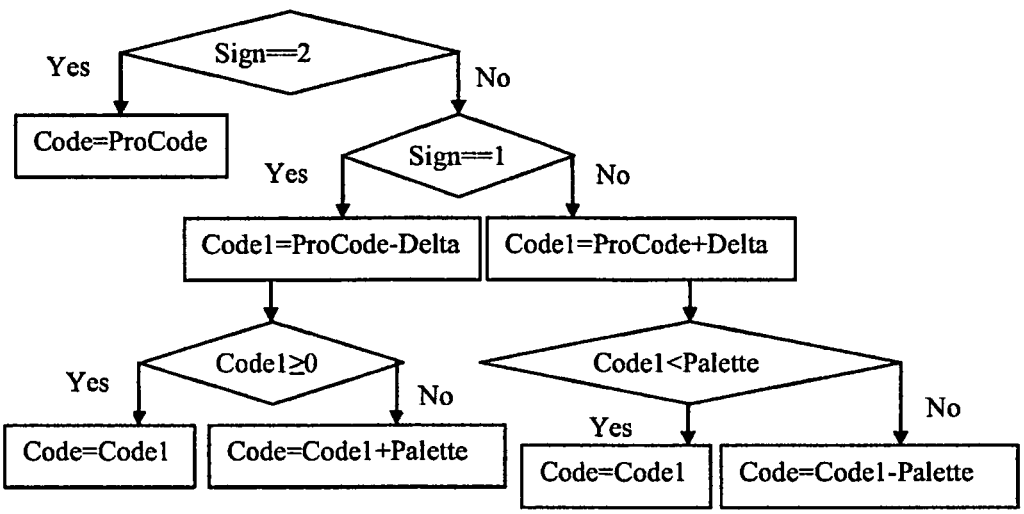
FIG. 22.1
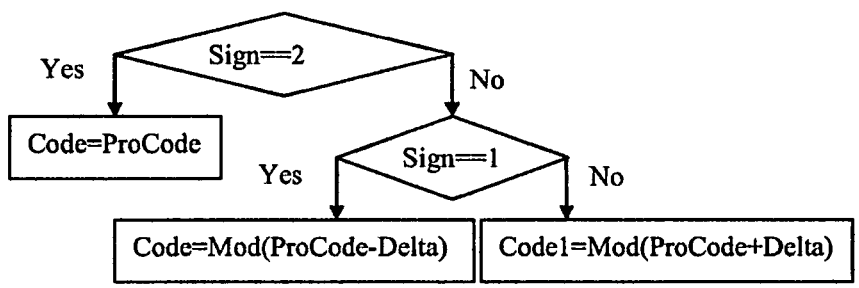
FIG. 22.2
FIG. 22 DecodeCode Algorithm 76
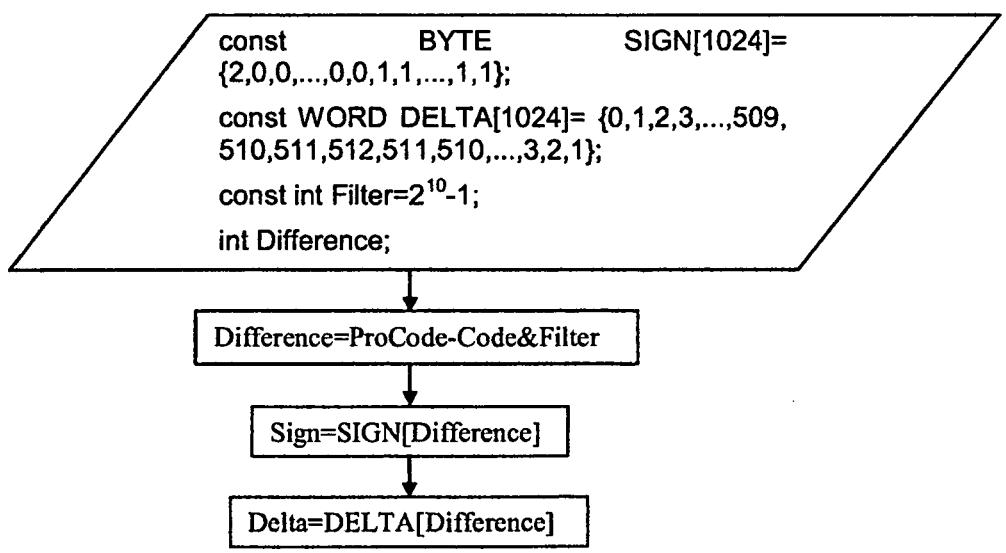
FIG. 23 Sample of EncodeCodeAbs for 10-Bit Depth

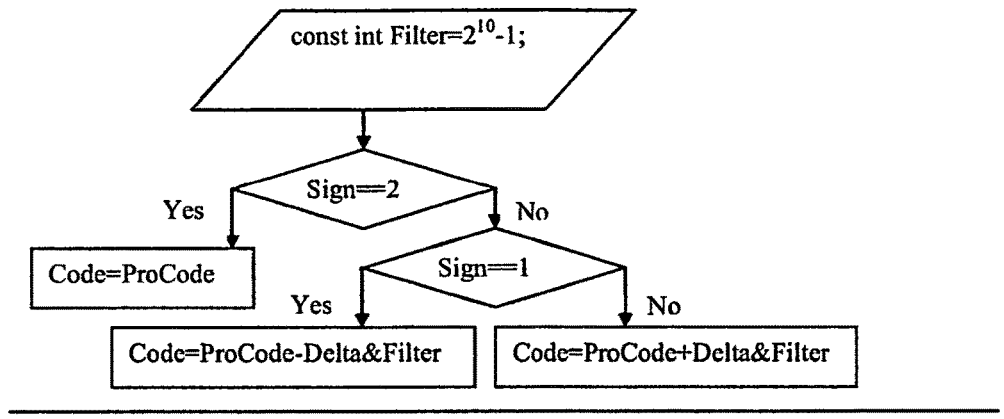
FIG. 24 Sample of DecodeCodeAbs for 10-Bit Depth
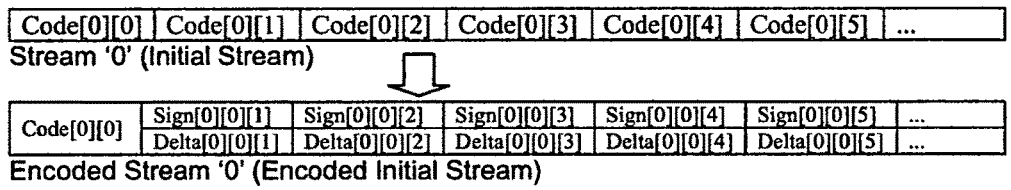
FIG. 25 Encoding Initial Grayscale Stream
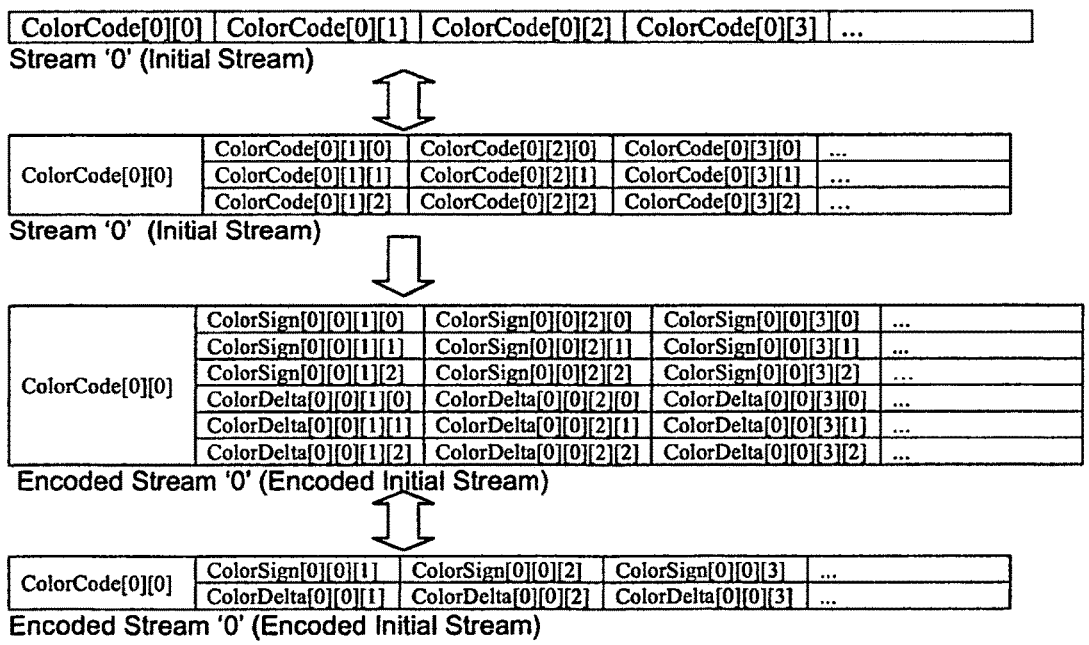
FIG. 26 Encoding Initial True-Color (RGB) Stream

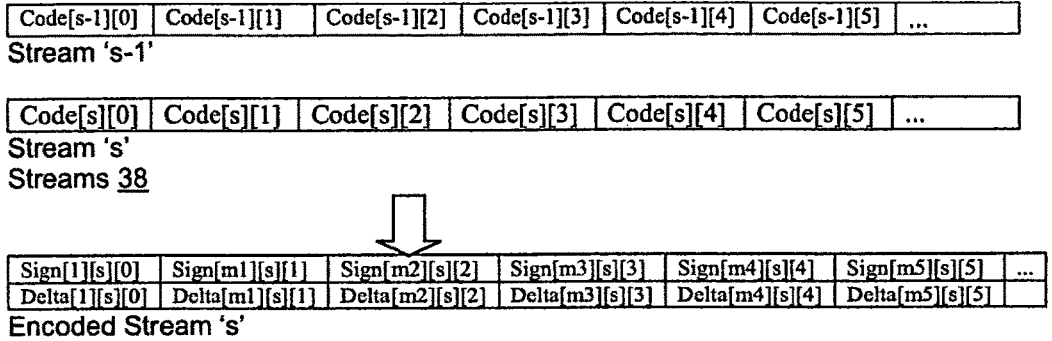
FIG. 27    Encoding Regular Grayscale Stream
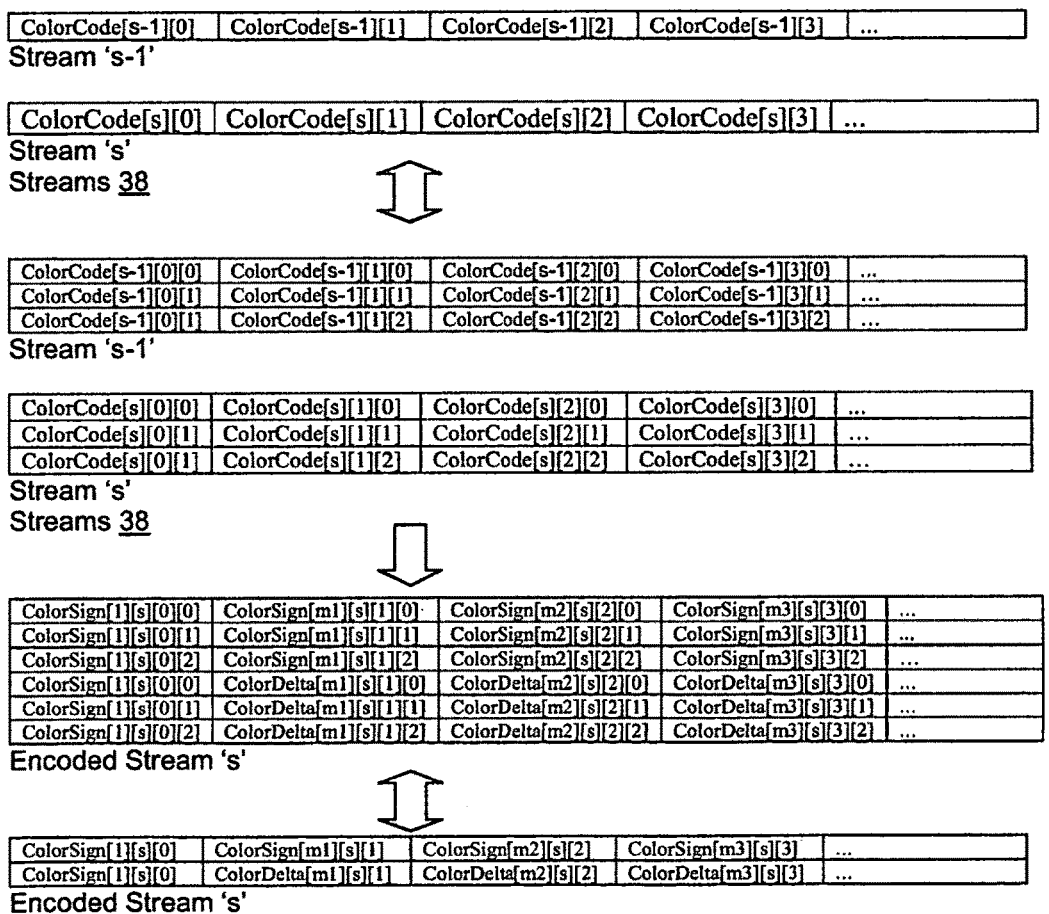
FIG. 28    Encoding Regular True-Color (RGB) Stream

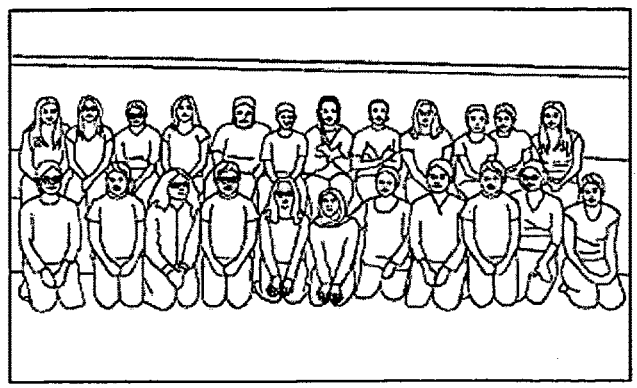
FIG. 29 Portrait True-Color Image
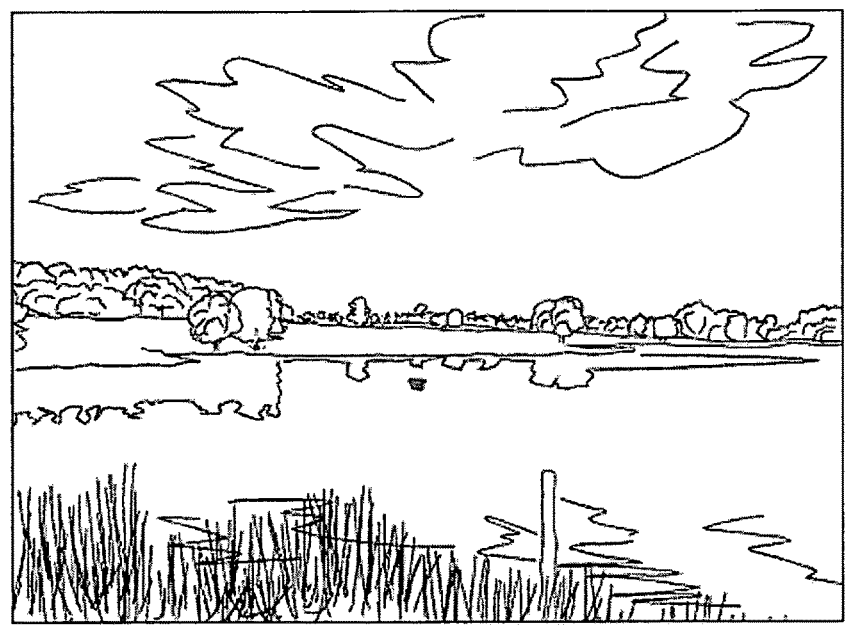
2. FIG. 30 Landscape True-Color Image
FIG. 31 Lena Grayscale Image

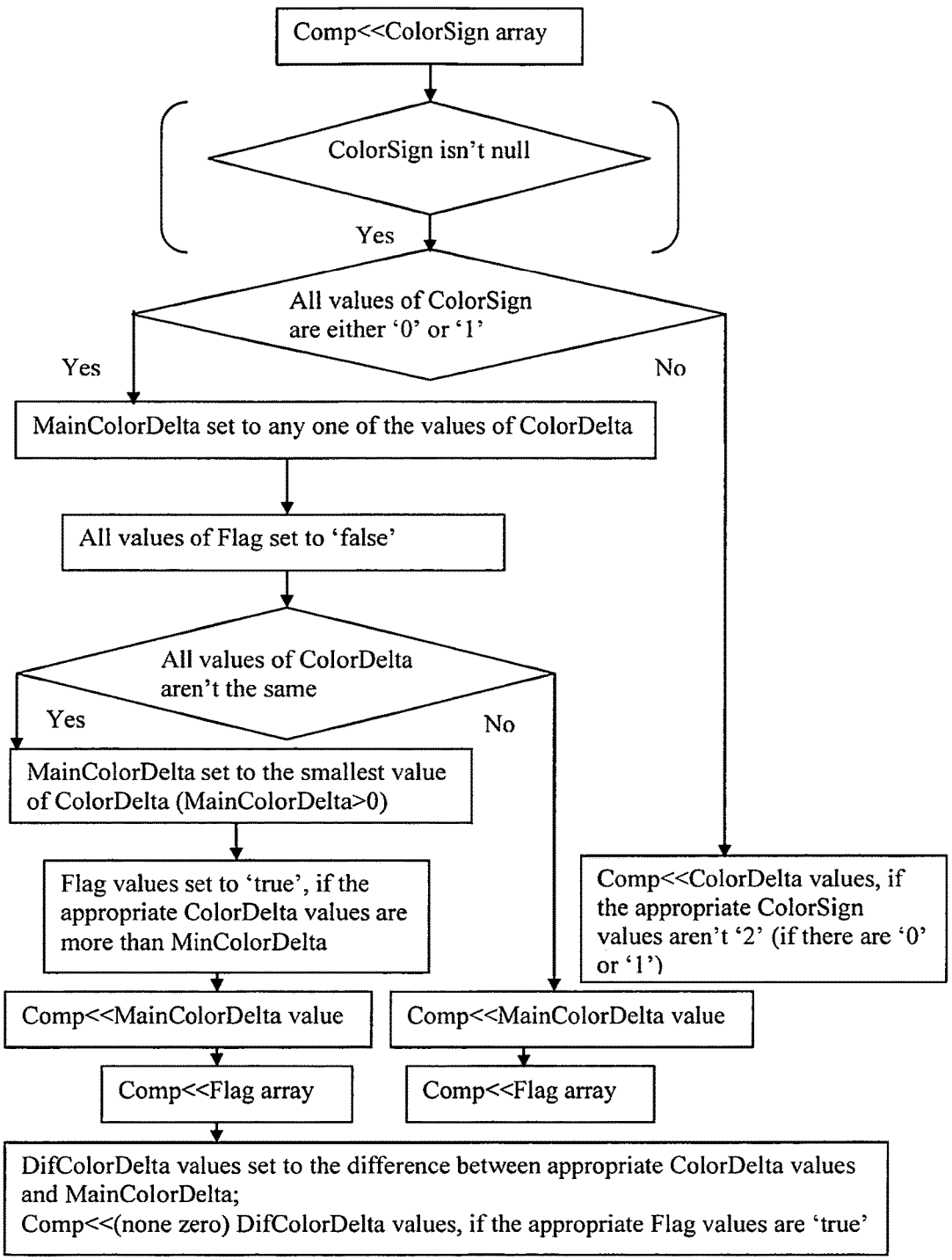
FIG. 32 CompactColorDeltaModal Algorithm 78

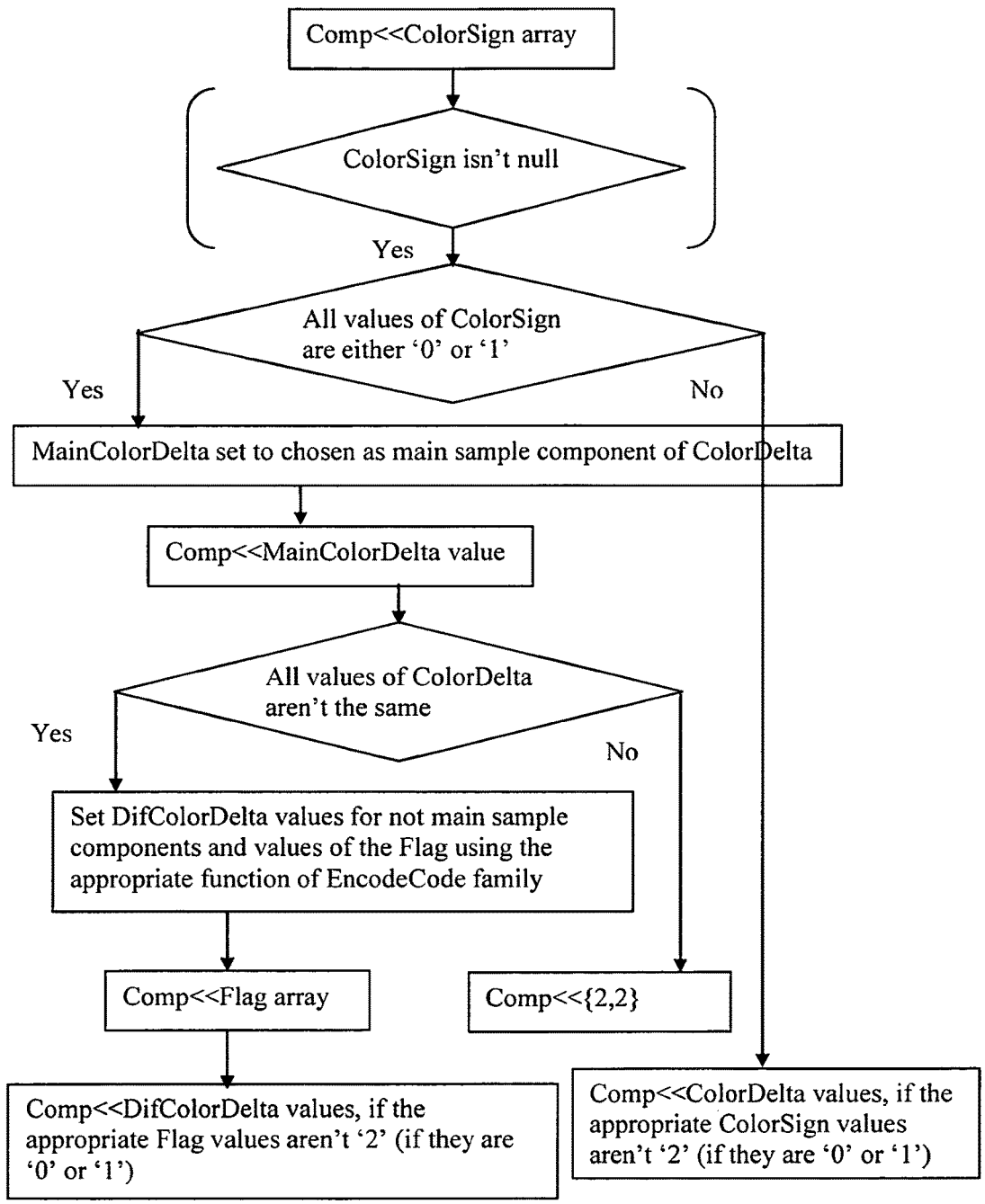
FIG. 33 CompactColorDeltaSigned Algorithm 80

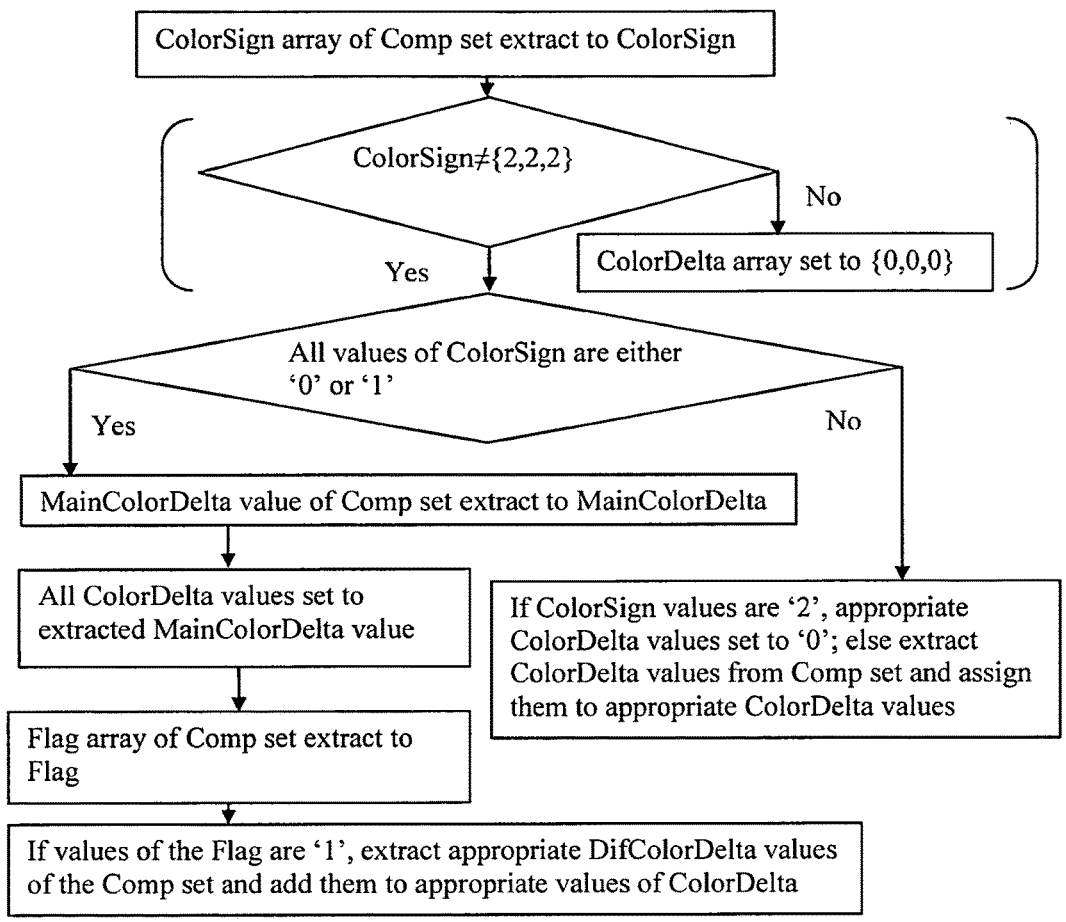
FIG. 34 ExtractColorDeltaModal Algorithm 82

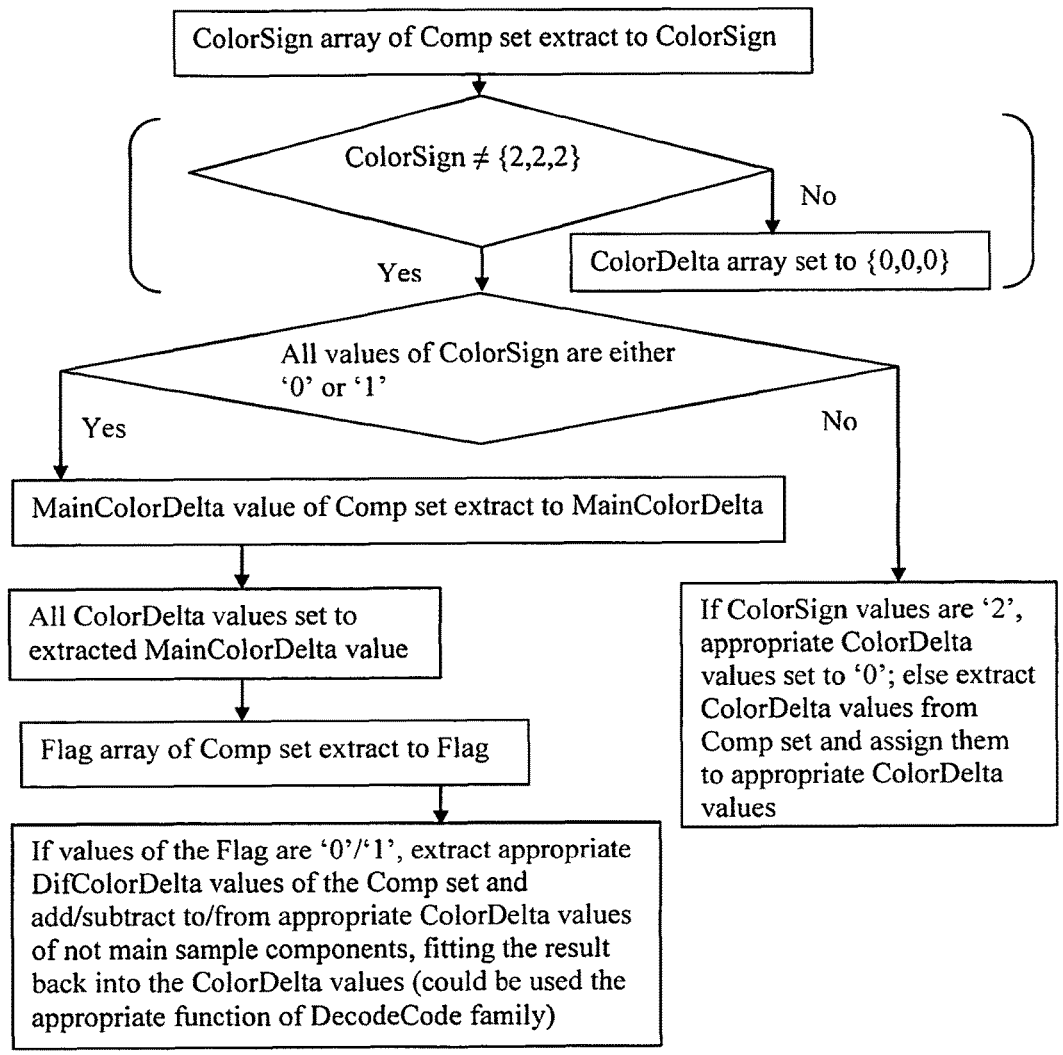
FIG. 35 ExtractColorDeltaSigned Algorithm 84

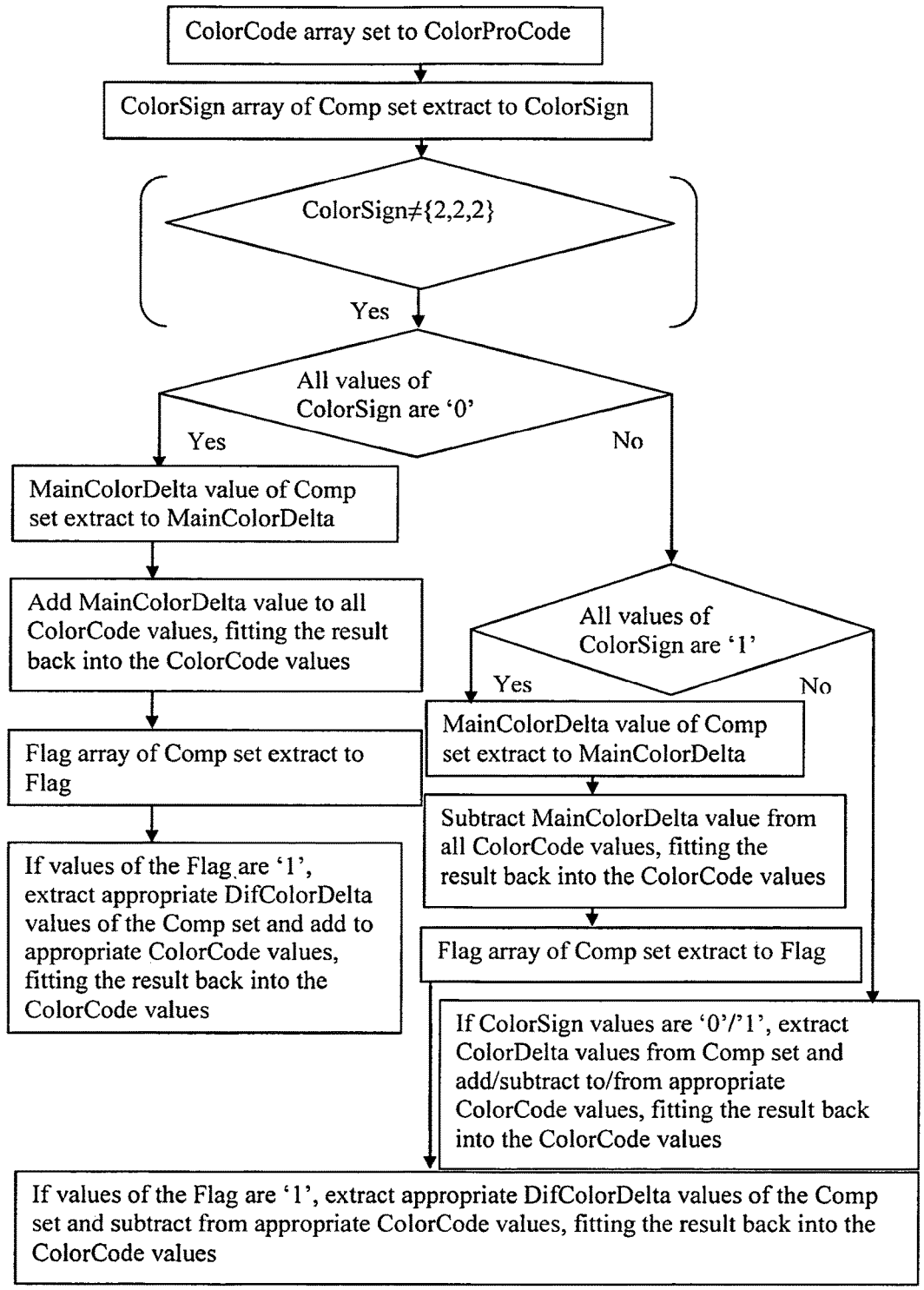
FIG. 36 RestoreColorCodeModal Algorithm 86

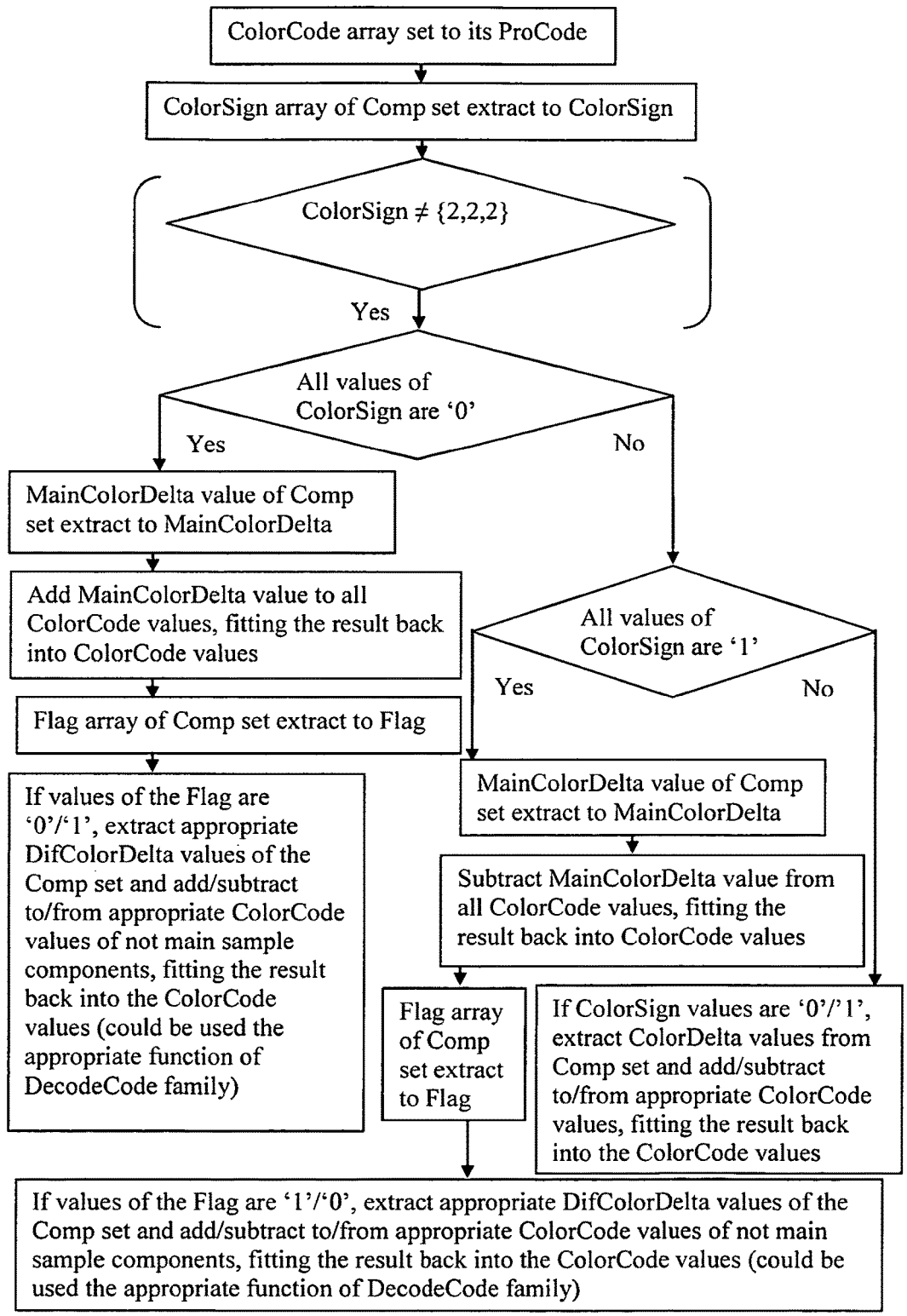
FIG. 37 RestoreColorCodeSigned Algorithm 88

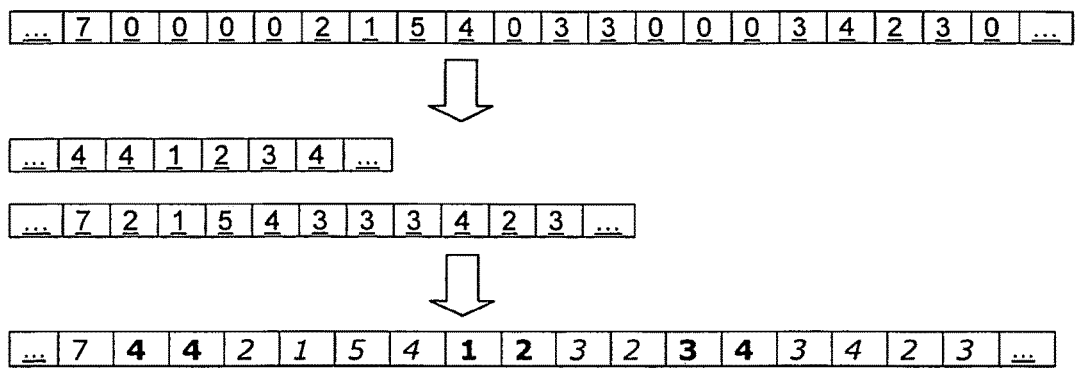
FIG. 38 Run-Length Coding 94
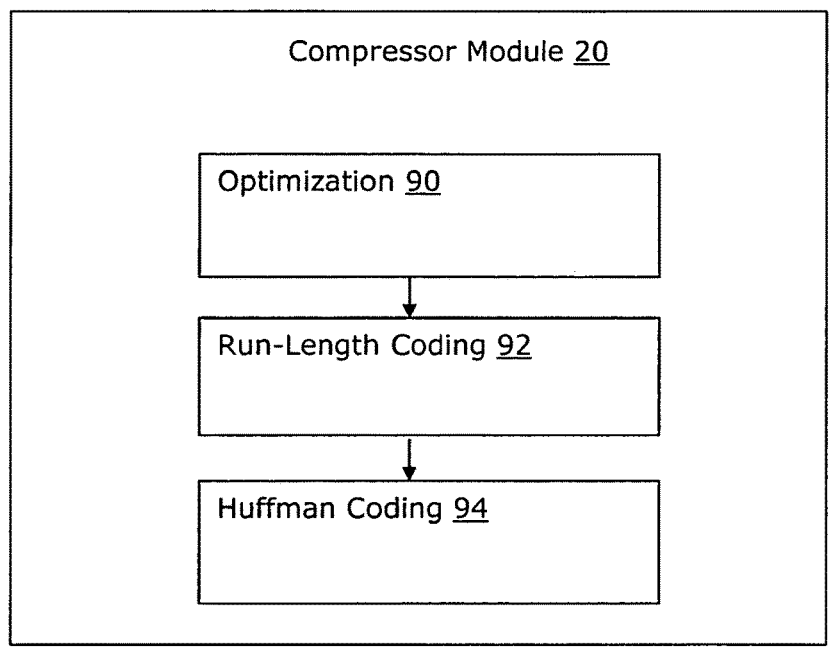
FIG. 39 Compressor Module 20

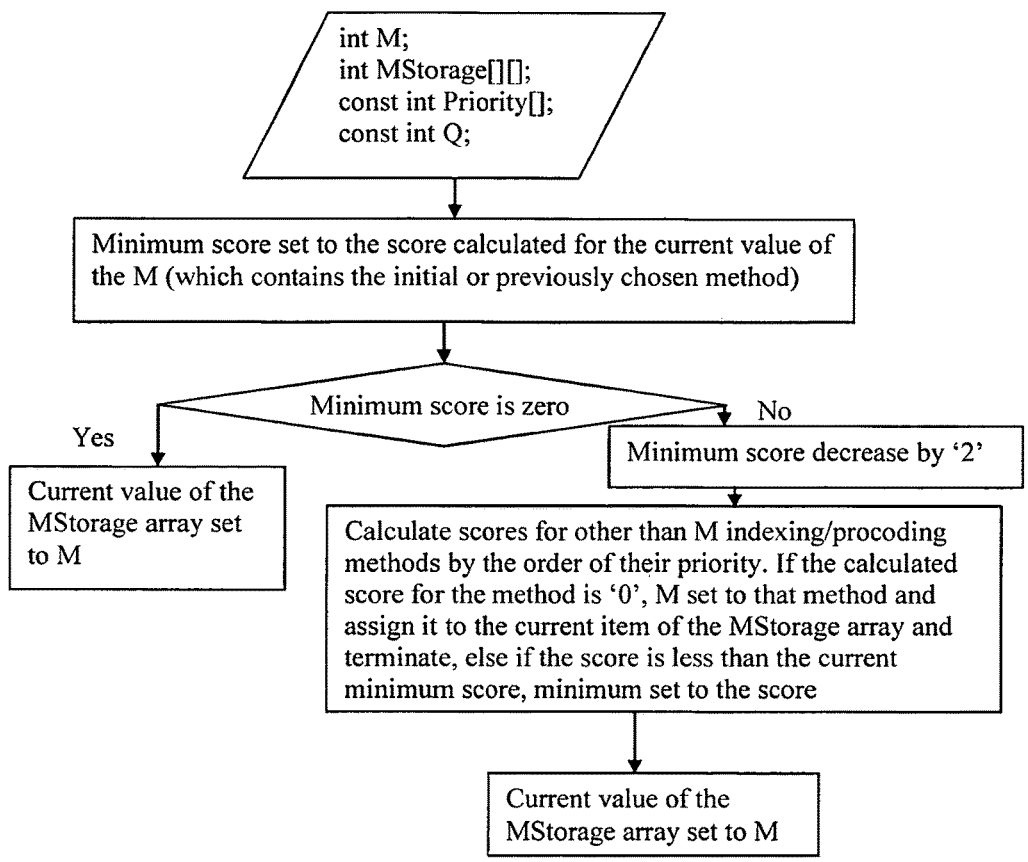
FIG. 40 ChooseMethod Algorithm 96

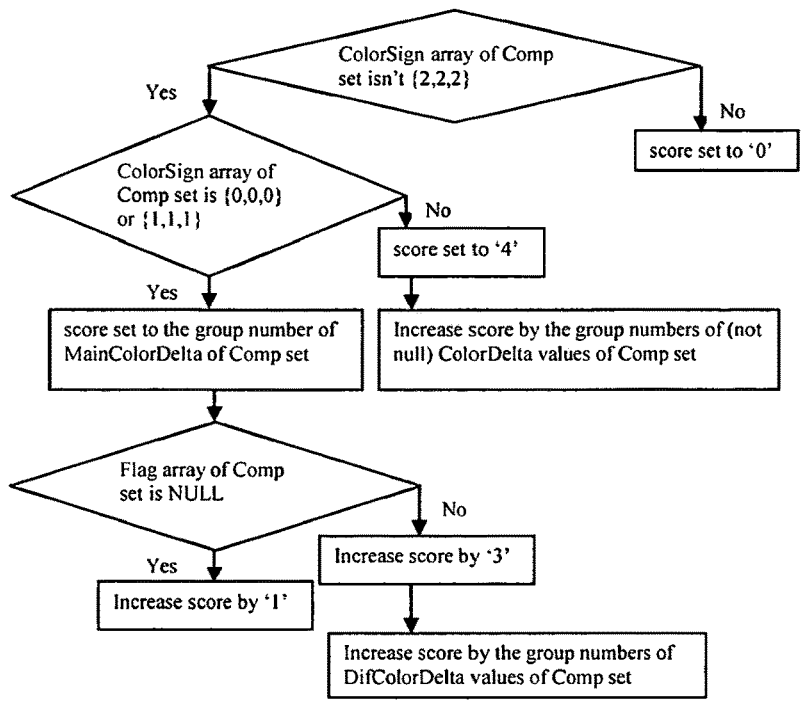
FIG. 41.1 Lossless
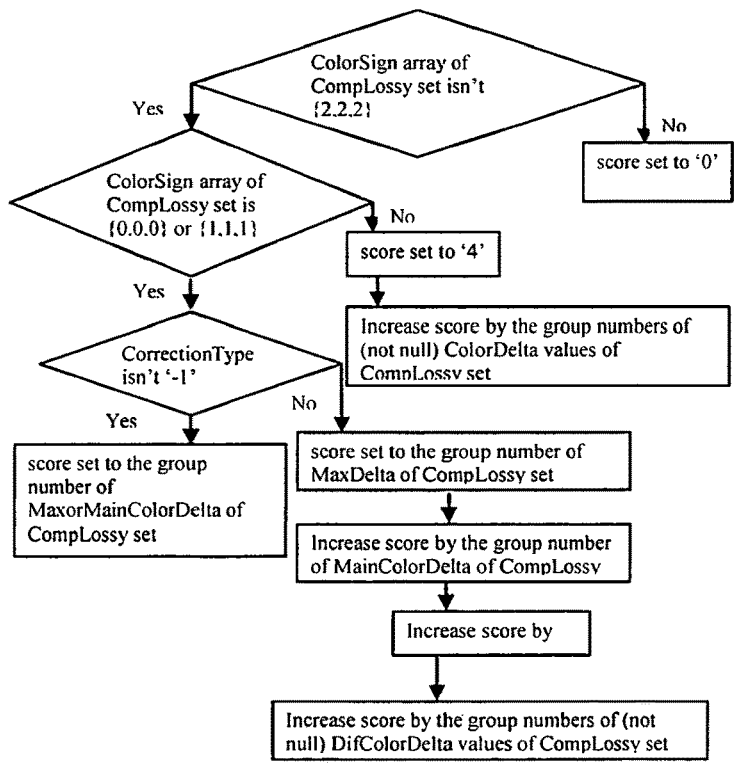
FIG. 41.2 Near-Lossless
FIG. 41 Score Algorithm 98 for the true color

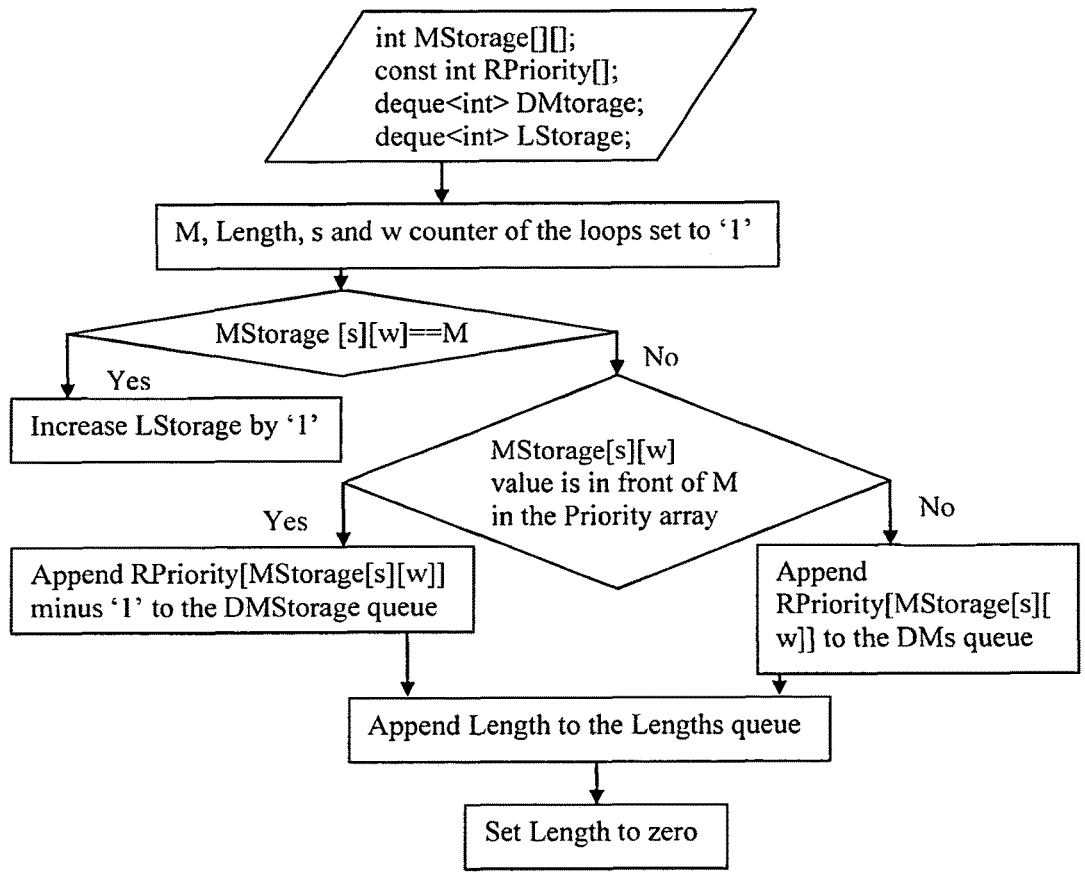
FIG. 42.1 Flowchart
DMStorage queue
LStorage queue
FIG. 42.2 Example
FIG. 42 StoreMethods Algorithm 100

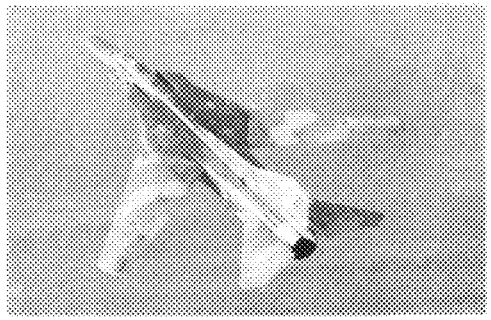
FIG. 43.1. Original Image
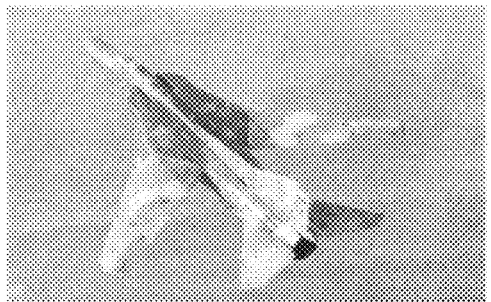
FIG. 43.2 RB Transform without Applying Algorithm of Correction 102
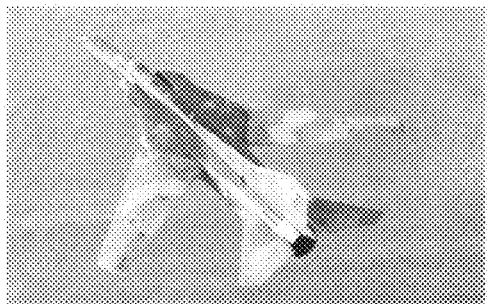
FIG. 43.3 RB Transform where Algorithm of Correction 102 is applied
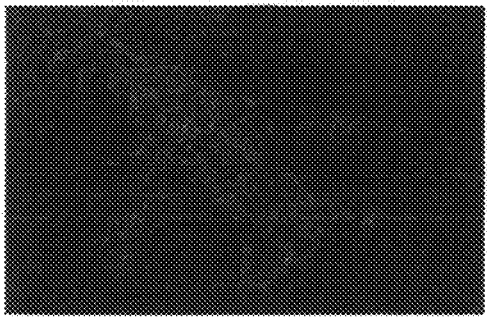
FIG. 43.4 Map of Losses of RB Transform
FIG. 43 Demonstration of Lossy Compacting or RB Transform

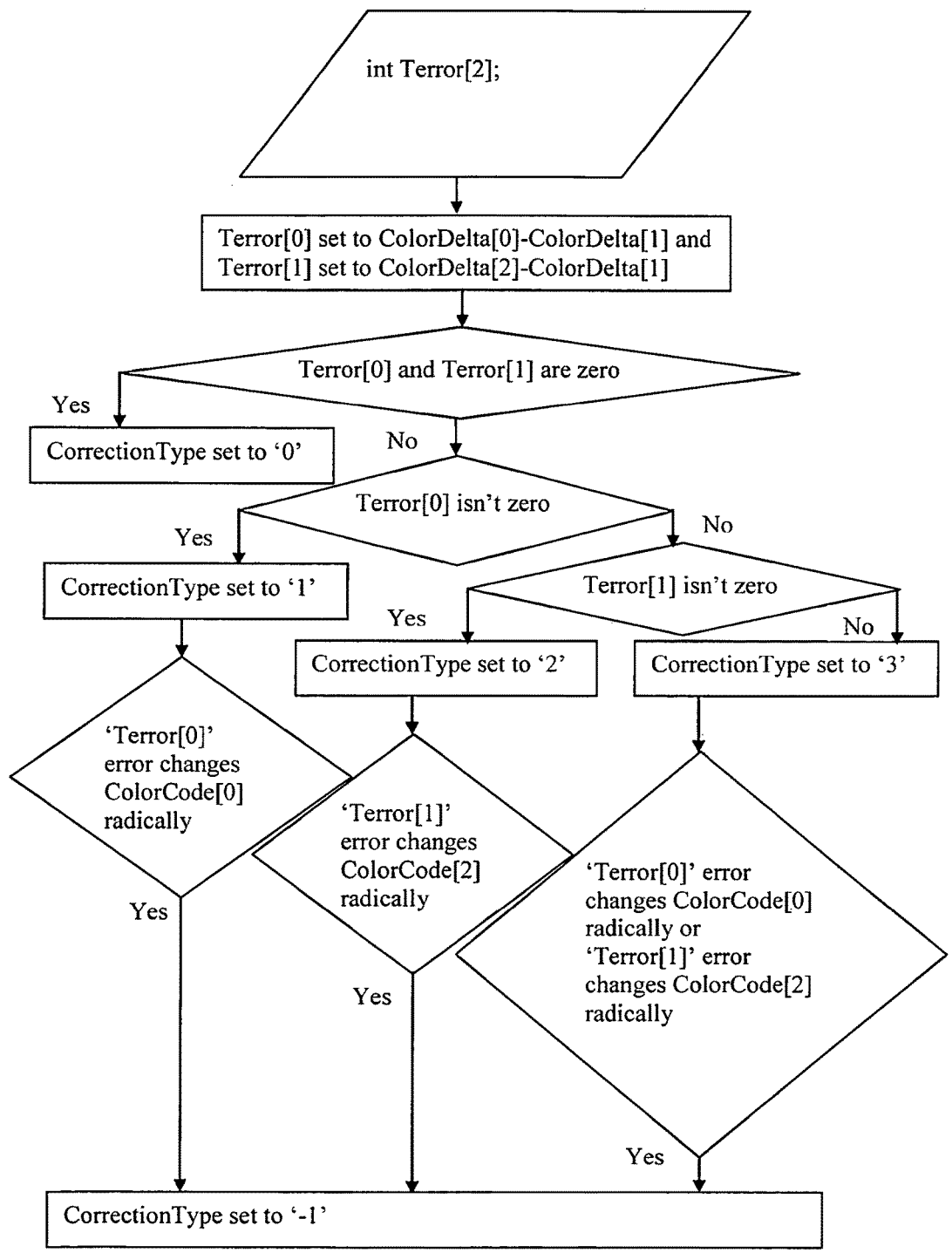
FIG. 44 CorrectionInit Algorithm 102

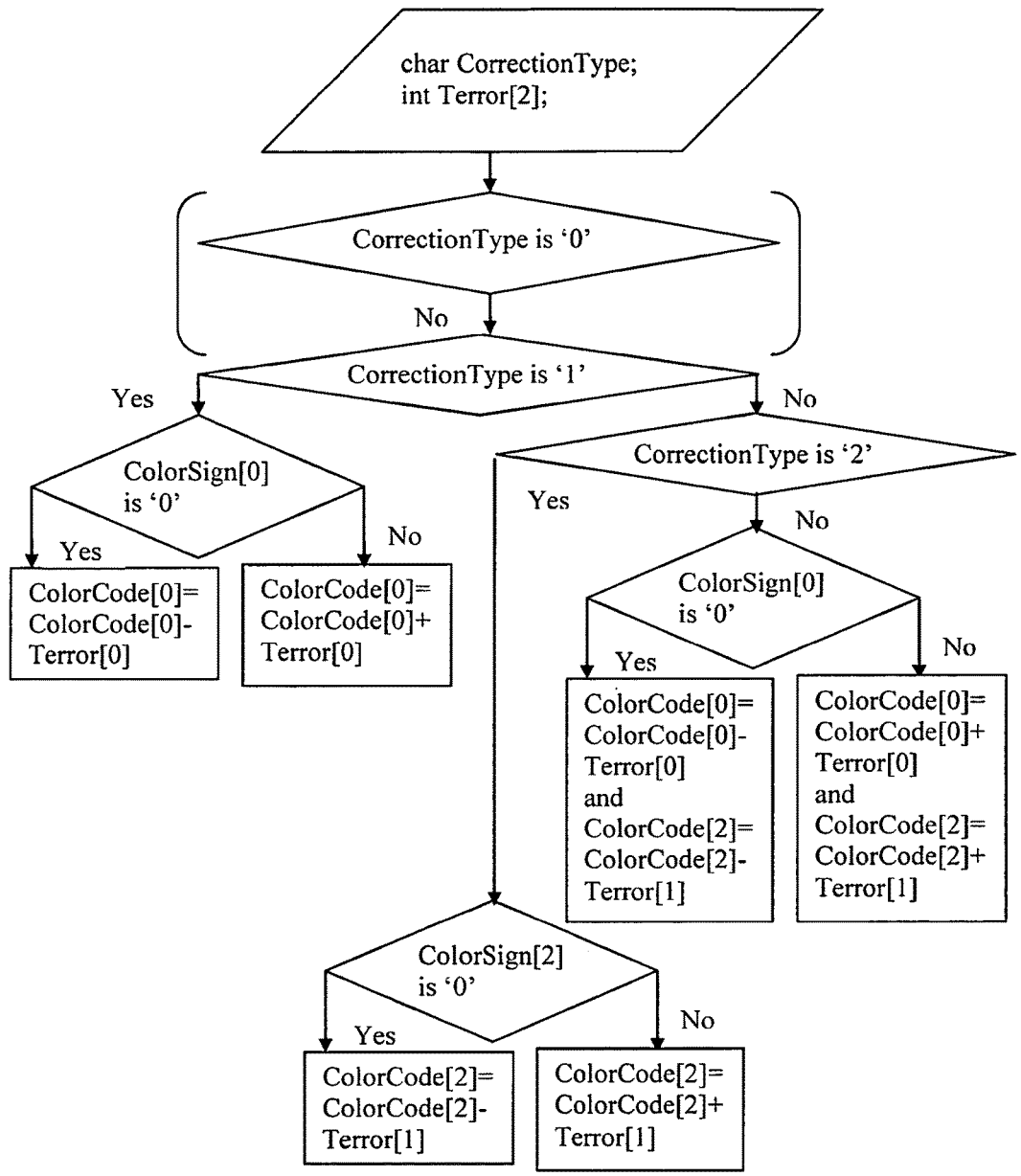
FIG. 45 CorrectionApply Algorithm 104

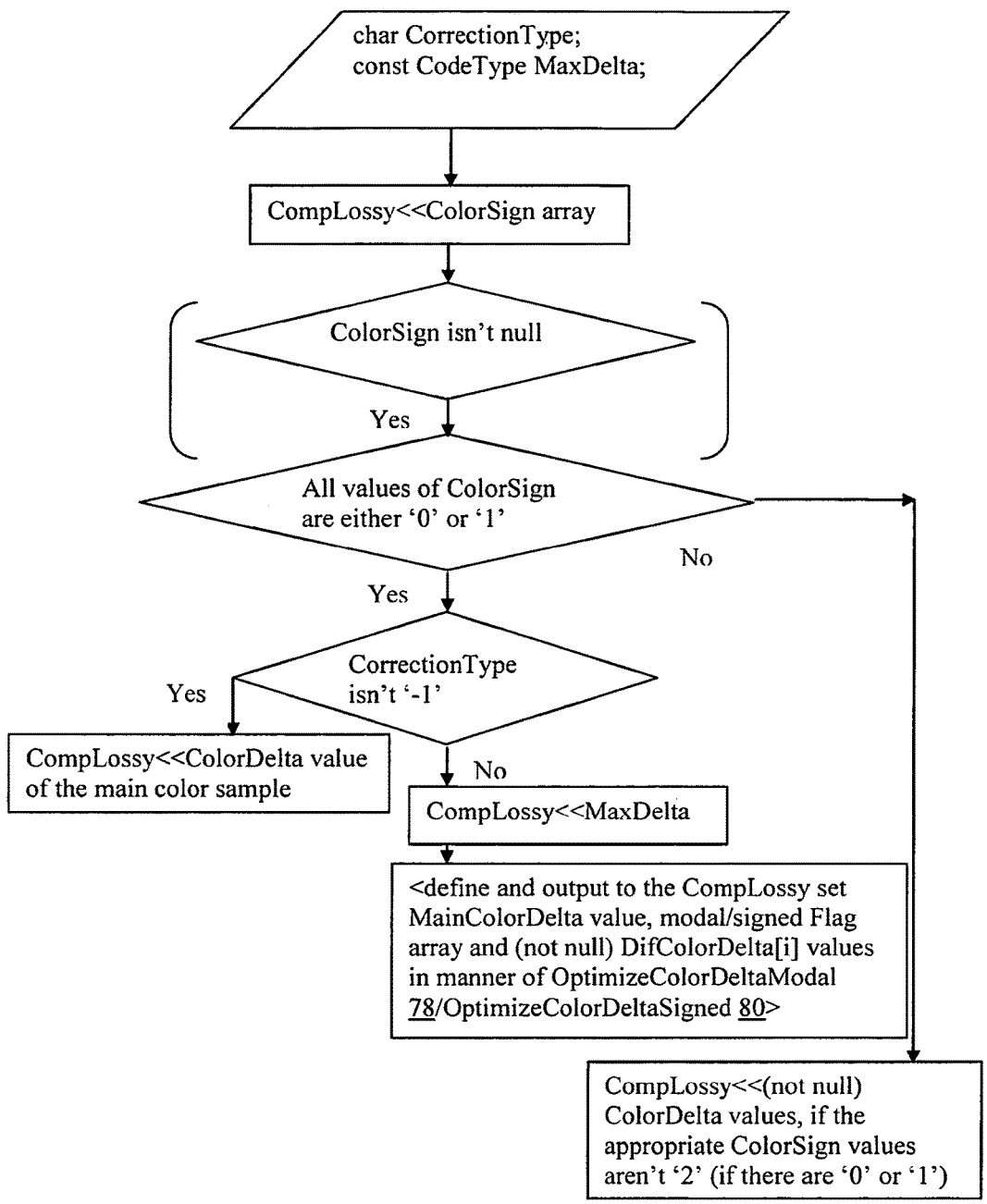
FIG. 46 CompactColorDeltaLossy Algorithm 106

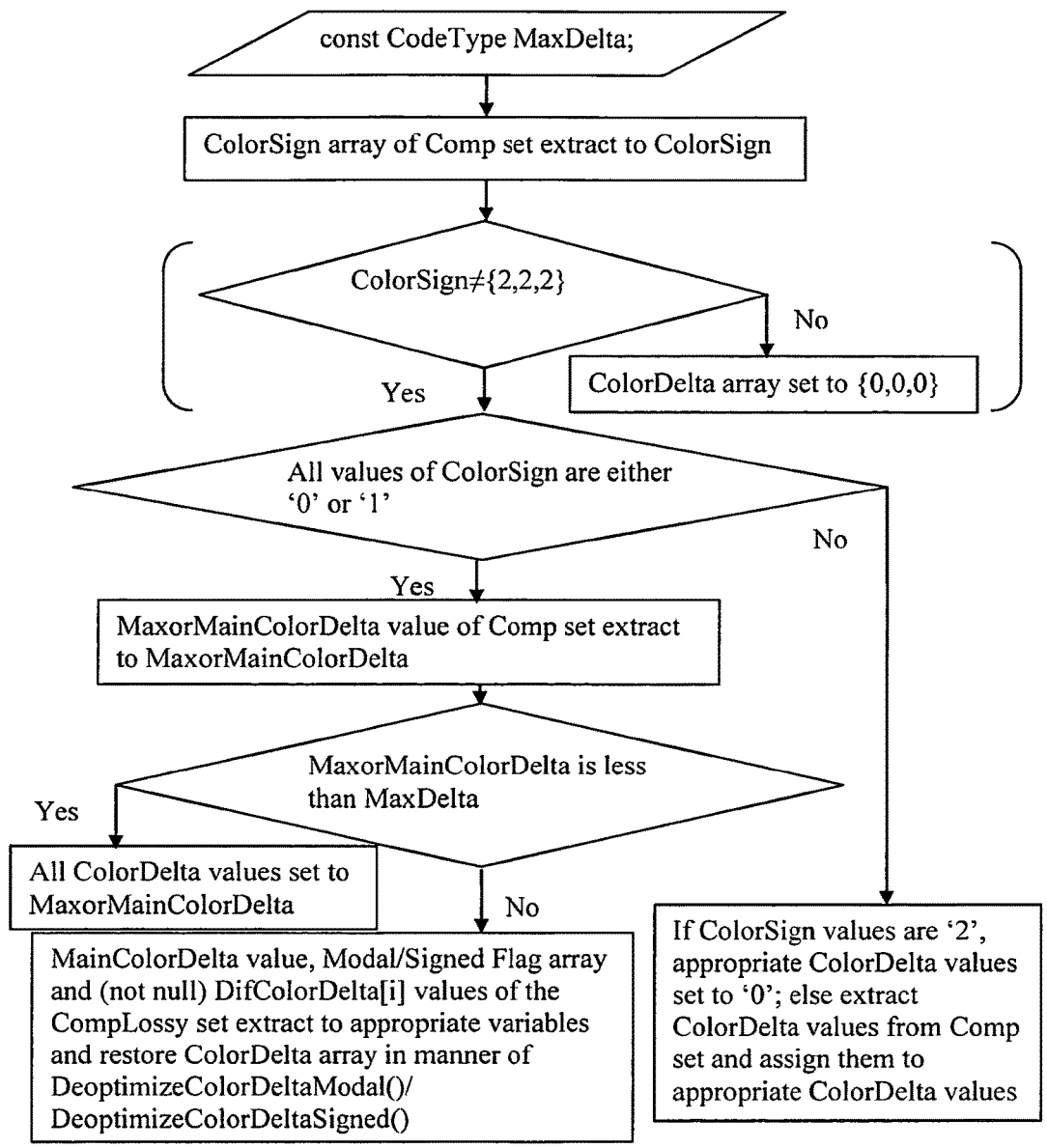
FIG. 47 ExtractColorDeltaLossy Algorithm 108

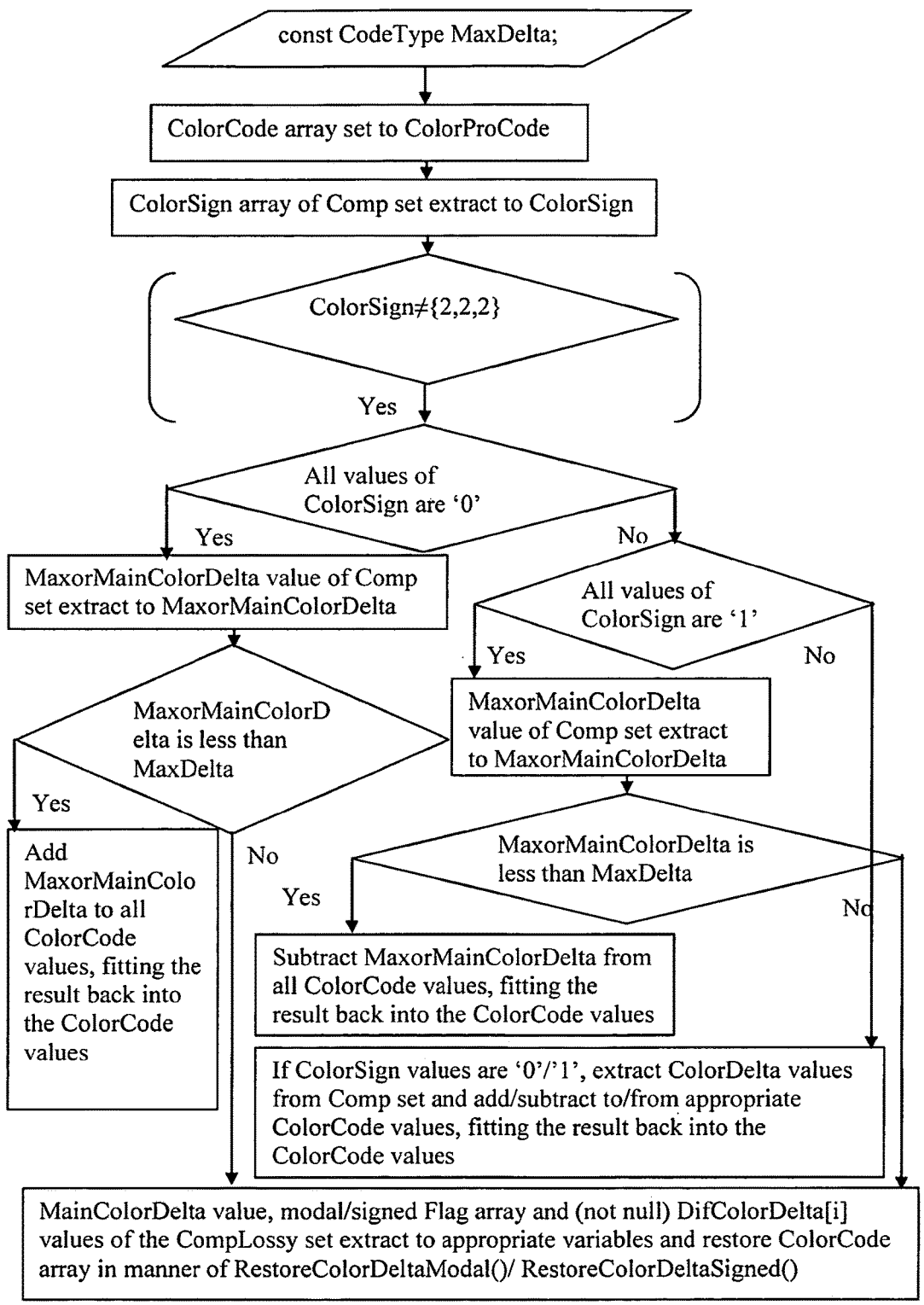
FIG. 48 RestoreColorCodeLossy Algorithm 110

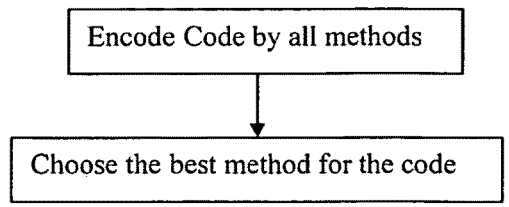
FIG. 49 Convert with Choosing Algorithm 114 for Indexed-Color/Grayscale Code
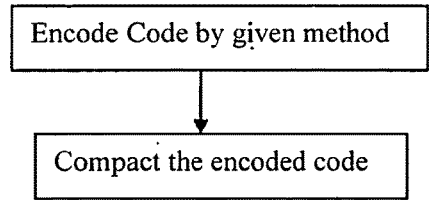
FIG. 50 Lossless Convert without Choosing Algorithm 112 for True-Color Code
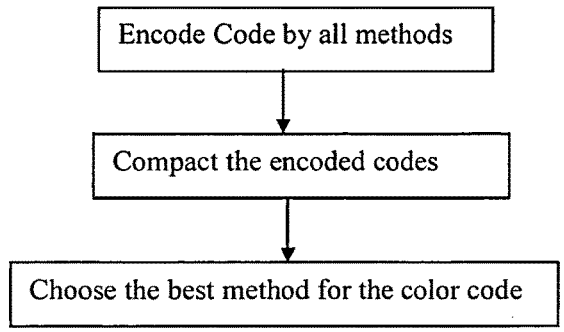
FIG. 51 Lossless Convert with Choosing Algorithm 114 for True-Color Code

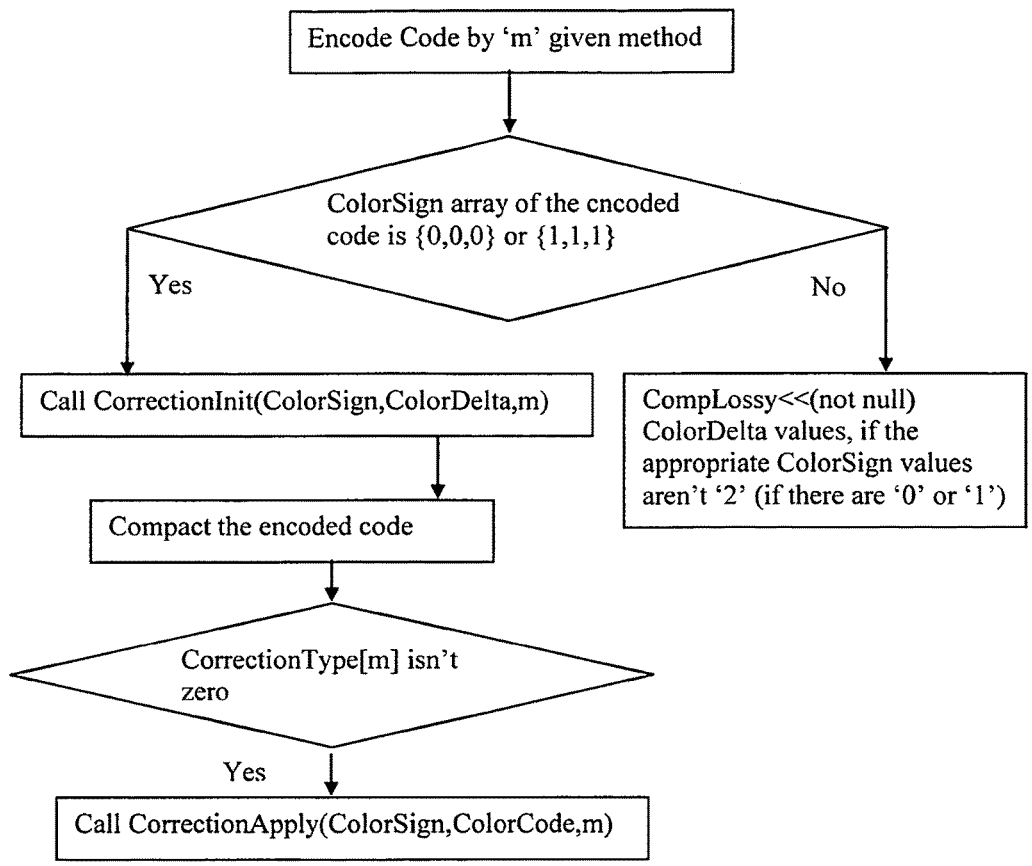
FIG. 52 Near-Lossless Convert without Choosing Algorithm 116 for True-Color Code

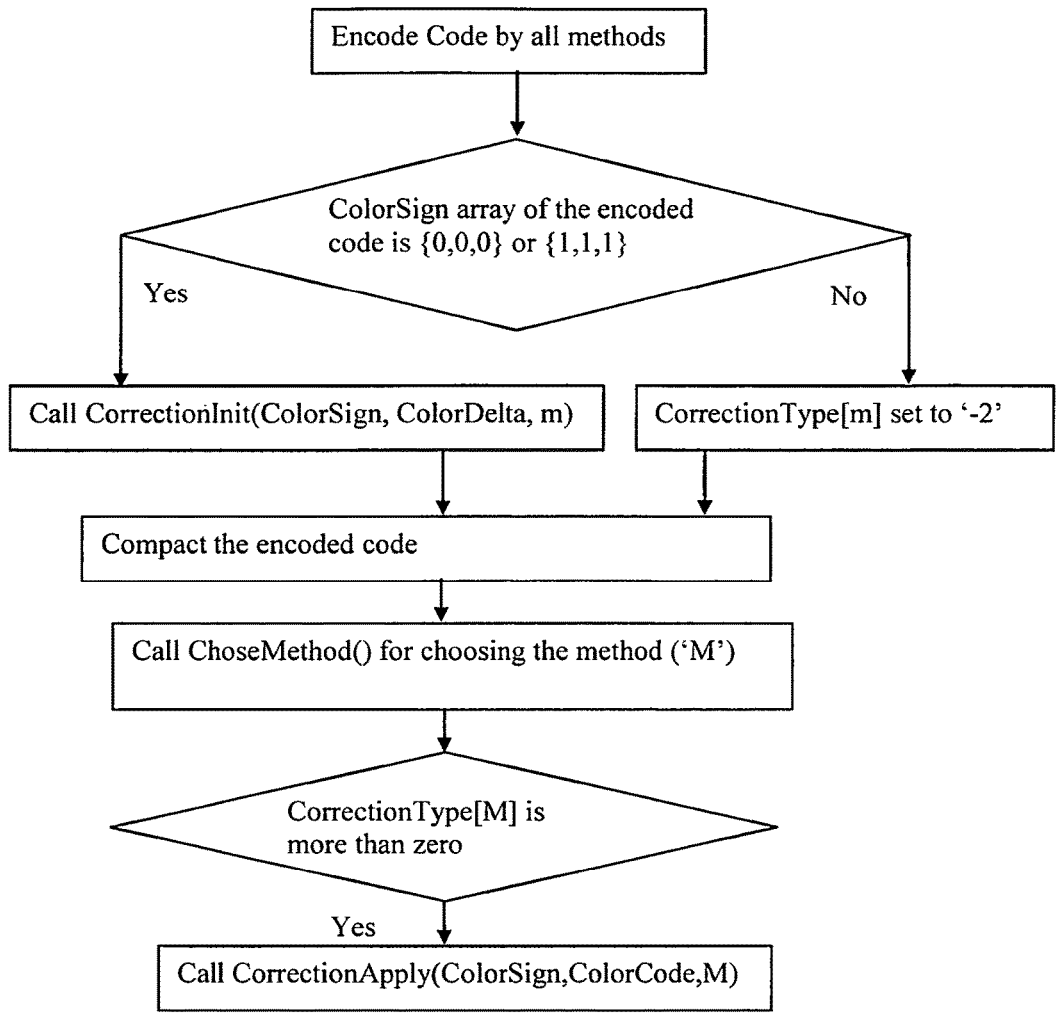
FIG. 53 Near-Lossless Convert with Choosing Algorithm 118 for True-Color Code

| Code[0][0] | Code[0][1] | ... | Code[0][w-1] | Code[0][w] | Code[0][w+1] | ... |
|---|---|---|---|---|---|---|
| Code[1][0] | Code[1][1] | ... | Code[1][w-1] | Code[1][w] | Code[1][w+1] | ... |
| ... | ... | ... | ... | ... | ... | ... |
| Code[s][0] | Code[s][1] | ... | Code[s][w-1] | Code[s][w] | Code[s][w+1] | ... |
| ... | ... | ... | ... | ... | ... | ... |

| Code[0][0] | Index[0][0][1] | ... | Index[0][0][w-1] | Index[0][0][w] | Index[0][0][w+1] | ... |
|---|---|---|---|---|---|---|

Converted Initial stream

| Index[1][1][0] | Index[m11][1][1] | ... | Index[m21][1][w-1] | Index[m31][1][w] | Index[m41][1][w+1] | ... |
|---|---|---|---|---|---|---|
| ... | ... | ... | ... | ... | ... | ... |
| Index[1][s][0] | Index[m1s][s][1] | ... | Index[m2s][s][w-1] | Index[m3s][s][w] | Index[m4s][s][w+1] | ... |
| ... | ... | ... | ... | ... | ... | ... |

Converted Regular Streams

| Code[0][0] | Index[0][0][1] | ... | Index[0][0][r-1] | Index[0][0][r] | Index[0][0][r+1] | ... |
|---|---|---|---|---|---|---|
| ... | ... | ... | ... | ... | ... | ... |
| Code[0][0] | Index[0][0][1] | ... | Index[0][0][r-1] | Index[0][0][r] | Index[0][0][r+1] | ... |
| ... | ... | ... | ... | ... | ... | ... |

Considering Converted Streams as Compressible Units

FIG. 54.1 Converter Module <u>30</u> for Indexed-color

| Code[0][0] | Code[0][1] | ... | Code[0][w-1] | Code[0][w] | Code[0][w+1] | ... |
|---|---|---|---|---|---|---|
| Code[1][0] | Code[1][1] | ... | Code[1][w-1] | Code[1][w] | Code[1][w+1] | ... |
| ... | ... | ... | ... | ... | ... | ... |
| Code[s][0] | Code[s][1] | ... | Code[s][w-1] | Code[s][w] | Code[s][w+1] | ... |
| ... | ... | ... | ... | ... | ... | ... |

| Code[0][0] | Sign[0][0][1] | ... | Sign[0][0][w-1] | Sign[0][0][w] | Sign[0][0][w+1] | ... |
|---|---|---|---|---|---|---|
| | Delta[0][0][1] | ... | Delta[0][0][w-1] | Delta[0][0][w] | Delta[0][0][w+1] | ... |

Converted Initial Stream

| Sign[1][1][0] | Sign[m11][1][1] | ... | Sign[m21][1][w-1] | Sign[m31][1][w] | Sign[m41][1][w+1] | ... |
|---|---|---|---|---|---|---|
| Delta[1][1][0] | Delta[m11][1][1] | ... | Delta[m21][1][w-1] | Delta[m31][1][w] | Delta[m41][1][w+1] | ... |
| ... | ... | ... | ... | ... | ... | ... |
| Sign[1][s][0] | Sign[m1s][s][1] | ... | Sign[m2s][s][w-1] | Sign[m3s][s][w] | Sign[m4s][s][w+1] | ... |
| Delta[1][s][0] | Delta[m1s][s][1] | ... | Delta[m2s][s][w-1] | Delta[m3s][s][w] | Delta[m4s][s][w+1] | ... |

Converted Regular Streams

| Code[0][0] | Sign[0][0][1] | ... | Sign[0][0][r-1] | Sign[0][0][r] | Sign[0][0][r+1] | ... |
|---|---|---|---|---|---|---|
| | Delta[0][0][1] | ... | Delta[0][0][r-1] | Delta[0][0][r] | Delta[0][0][r+1] | ... |
| ... | ... | ... | ... | ... | ... | ... |
| Sign[1][c][0] | Sign[m1][c][1] | ... | Sign[m2][c][r-1] | Sign[m3][c][r] | Sign[m4][c][r+1] | ... |
| Delta[1][c][0] | Delta[m1][c][1] | ... | Delta[m2][c][r-1] | Delta[m3][c][r] | Delta[m4][c][r+1] | ... |

...

Considering Converted Streams as Compressible Units

FIG. 54.2 Converter Module <u>30</u> for Grayscale

| ColorCode[0][0] | ColorCode[0][1] | ... | ColorCode[0][w] | ... |
|---|---|---|---|---|
| ColorCode[1][0] | ColorCode[1][1] | ... | ColorCode[1][w] | ... |
| ... | ... | ... | ... | ... |
| ColorCode[s][0] | ColorCode[s][1] | ... | ColorCode[s][w] | ... |
| ... | ... | ... | ... | ... |

| ColorCode[0][0] | Comp(Lossy)[0][0][1] | ... | Comp(Lossy)[0][0][w] | ... |
|---|---|---|---|---|

Converted Initial Stream

| Comp(Lossy)[1][1][0] | Comp(Lossy)[m11][1][1] | ... | Comp(Lossy)[mw1][s][w] | ... |
|---|---|---|---|---|
| ... | ... | ... | ... | ... |
| Comp(Lossy)[1][s][0] | Comp(Lossy)[m1s][s][1] | ... | Comp(Lossy)[mws][s][w] | ... |
| ... | ... | ... | ... | ... |

Converted Regular Streams

| ColorCode[0][0] | Comp(Lossy)[0][0][1] | ... | Comp(Lossy)[0][0][r] | ... |
|---|---|---|---|---|
| ... | ... | ... | ... | ... |
| Comp(Lossy)[1][c][0] | Comp(Lossy)[m1][c][1] | ... | Comp(Lossy)[mr][c][r] | ... |
| ... | ... | ... | ... | ... |

Considering Converted Streams as Compressible Units

FIG. 54.3 Converter Module <u>30</u> for Lossless (near-lossless) True-Color

FIG. 54 Converter Module <u>30</u>

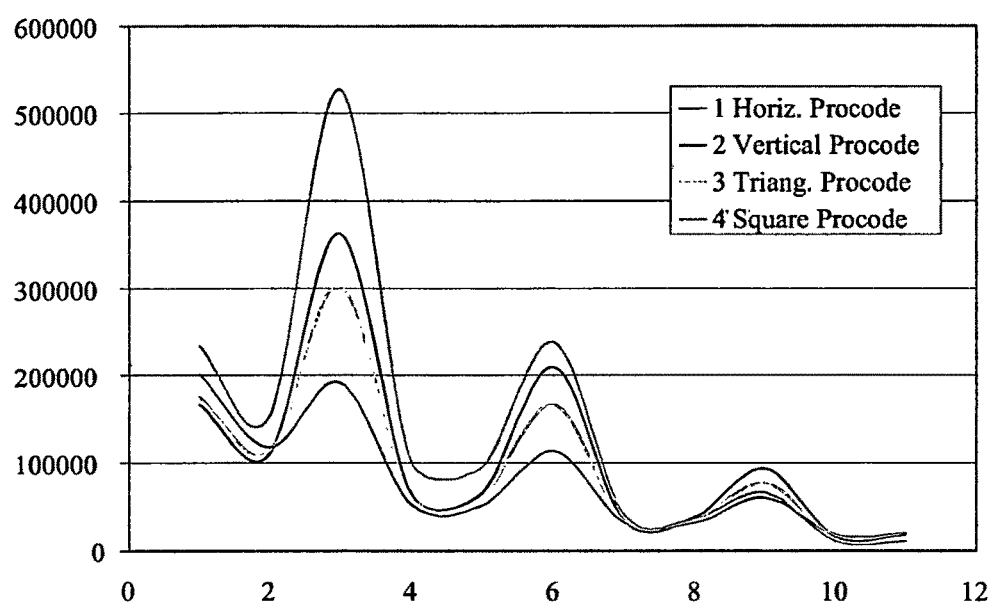
FIG. 55 Chart

SYSTEM AND METHODS FOR IMAGE/VIDEO COMPRESSION

0. FIELD

The system and methods described herein relate to image/video encoding and compression technique. This invention pertains to image/video encoding and compression techniques for computer system and in particular encoding and compression techniques for indexed-color, grayscale and true color (red, green, blue (RGB) or cyan, magenta, yellow, black (CMYK image)) data streams of any bit depth.

1. BACKGROUND

The original impetus behind the field of file compression was due to the limitations in storage. While advances in data storage technologies have removed this initial limitation and made storage space more efficient and affordable, there has been resurgence in the field of file compression. The new driving factors behind this resurgence are limitations associated with Internet bandwidth. End users demand faster performance rates from their Internet experience. In addition, web pages are incorporating larger files into their design. Moreover, these files are not limited to fixed size images but may also include streaming audio or video again exacerbating this Internet throughput bottleneck.

Lossless data compression is considered to be a special class of compression algorithms. These algorithms permit the exact original data file to be recreated from a compressed version of the original data file. Lossless data compression should be contrasted to lossy data compression which recreates the exact original data files from a corresponding compressed format. Numerous file formats enable lossless image/video compression. However, these techniques are often better suited for particular file types.

Lossy data compression techniques are also known, but delivering a desirable compression result can vary relatively significantly depending on the value of difference from the original.

The Graphics Interchange Format (GIF) is an 8-bit per pixel bitmap image compression format that was introduced in 1987. The GIF images are compressed using the Lempel-Ziv-Welch (LZW) lossless data compression technique. The GIF format makes use of a palette table comprising 256 distinct colors from the 24-bit RGB (red, green, blue) color space. Due to this 256 color limit, the GIF format generally is not well adapted for reproducing color photographs, and other images with continuous color.

The Portable Network Graphics (PNG) is a bitmapped image format that employs lossless image compression. The PNG format makes use of lossless data compression algorithm named deflate that uses a combination of the LZ77 algorithm and Huffman coding. The impetus behind the creation of the PNG format was to improve upon some of the limitations of GIF. The PNG format supports palettes of 24-bit RGB color space and grayscale images/frames. However, PNG provides poor compression for photo images and it does not support bit depth other than 8 bit or other color spaces such as CMYK image (cyan, magenta, yellow, black).

Lossless JPEG format encodes the difference between a predicted value and the actual value for each pixel. With 16-bit data, these differences are computed modulo 16-bits, so the range of possible differences is −32768 to +32767. Two values are stored for the difference. First, the number of bits required to store the difference (encoded via Huffman coding), and then the actual difference.

U.S. Pat. No. 7,113,638 issued to Caruso et al. entitled "Image Compression Usable with Animated Images" describes a lossless compression technique. However, this technique is limited to indexed-color images (24-bit RGB color space with a palette table including 256 colors).

2. SUMMARY

The embodiments described herein provide a system and methods for encoding, then compressing and decompressing, then decoding image/video data, comprising computer program linked to computer device and defining encoding and compression utility operable to encode and compress image/video streams and store a result of such compression to a memory storage device or to transmit it, using a method for encoding and compression of image/video data comprising subdividing the image/video into a series of one or more image/video partition(s) (of rectangle shape), further comprising encoding image/video streams, further comprising determining compressible units for the image or the manner in which to compress the image partition(s), where a determination is made as to whether to compress the partition in a line by line manner, or the entire partition in its entirety, further comprising compression of compressible units further to provide compressed units and further comprising to provide encoded and compressed image/frame that includes compressed units.

The embodiments described herein provide in one aspect a method for encoding and compressing digital image/frame. The method includes the step of comparing each color code with the neighbor color codes to determine the degree of similarity of the color code. In some embodiments, the degree of similarity is defined to be the magnitude of the difference of the color code values.

After the comparison has been completed, each color code is sorted in relation to each other color code. This may be done, for example, by producing a sort value, where the sort value is indicative of the degree of similarity of the code. In one embodiment, a zero value is used to indicate the greatest degree of similarity (i.e. that the color values are the same) and numbers greater than zero are used to indicate dissimilarity (i.e. the greater the sort value the greater is the dissimilarity).

Based on the sort values, a color palette is created for each of the color codes of indexed-color image/frame. The colors in the color palette are arranged according to their similarity to the color associated with the particular color palate. For example, the color associated with the color palette is at one end. Next to it is the most similar color. The remaining colors are likewise arranged in order of similarity to the color associated with the particular color palette.

The color palettes are then converted into decoder tables. This can be accomplished by replacing the color code with an index. The index is reflective of the original position of the color code in the original color palette.

The decoder tables are converted into encoder tables by reversing the index values. In one embodiment, the term reversing is not meant to designate using an opposite ordering (i.e. it does not mean that the first becomes the last, the second becomes the second last, the third becomes the third last etc.). In this embodiment, reversed means that if 'i' is the $n^{th}$ value in the decoder table, then in the corresponding encoder table 'n' will be the $i^{th}$ value.

The encoder tables are then used to encode the color codes thereby producing at least one compressible unit.

After the encoding is completed, the compressible units are compressed. It is not necessary that all the compressible units be encoded before compression occurs. These steps may be executed by means of parallel processing. In one embodiment, compression can be done by known methods such as Huffman encoding.

In various embodiments, this method is utilized to compress indexed-color images.

In a second aspect, the embodiments described herein relate to a method of compressing digital image. The method includes the step of encoding the image to produce at least one compressible unit. The encoding is accomplished by analyzing the color values of neighboring color codes. Specifically, the delta and sign of the neighboring pixels are calculated. The delta is a magnitude of the difference and the sign indicates the sign of the difference.

The term "neighboring pixels" can refer to any appropriate number of pixels arranged in any appropriate arrangements. For example, in some embodiments, the term "neighboring pixels" refers to two pixels that are arranged side by side horizontally. In other embodiments, the term "neighboring pixels" refers to two pixels that are arranged next to each other vertically. In yet other embodiments, the term "neighboring pixels" refers to three pixels where two of the pixels are arranged side by side horizontally and two of the pixels are arranged next to each other vertically. In a further embodiment, "neighboring pixels" refers to four adjacent pixels that define a square.

The delta values are optimized for compression. This may be accomplished by grouping the values of deltas. The group numbers are then used for compression purposes. This can, for example, reduce the size of a Huffman tree representation and can therefore improve compression.

Other optimizations can also be performed. For example, it is possible to optimize the compressible units based on commonly occurring patterns in the data. For example, as described herein, certain sign values tend to occur in larger numbers than certain other sign values. In addition, certain delta values tend to occur more often than other delta values. Furthermore, there tends to be some symmetry in sign values. These data patterns can be exploited to optimize compression.

After the optimization step, the compressible units are compressed. In one embodiment, the compression can be done by known methods such as Huffman encoding.

In various embodiments, this method can be used to compress grayscale and true-color images/frames.

3. DEFINITIONS AND BRIEF DESCRIPTION OF THE DRAWINGS

The following terms are described to provide the user with clearer understanding of the description that is provided herein. Screen (FIG. 1) hardware is a computing device which exposes digital image/video data located in the video memory of the computing device. The screen consists of pixels—the smallest units of the hardware encapsulating a color. Pixels are generally thought of as the smallest definable components of an image/video screen. Pixels encapsulate true-colors for indexed-color images/frames (video frames). Pixels are grayscale for grayscale images/frames and they contain true-color for true-color images/frames. Screen demonstrated in FIG. 1 consists of 24×24 pixels (each square represents a pixel).

Code is the smallest unit of digital data which defines the color of a pixel. True-color or color code consists of 3 or 4 color sample codes—red, green and blue (RGB) or cyan, magenta, yellow and black (CMYK) color sample codes respectively. Grayscale or gray code consists of only one, grayscale color sample and indexed-color code is an index of RGB code in the palette table. Video frame or frame is an image of video data which is fixed in the screen during short period of time.

Image/frame partition is a subdivision of the image/video data, which exposes on the predefined area of the screen. The area is a rectangular or any shape of pixel segment. Video partition includes video data from all video frames, exposing it in the same predefined area of the screen. The partition defines the processing (encoding and compressing) part of the image/video data. If no subdivision is selected, then by default, the entire image/video data will be treated as the partition. Image/video data may be divided into one or more image partitions of any shape, and the partition may be any subdivision of the selected image/video that comprises a segment of pixels of screen of any shape. Examples of the variety of partitions are given in FIG. 2 (where the partitions are selected by the red color). If the image/video data is not partitioned, the entire image/video data is treated as a partition, as it is shown in FIG. 2.1. As will be understood by someone skilled in the art, the image/video may be divided into one or more partitions. Here are 3 purposes for partitioning:
1) To encode and compress selected image/video data portion(s);
2) To extract (decompress and decode) and compose required partition(s) of the image/video data; and
3) To encode and compress some partitions in lossless/lossy manner.

In FIGS. 2.2, 2.3, 2.4, 2.5, 2.6 and 2.7 the partitions are slice of the Screen, Screen line, rectangle of the Screen, any area of the Screen, any line of the Screen and any set of pixels of the Screen respectively.

Stream is a sequence of codes. Partition consists of the streams, as it is shown in FIG. 3. Image stream appears on the screen as a line of an image partition (in particular, pixels of a line of entire image) as it is shown in FIG. 3.1. FIG. 3.2 demonstrates two neighboring image streams.

FIG. 4 represents video streams: FIG. 4.1—a video stream and FIG. 4.2—neighboring video streams having similar shapes. Video stream is represented on the screen as the reflection of video partition—it contains all pixels of a frame belonging to video partition (in particular, all pixels of entire frame) (FIGS. 2.7 and 4.1). So, the shape of the image stream is 1-dimensional (line of the partition) and the shape of the video stream is 2-dimensional (lines of the partition). Image/video partitions could be considered as 2 or 3-dimensional image/video data consisting of 1 or 2-dimensional streams. A stream could be considered as a layer of the partition.

This patent application considers only image partitions of rectangular shape. A rectangular shape of an image partition is preferable for having simple definitions of neighboring (for example, left, up, left-up) pixels necessary for the encoding/decoding of a code or color code (FIG. 3.1). Partitions of any shape are considered and equally preferable for the video (FIG. 4.1). Considered streams of the image partition are the lines having the same number of codes and streams of video partition must have the same shape on the screen. The shape also is the reflection of the video partition on the screen. We can also state that video stream is a reflection of video partition on the screen (FIG. 2.7).

Code(s) of previous encoded/decoded stream could be used for encoding/decoding a code of current stream. Previous stream is previous encoded/decoded line of an image partition (FIG. 3.2) and it is an appropriate encoded/decoded stream of previous frame (both current and appropriate stream of previous frame belong to the same video partition) (FIG. 4.2). Initial stream is a first stream of a partition. It is the first line of an image partition and the stream on the first frame of the video partition. Initial stream does not have a previous one for the self encoding/decoding, therefore it uses only its own previously encoded/decoded code for encoding/decoding the current code. Non initial streams are regular streams. An index of the stream is the index of the line for an image partition and it is the index of the frame for a video partition.

The term "unit" refers essentially to a "subset" of any kind. The term "compressible unit" is an encoded (and compacted) sequence of codes in accordance with the present invention. It is still uncompressed image/video data which is supposed to be compressed as a unit (it is sequence of one or more encoded (and compacted) streams which are going to be compressed as a single unit). Compressible unit 18 consists of one or more encoded streams. A compressible unit of the image usually is either an encoded (and compacted) stream (partition line) or an encoded partition (encoded (and compacted)) lines of partition or entire image). A compressible unit of the video contains one or more encoded (and compacted) streams of a frame or entire frame. The code of compressible unit is the encoded version of the indexed-color or grayscale or encoded and compacted version of the true-color code. Compressed unit 8 refers to a compressed (Huffman coded) version of such "compressible unit"—once a compressible unit has been compressed, this is referred to as a compressed unit, which is compressed in accordance with the present invention. Compressed unit consists of a header (containing Huffman tables), compressed compressible unit, etc.

For better understanding of embodiments of the system and methods described herein, and to show more clearly how they may be brought into effect, reference will be made by way of example to the accompanying drawings in which:

FIG. 5 is a block diagram illustrating compression/decompression system for an image or video frame;

FIG. 6 is a block diagram illustrating the components of compression application 6 component of the compression/decompression system 0;

FIG. 7 is a block diagram illustrating the components of decompression application 12 component of the compression/decompression system 0;

FIG. 8 is block diagram illustrating encoder module 16 of compression application 6;

FIG. 9 is block diagram illustrating decoder module 16 of decompression application 12;

FIG. 10 is an illustration of the streams of the partition;

FIGS. 11-17 are referring to encoding of the indexed-color streams:

FIG. 11 is 1-dimensional arrangements of indexed-color palette table;

FIG. 12 is 2-dimensional arrangements of indexed-color palette table;

FIG. 13 is illustrating Horizontal Indexing Encoding/Decoding of Code: FIG. 13.1: Horizontal Encoding and FIG. 13.2: Horizontal Decoding;

FIG. 14 is illustrating Vertical Indexing Encoding/Decoding of Code: FIG. 14.1: Vertical Encoding and FIG. 14.2: Vertical Decoding;

FIG. 15 is illustrating Triangular Singular Encoding/Decoding of Code: FIG. 15.1: Triangular Singular Encoding and FIG. 15.2: Triangular Singular Decoding;

FIG. 16 is illustrating Encoding Initial Indexed-Color Stream: FIG. 16.1 is common illustration and FIG. 16.2 is example;

FIG. 17 is illustrating Encoding Regular (not Initial) Indexed-Color Stream;

FIGS. 18-28 are referring to encoding of the grayscale and true-color streams:

FIG. 18 is illustrating creation and usage of the Palette table from the Image Partition/Video Stream;

FIG. 19 is illustrating the Codes used for calculating Procodes;

FIG. 20 is block scheme of Algorithm of Calculating Mod(x);

FIG. 21 is block scheme of EncodeCode Algorithm;

FIG. 22 represents FIG. 22.1 and FIG. 22.2 block schemes of DecodeCode Algorithm, both of them take the same input data and produce the same output data;

FIG. 23 is block scheme of EncodeCodeAbs Algorithm for Codes having 10-bit depth;

FIG. 24 is block scheme of DecodeCodeAbs Algorithm for Codes having 10-bit depth;

FIG. 25 is illustrating Encoding Initial Grayscale Stream and FIG. 26 is illustrating Encoding Initial True-Color Stream;

FIG. 27 is illustrating Encoding Regular (not Initial) Grayscale Stream and FIG. 28 is illustrating Encoding Regular (not Initial) True-Color Stream;

FIGS. 29, 30 and 31 are referring to the Regularities found in the structure of color images: their statistics are used in the tables;

FIGS. 32-37 illustrate encoded color code compacting/extracting or restoring algorithms for the true-color encoder/decoder module:

FIG. 32 is block scheme of CompactColorDeltaModal Algorithm;

FIG. 33 is block scheme of CompactColorDeltaSigned Algorithm;

FIG. 34 is block scheme of ExtractColorDeltaModal Algorithm;

FIG. 35 is block scheme of ExtractColorDeltaSigned Algorithm;

FIG. 36 is block scheme of RestoreColorCodeModal Algorithm;

FIG. 37 is block scheme of RestoreColorCodeSigned Algorithm;

FIG. 38 illustrates run-length algorithm for the run-length component of compressor module;

FIG. 39 block diagram illustrates the compressor module;

FIGS. 40-42 are used for choosing the optimal method for the encoding of the codes:

FIG. 40 is block scheme of ChooseMethod Algorithm;

FIG. 41 is block scheme of Score Algorithm for True-Color: FIG. 41.1 represents Lossless and FIG. 41.2 represents Near-Lossless Score Algorithm;

FIG. 42 represents StoreMethods Algorithm: FIG. 42.1 is its' block scheme and FIG. 42.2 is an example;

FIGS. 43-48 are illustrations and flowcharts for true-color near-lossless (visually lossless) compression:

FIG. 43 represents Lossy Compacting or RB Transform for an image: FIG. 43.1 is an original image, FIG. 43.2 is the same image after applying RB Transform without Applying Algorithm of Correction, FIG. 43.3 is the image after applying RB Transform with Algorithm of Correction and FIG. 43.4 is map of losses after RB Transform;

FIG. 44 is block scheme of CorrectionInit Algorithm;

FIG. 45 is block scheme of CorrectionApply Algorithm;

FIG. 46 is block scheme of CompactColorDeltaLossy Algorithm;

FIG. 47 is block scheme of ExtractColorDeltaLossy Algorithm;

FIG. 48 is block scheme of RestoreColorCodeLossy Algorithm;

FIGS. 49-53 are variations of converting algorithms for the color code:

FIG. 49 converts with Choosing Algorithm for Indexed-Color/Grayscale Code;

FIG. 50 is Lossless Convert without Choosing Algorithm for True-Color Code;

FIG. 51 is Lossless Convert with Choosing Algorithm for True-Color Code;

FIG. 52 is block scheme of Near-Lossless Convert without Choosing Algorithm for True-Color Code;

FIG. 53 is block scheme of Near-Lossless Convert with Choosing-Algorithm for True-Color Code;

FIG. 54 demonstrates the activity of converter (the main) module: FIG. 54.1 is the action of Converter Module for Indexed-color; FIG. 54.2 is the action of Converter Module for Grayscale and FIG. 54.3 is the action of Converter Module for Lossless (near-lossless) True-Color;

FIG. 55 demonstrates the Regularities via the chart.

4. DETAILED DESCRIPTION OF THE INVENTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant or cellular telephone. Program code is applied to input data to perform the methods described herein and generate output information. The output information is applied to one or more output devices, in known fashion.

In a still other aspect of the invention, the computer program being linked to a computer device and defining on the computer device encoding/decoding and compression/decompression utilities operable to encode/decode, compress/decompress the stream and storing the result compressed unit to a memory storage device or transmitting it.

It should be understood that the method of the present invention may be readily implemented as an algorithm that enables the method(s) of the present invention. A data encoding/compression utility embodying the encoding/compression methods described above to be readily developed by a skilled programmer in a manner that is known. The present invention is not limited to any particular implementation of the present invention, whether in terms of a particular algorithm, computer program or system. For example, implementation of the present invention could be provided by embodying the method of the present invention in a computer chip, or providing the encoding/compression described as a web service. The present invention may be used in numerous market applications such as for lossless medical data compression, video streaming related compressions, image/video storage and retrieval applications, document management systems and so on. It also may be used for storing images in lossy mode, after making some manipulations or transformations with original image/video. As stated earlier, the present invention may be applied in both lossless and lossy image and video compression areas.

Each program is preferably implemented in a high level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the methods described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, Internet transmission or downloading, magnetic and electronic storage media, digital and analog signals, and the like. The computer useable instructions may also be in various forms, including compiled and non-compiled code.

The methods and systems described herein relate generally to methods for encoding and compressing image/video data of various forms. The methods described herein provide steps for selecting an image/video data for encoding/compression; subdividing the image/video data into a series of one or more image/video partition(s) (of rectangle shape); encoding image/video streams; for the image determining compressible units or the manner in which to compress the image partition(s), where a determination is made as to whether to compress the partition in a line by line manner, or the entire partition in its entirety, and further to provide an encoded and compressed image/frame that includes compressed units. An encoded and compressed video frame consists of a single compressed unit.

In a particular aspect of the present invention, the compression techniques used are based on Huffman coding. Other coding/compression techniques may be used so long as they provide suitable compression having regard to the image/video file involved and other related requirements. The present invention also contemplates more particular applications of the overall technique of the present invention for compression of particular images/frames.

Reference is now made to FIG. 5, where a block diagram illustrating a compression/decompression system 0 in an exemplary embodiment is shown. The compression/decompression system 0 causes an image/frame 2 to be compressed to the compressed unit(s) 8 by a compression application 6 that is resident upon or associated with a computing device 4. The compressed units 8 of an image/frame then may be transmitted to the decompression application 12 of another computing device 10, meanwhile next compressed units to be created by the same manner. The receiving computing device 10 has associated with it the decompression application 12 that receives the compressed units 8 and decompresses it to arrive at the image/frame 14, which is either the same or nearly the same original image/frame 2. Image/frame 14 may be near-lossless or it includes not the entire image/frame 2 but its partition(s). The compressed units 8 may be transmitted to other devices through a communication network, or may be transmitted on permanent storage means such as CDs, flash drives, etc.

The compression/decompression system 0 is used to digitally compress images/frames and to transmit those compressed images/frames to recipient computing devices. The images/frames that may be compressed are described in further detail with reference to FIG. 6. The compression application 6 is a software application that is resident upon or accessible to a computing device 4. The compression application performs the respective determinations regarding the encoding and compression, and proceeds to encode and compress the respective image/frame 2. The decompression application is described in further detail with reference to FIG. 7 in an exemplary embodiment.

Reference is now made to FIG. 6, where a block diagram illustrating the components of a compression application is shown in an exemplary embodiment. The compression application 6 in an exemplary embodiment comprises the following modules: an encoder module 16 and a compressor module 20. The compression application 6 may have associated with it various other modules, and the modules that have been described herein are described for purposes of illustrating functionality that is associated with the application 6.

The encoder module 16 is used to generate the respective values that are used to perform the compression methods. The compression application 6 causes streams of image/frame 2 to be converted by an encoder module 16. Then the compression application 6 inputs the output of encoder module 16—the compressible units 18 to be compressed to the compressed units 8 by a compressor module 20. Two modules may work simultaneously, that is, while compressor module 20 is converting compressible unit(s) 18 to compressed unit(s) 8, the encoder module 16 may generate next compressible unit(s) 18.

Reference is now made to FIG. 7, which demonstrates a decompression application 12, whose purpose is the opposite of compression application 6. Decompressor module 22 receives the compressed units 8 and decompresses them to arrive at the original compressible units 18. Then decoder module 24 inputs compressible units 18 and restores an image/frame 14. Here also these two modules (decompressor module 22 and decoder module 24) may work simultaneously.

Compressing digital grayscale or true-color image/frame consists of encoding the image to produce at least one compressible unit by: analyzing the color values of neighboring color codes; determining a delta value and a sign value of the difference between neighboring pixels; optimizing the delta values for compression; and compressing at least one compressible unit.

4.1. Encoder/Decoder Module

Reference is now made to FIG. 8, where a flowchart illustrating the steps of a generalized encoder module 16 is shown. The generalized encoder module 16 is used to illustrate the steps that are common to the specific algorithms that follow. This describes the methods that are the subject of this invention in greater detail. Encoder module 16 outputs Compressible Units 18. Encoder module 16 begins by the splitter module 26, where an image/frame must first be selected for the encoding. The image/frame that is selected may be any type of bitmap image/frame, which may include, but are not limited to indexed-color images, grayscale images or true-color images. Then the selected image/frame may be partitioned according to the predefined map. This step of the algorithm may be omitted if entire image/frame is considered as a partition/stream to be encoded for the compressing. Table creator module 28 generates the respective palette table(s), which is used in the respective encoding operations.

Palette table is optional for grayscale and true-color image partitions/frame streams, thus there are defined 2 modes: absolute and relative. If the grayscale and true-color image partitions/frame streams do not have palette table(s), the mode is absolute. Relative mode needs palette table(s) for excluding absent in the image partitions/frame streams codes to be considered, but absolute mode does not exclude any code which for the n-bit grayscale/color sample codes means the number of considered codes always equals to the $2^n$ for the absolute mode. However, the relative mode requires palette table per image partition/video stream (the palette table may be stored in the header of compressed image partition/video stream). There are not any tough criteria for choosing the mode. Absolute mode is optimally used for photo images and raw data (photography) while relative mode is preferably used for medical imaging, computer graphics or drawings. Generally, relative mode is good for simple images—a lot of grayscale or color sample codes are absent and could be excluded for such simple images with the poor color palette. Relative mode requires palette table(s) of grayscale or color sample codes represented in the image partition/video stream. Here we may introduce another purpose for the partitioning of an image/video. Each partition may be defined according to an image/video data of unique context (like the human face or the sky), then the image partition/frame stream may be stored in the relative mode with context based tables (for example, in the tables of the partition containing the sky would dominate sample codes of variety of blue colors). If the palette table is not predefined, image needs to be pre-scanned for creating the palette table. However, relative mode does not always require pre-scanning of an image. For example, line-by-line processing scanners\fax machines need to avoid pre-scanning of an image for its faster processing (storage/transmission). Monochrome (black and white) papers are efficient to scan and compress in relative mode with a predefined palette table having just two gray codes (black and white).

The encoder module 16 is described further with regards to different methods that may be used depending upon the mode that is employed to save the image/frame. In the case of both, grayscale and true-color images/frames, a palette table may optionally be created. Palette table items are grayscale or color sample codes respectively. Grayscale image partition/video stream either does not have a palette table (absolute mode) or requires only one palette table with grayscale codes (relative mode), while true-color image partition/video stream either does not have a palette table (absolute mode) or requires a table per color sample—three palette tables for color samples of the RGB codes (corresponding to red, blue and green color samples respectively) or four palette tables for color samples of the CMYK image codes (corresponding to cyan, magenta, yellow and black color samples respectively). If the mode is relative, the image/frame stream consists of their indexes from appropriate palette tables instead of grayscale or color sample codes. Indexed-color image/frame stream is always represented by true-color code indexes from the palette table. Palette table is required for the indexed-color image partition/video stream and it includes exclusively the codes used at least once in the image partition/video stream. The codes are arranged by ascending order in the tables of grayscale and true-color partitions. Relative mode may require pre-scanning of the image partition/video stream for creating its palette table. Then, codes of the image/video stream must be replaced by their indexes from the palette table(s) before beginning to encode the stream. The table creator module 28 must be omitted for the absolute mode. Additional modes may be defined in alternative embodiments. The palette table module 28 is described in further detail below.

Converter module 30 is used to perform encoding required to compress the respective images. It encodes and converts the streams to the compressible units. Output of converter module 30 does not depend on the settings of the compressor module 20. For example, it does not care that compressible units 18 are partitions or lines of partition; hence encoding algorithms and encoded output is the same for the both cases. The functionalities of these various modules are described in detail below with regards to the description of the following methods.

Reference is now made to FIG. 9, where the flowchart illustrates decoder module 24 whose functionality is the opposite of the functionality of the encoder module 16. Restorer module 32 (opposite of converter module 30) is for decoding and restoring the streams. It inputs compressible units and outputs the streams. Table liquidator module 34 (like the opposite table creator module 28) must be omitted for the absolute mode of grayscale and true-color. It is either for replacing indexes of the codes by actual codes from the palette table(s) for grayscale and true-color types or for re-indexing the codes by one common palette table for indexed-color type (this module is omitted for single partitioned indexed-color image/video). Assembler module 36 (opposite to splitter module 26) situates the partitions and final restoration of an image/frame 14. This module is omitted if an entire image/frame was considered as a partition.

4.1.1. Converter/Restorer Module

Converter module 30 creates compressible units to be compressed. Converter method may use 3 types of algorithms:
1) Encoding of the indexed color; gray/color code;
2) Lossless/Nearly Lossless compacting encoded color code (this is for the true color streams only); and
3) Scoring the methods of encoding of gray/color code to choose the best one, (this is optional).
Indexed color and grayscale compressible units consist of encoded codes, but color codes of encoded true color streams must be converted into Comp/CompLossy structure of the Set/Lossy type, defined later. FIG. 54 demonstrates indexed-color and grayscale compressible units consisting of encoded codes but the true-color lossless/near-lossless compressible units consist of Comp/CompLossy structures of the Set/SetLossy type.

Optional scoring algorithms, which quantify efficiency of these encoding methods for each gray/color code of the regular stream for choosing the best one, may be applied. Encoding the gray/color code by the chosen indexing/procoding method would be beneficial for the compression (compression rate could be smaller). The gray/color code encoded by the chosen method does not always require the least bits to be stored, but the chosen method has the biggest probability to be the most effective.

4.1.1.1. Encoding/Decoding of Code

Reference is now made to FIG. 10, where Code[s][w] is w-th code of h-th stream 38 of the partition ('s' is the number of the stream in the partition). The Code[s][w] is a numeration of the RGB color (indexed-color) or grayscale code (grayscale) or color sample code (true-color). It is either a numeration of the code in the palette table (grayscale/color, relative mode) or it is grayscale/color sample code itself (grayscale/color, absolute mode). Neighboring codes for the Code[s][w] are Code[s−1][w−1], Code[s−1][w] and Code[s][w−1]. Code[s−1][w−1] and Code[s−1][w] codes belong to the previous stream (which is the previous line for the image and it is a layer of the same partition in the previous frame for the video), and Code[s][w−1] belongs to the same stream.

The encoding/decoding methods are referred to herein generally as horizontal/0, vertical/1 and triangular/2 indexing methods for the codes of the indexed-color stream and as horizontal/0, vertical/1, triangular/2 and square/3 procoding methods for the codes of the grayscale and true-color streams, though any name may be used to refer to them. The present invention provides some flexibility in the stream that may be encoded using different indexing/procoding methods; however, all codes of the first stream of the image/video partition may be encoded only by the horizontal indexing/procoding method.

4.1.1.1.1. Encoding/Decoding of Indexed-Color Code

Here is described the encoder/decoder algorithm more specific for the indexed-color image/video code. Indexed-color images of any format have original palette table. If the image is partitioned, for each image partition/video stream there must be created its original palette table. The methods and systems described herein may be used for processing image/frame types as described above that are in the red, blue and green (RGB) color space, or in the cyan, magenta, yellow and black (CMYK image) color space. The original palette table is unarranged. The indexed-color image partition/video stream has associated with it, as described above, a predefined palette table for the image partition/video stream representing all of the colors that are used in the indexed-color image partition/video stream. For viewing the image partition/video stream on the screen, each code of indexed-color image partition/video stream must be represented in the appropriate pixel of the screen by the appropriate true-color (RGB or CMYK image) code from the palette table. The palette table may include up to 256 colors in an exemplary embodiment, however, the maximum number of colors in a palette table may vary.

FIGS. 11 and 12 are demonstrating the methods of arrangements of original palette table 42 of an indexed-color image/frame if the image/video is not partitioned; or else they are demonstrating the original palette table of an image partition/video stream. Palette table needs to be rearranged to improve compression rates. The palette table is rearranged in such a manner as to emphasize the fact that neighboring pixels have a large probability to be of the same color or to be similar in color to each other.

Depending on the color space that is being used (RGB or CMYK), the following equations may be used to rearrange the palette table. For the RGB color space, the following equation is used to determine the difference:

$$\text{SortValue}(color_1, color_2) = (r_1-r_2)^2 + (g_1-g_2)^2 + (b_1-b_2)^2 \quad \text{Equation 1}$$

In Equation 1, $color_1$ and $color_2$ are color codes from the palette table, $r_1$, $g_1$, $b_1$ and $r_2$, $g_2$, $b_2$ are the red, green, blue sample codes of $color_1$, $color_2$ respectively.

For the CMYK image color space, the following equation can be used:

$$\text{SortValue}(color_1, color_2) = (c_1-C_2)^2 + (m_1-m_2)^2 + (y_1-y_2)^2 + (k_1-k_2)^2 \quad \text{Equation 2}$$

In Equation 2, $color_1$ and $color_2$ are color codes from the palette table, c1, m1, y1, k1 and c2, m2, y2, k2 are the cyan, magenta, yellow, black components of $color_1$, $color_2$ respectively.

SortValue method compares palette table item to another item and based on the result of the method, the palette table is sorted in an ascending manner and each color value is given a sequential index value (FIGS. 11-12).

4.1.1.1.1.1. 1-Dimensional Arrangements of Indexed-Color Palette Table

Reference is made to FIG. 11, from where from original palette table are generated 7 rearranged palette tables—a palette table per color code. Each color code in the palette table is compared to every other entry in the palette table (for example, a second color is compared to a first, third, forth, fifth sixth and seventh colors) for generating its own rearranged palette table. The color codes are compared to one another through the calculation of a color difference (Equations 1 or 2), and based on the result of the SortValue( ) method the palette table listing is sorted in an ascending manner and given a sequential index value.

Once all of the sort values 44, which are the calculated return values of the SortValue( ) method, have been calculated, the method then proceeds to the next step, where the palette tables are then rearranged in ascending order based upon the sort values 44. For example, second rearranged palette table, associated with the second, {255,255,255} color code of the original palette table, has itself as the first color code of the table (because SortValue({255,255,255}, {255,255,255})=0 (SortValue($color_i$, $color_i$)=0)), then comes {128,128,64} color code (SortValue({255,255,255}, {128,128,64})=68739 which is the second smallest value), etc.). If as a result of the above described steps the sort value is identical for several color codes, the respective color codes must have the same precedence in both the original and rearranged palette tables (if there are equal sort values, precedence in the rearranged palette table has the color code which has precedence also in the original (unarranged) palette table 42) (for example, SortValue({255,255,255}, {128,128,64})=SortValue({255,255,255},{64,128,128})= 68739, and in the second rearranged palette table 46 {128, 128,64} color code is before {64,128,128} because it has precedence also in the original palette table 42).

The next step of this algorithm replaces color codes of the rearranged palette tables by their numbers in the original palette table. The result is decoder tables 48. As you can see, the first item of the decoder table coincides with the number of the color code in the original palette table regarding which the color table is built (hence, SortValue($color_i$, $color_i$)=0).

The last step of this algorithm is to generate encoder tables 50, which are reversed (turned) decoder tables 48—if $code_i$ is number 'i' in the decoder table 48, i is number '$code_i$' in the appropriate encoder table 50 (for example, 2 is number '5' in DecoderTable[3] means 5 is number '2' in EncoderTable[3] (numbers are 0-based for both kind of tables)). EncoderTable[i] quantifies difference of code 'i' with others—quantified difference between code 'i' and code 'j' equals to the value of EncoderTable[i][j] (value of item 'j' of EncoderTable[i]). In particular, EncoderTable[i][i] is always 0.

4.1.1.1.1.2. 2-Dimensional Arrangements of Indexed-Color Palette Table

Reference is made to FIG. 12, where the method 2-dimensional arrangements of palette table 50 rearranges the palette table in a different manner and makes use of a pair of SortValue( ) return values, which enables each color code of the original palette table to be compared to every other color code of the original palette table for generating up to $n^2$ rearranged palette tables—a palette table per pair of color codes, 'n' is quantity of color codes of the palette table. The color codes are compared through the calculation of a color difference and based on the sum of two results of the SortValue method (Equations 1 and 2) (SortValue($color_1$, $color_2$,$color_i$)=SortValue($color_1$,$color_i$)+SortValue($color_2$, $color_i$)). The palette table listing is sorted in an ascending manner of the sum and given a sequential index value.

Once all of the sums of sort values 54 have been calculated, the method then proceeds to the next step, where the palette tables are then rearranged in ascending order based upon the sort values 54. As you can see, each rearranged palette table has at least two equal sums of sort values (SortValue($color_1$,$color_2$,$color_1$)=SortValue($color_1$,$color_2$, $color_2$)). Precedence in the rearranged palette table has the color code which has precedence also in the original (unarranged) palette table 42. Such color codes must have the same precedence in both, the original and rearranged palette tables for being identified unambiguously (for example, for entries {255,0,128} and {128,128,64} the SortValue({255, 0,128},{128,128,64}) is the same, but {255,0,128} appears before {128,128,64} in the appropriate rearranged palette table because {255,0,128} is before {128,128,64} also in the original palette table).

Next step of this algorithm replaces color codes of the rearranged palette tables by their numbers in the original palette table. The result is decoder tables 58. DecoderTable [$color_k$, $color_k$] (2-dimensional arrangement) and Decoder-Table[$color_k$] (1-dimensional arrangement) are the same palette tables. It is also obvious that DecoderTable[$color_{k1}$, $color_{k2}$] and DecoderTable[$color_{k2}$,$color_{k1}$] palette tables are identical.

The last step of this algorithm is to generate encoder tables 60, which are reversed (turned) decoder tables 58—if $code_i$ is number 'i' in the decoder table 58, 'i' is number '$code_i$' in the appropriate encoder table 60 (for example, 0 is number '3' in DecoderTable[0,2] means 3 is number '0' in EncoderTable[0,2] (numbers are 0-based for both kind of tables)). EncoderTable[i,j] quantifies difference of code 'i' and 'j' with others—quantified difference between codes 'i', 'j' and code 'k' equals to the value of EncoderTable[i,j][k] (value of item 'k' of EncoderTable[i,j]).

As described further, the horizontal (0) and vertical (1) indexing encoding/decoding methods use generated (encoder tables 50)/(decoder tables 48) for encoding/decoding the indexed-color code. The triangular indexing encoding/decoding method used generated encoder tables 60/decoder tables 58.

4.1.1.1.1.3. Horizontal and Vertical Encoding/Decoding of Indexed-Color Code As described above, depending on the indexing method that is going to be used, different rearranged palette tables are produced. Based upon the use of the vertical or horizontal indexing methods, a comparison is undertaken for every entry in the palette table with every other entry. The palette tables are then reorganized and a separate palette table is created for each color individually. The separate palette tables are rearranged for each color of the palette table, and a palette table is created for each respective neighboring color.

Reference is now made to FIG. 13.1, where a flowchart illustrating the horizontal indexing method of the code 62 of the indexed-color stream is shown in an exemplary embodiment. The Code[s][w−1] value is compared to the Code[s][w] value of the stream using the EncoderTable[Code[s][w−1]] encoder table 50. If that encoder table does not exist yet, it must be created. Code[s][w] of the stream is encoded according EncoderTable[Code[s][w−1]] encoder table 50. Index[s][w][0] is the value of the item number 'Code[s][w]' in the EncoderTable[Code[s][w−1]] encoder table 50 ('0' is the number of the method and indicates the code is indexed by horizontal indexing method).

Also, to decode the code that has been encoded by the horizontal indexing encoding method 62, DecoderTable[Code[s][w−1]] decoder table 48 must be used. If that decoder table does not exist yet, it must be created. That algorithm is demonstrated in FIG. 13.2, where Code[s][w] is the value of the item number 'Index[s][w][0]' in the DecoderTable[Code[s][w−1]] decoder table 48.

Vertical indexing encoding/decoding of the code is similar with the horizontal one, where instead of Code[s][w−1], the neighboring code of the same stream is considered Code[s−1][w] neighboring code of the previous stream. Flowchart of vertical indexing encoding/decoding of the code is demonstrated in FIG. 14, where Index[s][w] is the value of the item number 'Code[s][w]' in the EncoderTable[Code[s−1][w]] encoder table 50 and Code[s][w] is the value of the item number 'Index[s][w][1]' in the DecoderTable[Code[s−1][w]] decoder table 48 ('1' is the number of the method and indicates the code is indexed by vertical indexing method).

4.1.1.1.1.4. Triangular Encoding/Decoding of Indexed-Color Code

The triangular indexing encoding method of the code 66 as depicted in FIG. 15.1 commences by taking the both immediate neighboring codes, one from current stream and another from the previous stream. The Code[s][w−1] and Code[s−1][w] values are compared to the Code[s][w] value using the EncoderTable[Code[s][w−1],Code[s−1][w]] encoder table 60. If that encoder table does not exist yet, it must be created. Code[s][w] of the stream is encoded according EncoderTable[Code[s][w−1],Code[s−1][w]] encoder table 60. Index[s][w][2] is the value of the item number 'Code[s][w]' in the EncoderTable[Code[s][w−1],Code[s−1][w]] encoder table 60 ('2' is the number of the method and indicates the code is indexed by vertical indexing method).

Also, to decode data that has been encoded by the triangular indexing encoding method, DecoderTable[Code[s][w−1],Code[s−1][w]] decoder table 58 may be used. If that decoder table does not exist yet, it must be created. That algorithm is demonstrated in FIG. 15.2, where Code[s][w] is the value of the item number 'Index[s][w][2]' in the DecoderTable[Code[s][w−1],Code[s−1][w]] decoder table 58.

4.1.1.1.2. Encoding/Decoding of Grayscale/True-Color Code

Here is described the encoder algorithm more specific for the grayscale and true-color image/video codes, where colors are represented by either grayscale or true-color sample codes. Grayscale code represents luminance and true-color code represents device-dependent color code. All grayscale and color sample code values range from zero to most intense at the maximum value for the sample depth. Grayscale and true-color sample codes generally have associated with 'n' bits per code, so called n-bit channels, n=8 allows up to 256 code intensities. The Code values below are either grayscale codes or codes of the color samples. Grayscale and color sample codes may or may not be associated with the palette. If the mode is absolute, the codes are represented in the stream by themselves and if the mode is relative, they are represented in the stream by their (0-based) number in the palette table. In the relative mode each image partition/video stream must have own palette table(s, a palette table per color sample) for the grayscale or true-color sample codes used in the image partition/video stream. In the relative mode, if palette table(s) is not predefined, the image partition/video stream must be pre-scanned and palette table(s) must be created for storing the codes found in the scanned image partition/video stream. The codes in the palette table must be arranged by ascending order.

FIG. 18 illustrates the creation of palette table 68 corresponding to the selected grayscale or color sample image partition/video stream 70. After palette table 68 has been created, codes of image partition/video stream 70 are replaced by their enumerations in the palette table 68 (if the mode is absolute, this step of the algorithm is skipped—absolute mode does not consider any palette table). The method then proceeds to the next step where streams of an image partition/video stream are encoded.

Each code of the grayscale or true-color stream needs procode to be encoded. Procode is the nearest (neighboring) already encoded code or the average of such neighboring codes. The code has a large probability to be equal to its procode(s) (initial stream has only one horizontal procode).

A palette variable is used as a size of code palette. It equals to the amount of the codes in the palette table for the relative mode and it equals to $2^n$ for n-bit channel grayscale or color sample codes (for example, for 8-bit channel codes Palette=256) for the absolute mode. Because of procode is the predictable value of the code, both, code and procode are unsigned and they must be less than Palette (for example, for n=8 they must fit into bytes (8 bits)).

Here, taking into consideration the neighboring streams demonstrated in FIG. 19, are given definitions of 4 types of procodes, however, they could be more and they could have different definitions. Procoding methods are used for encoding/decoding of the Code[s][w], which is the current, code 'w' of the stream 's' (s-th stream) of the partition.

Horizontal/0 procode of the Code[s][w] equals to the previous (just encoded) grayscale/color sample code of the current stream: ProCode(Code[s][w])[0]=Code[s][w−1] ('0' is the index of procoding method and indicates the procode is the horizontal one). For the image stream either that is nearest from the left code, if encoder/decoder is running (line is scanning) from the left to the right or that is nearest from the right code, if encoder/decoder is running from the right to the left. Horizontal/0 procoding method of encoding/decoding of the code means encoder/decoder uses horizontal procode for encoding/decoding the code.

Vertical/1 procode of the Code[s][w] equals to the appropriate grayscale/color sample code of the previous (just encoded) stream: ProCode(Code[s][w])[1]=Code[s−1][w] ('1' is the index of procoding of the method and indicates the procode is the vertical one). For the image stream either that is nearest from above code (of the upper line), if encoder/decoder is running from up to down or that is nearest from below code (of the lower line), if encoder/decoder is running from down to up. For the video that is an appropriate code of the previous stream belonging to the previous frame, both codes belong to the same partition. Vertical/1 procoding method of encoding/decoding means encoder/decoder uses vertical procode for encoding/decoding the code.

Triangular/2 procode of the Code[s][w] equals to the arithmetical average of the Code[s][w−1] and Code[s−1][w] codes: ProCode(Code[s][w])[2]=(Code[s][w−1]+Code[s−1][w])/2 ('2' is the index of procoding method and indicates the procode is the triangular one). Triangular/2 procoding method of encoding/decoding means encoder/decoder uses triangular procode for encoding/decoding the code.

Mod(x) method for an 'x' integer is needed for the definition of square procode definition:
Method 1

Mod(x)={x+Palette if x<0; x if 0≤x<Palette; x−Palette if x≥Palette}

FIG. 20 demonstrates the algorithm of calculating Mod (x).

Square/3 procode of the Code[s][w] equals to the Mod(Code[s][w−1]+Code[s−1][w]−Code[s−1][w−1]): ProCode(Code[s][w])[3]=Mod(Code[s][w−1]+Code[s−1][w]−Code[s−1][w−1]) ('3' is the index of procoding method and indicates the procode is the square one). Square/3 procoding method of encoding/decoding means encoder/decoder uses square procode for encoding/decoding the code.

The procoding algorithms of encoding must apply to the grayscale code or to each sample code of ColorCode[s][w] color code. ColorCode[s][w] is color code 'w' (w-th code) of the stream 's' (s-th stream) of the partition. ColorCode[s][w][0], ColorCode[s][w][1] and ColorCode[s][w][2] arrays are codes of red, green and blue color samples respectively (ColorCode[s][w][0], ColorCode[s][w][1], ColorCode[s][w][2] and ColorCode[s][w][3] are codes of cyan, magenta, yellow and black color samples respectively for the CMYK image). ColorProCode[m][s][w] array contains 'm' procodes of appropriate color samples defined (calculated) by the algorithms above. ColorCode[s][w] and ColorProCode[m][s][w] are 3/4 dimensional arrays (RGB/CMYK image). EncodeColorCode and DecodeColorCode algorithms for the color codes just call 3 or 4 times (RGB/CMYK image) the appropriate code encoding/decoding methods defined below—for each color sample individually. These algorithms of encoding/decoding may be incorporated with each of the procode calculation methods described.

4.1.1.1.2.1. EncodeCode/DecodeCode Algorithms for Grayscale/True-Color Code

EncodeCode algorithm is used to encode grayscale or color sample codes. Reference is now made to FIG. 21 where a flow chart illustrating the steps of EncodeCode algorithm 74 is shown in an exemplary embodiment. This algorithm receives two inputs that correspond to the grayscale/color sample code of interest and 'm' procode, calculated by the one of procoding methods defined above (horizontal (m=0); vertical (m=1); triangular (m=2) or square (m=3) and outputs Sign and Delta values for the 'm' procoding method. ProCode[m], Code, Sign[m], Delta[m] and temporary Delta1 generally are n-bit depth unsigned variables. The EncodeCode algorithm in an exemplary embodiment determines a Delta[m] value which is unsigned arithmetic modulo difference between the code and its 'm' procode values. Sign[m] value is the direction of changing (increasing or decreasing) of the 'm' procode for equalizing it to the code. Sign values are 3-based numbers: '0' Sign means procode must be grown (usually, but not always) when procode<code), '1' Sign[m] means it must be reduced (usually, but not always) when procode>code) and '2' Sign means code equals to the procode ((Code==ProCode[m]) and Delta[m]==0). Delta[m] is the modal value of the change. That means if value of the Code is 'Palette-1', growing Code by '1' it will have '0' value and on the contrary, if Code value is '0', reducing it by '1' it will become 'Palette-1'. If the Code is not equal to ProCode[m], it always could be equalized to the ProCode[m] by both ways by increasing or decreasing it. However, EncodeCode algorithm chooses "the shortest" direction to be equalized. That means from '{0,delta1}' and '{1,delta2}' {sign,delta} pair must be chosen the one which Delta is smaller (delta1+delta2=Palette).

Encoding algorithms described here are unique because they do not calculate just differences. The distinctive characteristics of the encoding algorithm are:
1) Maximum possible modulo of difference is not supposed Palette-1 but it is Palette/2, which makes it possible to have less and smaller Delta values;
2) Sign and Delta values of the difference are separated (they are stored in the different variables); and
3) ColorSign and ColorDelta arrays (include Sign and Delta values for the color samples) are considered as a single symbol (for the Huffman coding). It makes it possible to exploit regularities (natural properties) of the image/video and make compression rate more efficient.

Here is the general EncodeCode( ) template method which represents EncodeCode algorithm 74 by the pseudo code for both (absolute and relative) modes. Typename CodeType is BYTE (unsigned char) if 'n' bit depth is less or equal to 8; it is WORD if 'n' bit depth is more than 8 and less or equal to 16 or it is DWORD if 'n' bit depth is more than 16 and less or equal to 32:

Method 2

```
template<typename CodeType> EncodeCode
(CodeType ProCode, CodeType Code,
BYTE& Sign, CodeType& Delta)
{
    if(ProCode==Code) //step 1
    {
        Delta=0; //step 2
        Sign=2;
    }
    else
    {
        if(ProCode>Code) //step 3
        {
            Delta1=ProCode−Code; //step 4
            Delta=Palette−Delta1; //Delta=Palette−ProCode+Code
        }
        else //ProCode<Code
        {
            Delta=Code−ProCode; //step 5
            Delta1=Palette−Delta; //Delta1=Palette−Code+ProCode
        }
        if(Delta1>=Delta) //step 6
        {
            Sign=0; //step 7
        }
        else //Delta1<Delta
        {
            Delta=Delta1; //step 8
            Sign=1;
```

Method 2

```
      }
    }
}
```

For true color code the Method 2 must be called for each color sample code (ColorSign and ColorDelta arrays contain Sign and Delta values for the color sample codes). Method 3 is the template encoder method for the RGB color code of the stream (ColorCode array), and the passed variables are arrays:

Method 3

```
template<typename CodeType>
EncodeColorCode(CodeType[ ] ColorProCode,
  CodeType[ ] ColorCode, BYTE[ ]
  ColorSign, CodeType[ ] ColorDelta)
{
  for(int i=0; i<3; i++)
  {
    EncodeCode<CodeType>(ColorProCode[i],
      ColorCode[i], ColorSign[i], ColorDelta[i]);
  }
}
```

For CMYK color image code EncodeCode( ) must be called not 3 but 4 times.

FIG. 21 demonstrates EncodeCode method 74 algorithm in the flowchart.

The EncodeCode method 74 begins at step 1, where the inputs (ProCode and Code values) are compared. If it is determined at step 1 that their values are equal, method 74 proceeds to step 2. At step 2, the Delta variable is set to equal 0, and the Sign value is set to 2. If it is determined at step 1 that they are not equal, then method 74 proceeds to step 3, where ProCode and Code values are compared again. If ProCode is more than Code, method 74 proceeds to step 4, where temporary variable Delta1 is set to the difference between the ProCode and Code values. Then the Delta value is set to the Palette value minus Delta1 value. Otherwise, if ProCode is less than Code, method 74 proceeds to step 5, which looks like step 4 with switched Delta1 and Delta variables. Delta1 is set to the difference between the ProCode and Code values. Then temporary variable Delta1 value is set to equal the Palette value minus Delta value. If it is determined at step 6 that Delta value is smaller than Delta1 value, method 74 then proceeds to step 7, where Sign is set to 0, otherwise step 8 proceeds and Delta value is set to Delta1 value, and Sign is set to 1.

DecodeCode algorithm 76 is the opposite of the EncodeCode algorithm 74. Here also ProCode, Code, Sign and Delta generally are n-bit depth unsigned variables, but the temporary Code1 variable is a signed variable and it must have n+2 or more bits (one bit for a sign and one extra bit, for fitting any minus/plus result of two n-bit unsigned variables). The algorithm inputs ProCode, Sign and Delta and outputs (restores) the Code. 'Palette' is the same variable defined for EncodeCode algorithm 74. FIGS. 22.1 and 22.2 are the two flowchart variations of DecodeCode algorithm 76, and the template Methods 4.1 and 4.2 below are their representation by the pseudo code:

Method 4.1

```
template<typename CodeType> DecodeCode
  (CodeType ProCode, BYTE Sign,
  CodeType Delta, CodeType& Code)
{
  if(Sign==2) //if(Delta==0)
    Code=ProCode;
  else if(Sign==1)
  {
    Code1=ProCode−Delta;
    if(Code1>=0) //if(ProCode>=Delta)
      Code=Code1;
    else //ProCode<Delta
      Code=Code1+Palette;
  }
  else //Sign==0
  {
    Code1=ProCode+Delta;
    if(Code1<Palette) //if(ProCode+Delta<Palette)
      Code=Code1;
    else //Code1>=Palette
      Code=Code1−Palette;
  }
}
```

Method 4.2

```
template<typename CodeType> DecodeCode
  (CodeType ProCode, BYTE Sign,
  CodeType Delta, CodeType& Code)
{
  if(Sign==2) //if(Delta==0)
  {
    Code=ProCode;
  }
  else if(Sign==1)
  {
    Code=Mod(ProCode−Delta);
  }
  else //Sign==0
  {
    Code=Mod(ProCode+Delta);
  }
}
```

Mod(x) Method 1 is used in this version of the DecodeCode( ).

For true color code the Method 4.1 or Method 4.2 must be called for each color sample code. Method 5 is the appropriate template method for the RGB color code 'w' of the stream 's', and passed variables are arrays:

Method 5

```
template<typename CodeType>DecodeColorCode
  (CodeType[ ] ColorProCode, BYTE[ ]
  ColorSign, CodeType[ ] ColorDelta,
  CodeType[ ] ColorCode)
{
  for(int i=0;i<3;i++)
  {
    DecodeCode<CodeType>(ColorProCode[i],
      ColorSign[i], ColorDelta[i], ColorCode[i]);
  }
}
```

For CMYK color image code DecodeCode( ) must be called not 3 but 4 times.

4.1.1.1.2.1.1. EncodeCodeAbs/DecodeCodeAbs Algorithms for Grayscale/True-Color Code For these particular cases, when the mode is absolute and 'Palette' is $2^n$, it becomes possible to avoid having comparisons in the encoding algorithm, making its code smaller and faster. The type of ProCode, Code and Delta is BYTE (unsigned char) if 'n' is less or equal to 8; it is WORD if 'n' is more than 8 and less or equal to 16 or it is DWORD if 'n' is more than 16 and less or equal to 32. In the EncodeCodeAbs, only the lowest 'n' bits of the variables of the algorithm are taken into consideration. The rest of the bits (including the highest sign bit) must be discarded. EncodeCodeAbs10 algorithm is the sample of EncodeCodeAbs algorithm for n=10 and it is demonstrated in the FIG. 23.

SIGN and DELTA arrays have 1024 items. The first item of the SIGN array is '2', next 511 items are '0' and the last 512 items are '1'. The first 512 items of the DELTA array rang from '0' to '511' in ascending order, last 512 items rang from '512' to '1' in descending order. '&' is the operator of conjunction (C/C++ language). Calculation of the square procode also could be simplified for EncodeCodeAbs/DecodeCodeAbs Algorithms: ProCode(Code[s][w])[3]=Code[s][w−1]+Code[s−1][w]−Code[s−1][w−1]&Filter, where Filter=$2^{10}$−1.

Appropriate DecodeCodeAbs10 algorithm, the DecodeCodeAbs algorithm for n=10, is demonstrated in the FIG. 24.

EncodeAbsColorCode/DecodeAbsColorCode algorithms for the color codes just apply EncodeAbsCode/DecodeAbsCode algorithm for each color sample individually.

If the mode is absolute and bit depth of the codes is 8-bit (BYTE); 16-bit (WORD); 32-bit (DWORD); etc., it is possible to use simplified and better (smaller and faster) algorithms of encoding and get Sign and Delta values faster. Pseudo codes of such algorithms are represented below for the absolute mode of 8-bit; 16-bit; 32-bit depth codes respectively. The value of the Palette is '256' ('$2^8$'); 65536 ('$2^{16}$'); 4294967296 ('$2^{32}$') respectively. These algorithms may also be incorporated into each of the procoding methods described. Calculation of the square procode also could be simplified for algorithms of EncodeCodeAbsX/DecodeCodeAbsX family: ProCode(Code[s][w])[3]=Code[s][w−1]+Code[s−1][w]−Code[s−1][w−1] (signed result of the Code[s][w−1]+Code[s−1][w]−Code[s−1][w−1] expression must fit into unsigned byte (BYTE); unsigned two bytes (WORD) or unsigned four bytes (DWORD) respectively). These cases (when mode is absolute and bit depth of the codes is 8 bit; 16 bit and 32 bit) also have own algorithms for faster decoding.

4.1.1.1.2.1.1.1. Encodecodeabs8/Decodecodeabs8 Algorithm for Grayscale/True-Color Code SIGN and DELTA constant arrays have 256 items. The first item of the SIGN array is '2', next 127 items are '0' and last 128 items are '1'. The first 128 items of the DELTA array rang from '0' to '127' in ascending order, last 128 items rang from '128' to '1' in descending order:

| Method 6 |
|---|
| const BYTE SIGN[256]={2,0,0,0,0,0,0,0,0,0,0,0,0,0,0,0,0,0,0,0,0,0,0,0,0, 0,0,0,0,0,0,0,0,0,0,0,0,0,0,0,0,0,0,0,0,0,0,0,0,0,0,0,0,0,0,0,0,0,0,0,0,0,0,0,0, 0,0,0,0,0,0,0,0,0,0,0,0,0,0,0,0,0,0,0,0,0,0,0,0,0,0,0,0,0,0,0,0,0,0,0,0,0,0,0,0, 0,0,0,0,0,0,0,0, 1,1,1,1,1,1,1,1,1,1,1,1,1,1,1,1,1,1,1,1,1,1,1,1,1,1,1,1,1,1,1,1,1,1,1,1,1,1,1,1,1, 1,1,1,1,1,1,1,1,1,1,1,1,1,1,1,1,1,1,1,1,1,1,1,1,1,1,1,1,1,1,1,1,1,1,1,1,1,1,1,1,1, 1,1,1,1,1,1,1,1,1,1,1,1,1,1,1,1,1,1,1,1,1,1,1,1,1,1,1,1,1,1,1}; const BYTE DELTA[256]={0,1,2,3,4,5,6,7,8,9,10,11,12,13,14,15,16,17,18, 19,20,21,22,23,24,25,26,27,28,29,30,31,32,33,34,35,36,37,38,39,40,41,42,43,44,45,46, 47,48,49,50,51,52,53,54,55,56,57,58,59,60,61,62,63,64,65,66,67,68,69,70,71,72,73,74, 75,76,77,78,79,80,81,82,83,84,85,86,87,88,89,90,91,92,93,94,95,96,97,98,99,100,101, 102,103,104,105,106,107,108,109,110,111,112,113,114,115,116,117,118,119,120,121, 122,123,124,125,126,127, 128,127,126,125,124,123,122,121,120,119,118,117,116,115,114,113,112,111,110,109, 108,107,106,105,104,103,102,101,100,99,98,97,96,95,94,93,92,91,90,89,88,87,86,85,8 4,83,82,81,80,79,78,77,76,75,74,73,72,71,70,69,68,67,66,65,64,63,62,61,60,59,58,57,5 6,55,54,53,52,51,50,49,48,47,46,45,44,43,42,41,40,39,38,37,36,35,34,33,32,31,30,29,2 8,27,26,25,24,23,22,21,20,19,18,17,16,15,14,13,12,11,10,9,8,7,6,5,4,3,2,1}; /\*BYTE is the unsigned variable type and the signed result of ProCode−Code (which could be negative). It must fit into a byte (discarding the sign and the highest (9-th) bits)\*/ EncodeCodeAbs8(BYTE ProCode, BYTE Code, BYTE& Sign, BYTE& Delta) {   BYTE Difference=ProCode−Code;   Sign=SIGN[Difference];   Delta=DELTA[Difference]; } |

| Method 7 |
|---|
| //for the RGB color code<br>EncodeColorCodeAbs8(BYTE[ ] ColorProCode,<br>BYTE[ ] ColorCode, BYTE[ ] ColorSign,<br>BYTE[ ] ColorDelta)<br>{<br>for(int i=0;i<3;i++)<br>  {<br>    EncodeCodeAbs8(ColorProCode[i], ColorCode[i],<br>    ColorSign[i], ColorDelta[i]);<br>  }<br>}<br>//for the CMYK color image code repeat the same 4 times |

| Method 8 |
|---|
| /\*BYTE is the unsigned variable type and ProCode−Delta (which could be<br>negative) and ProCode+Delta (which could be more than '255' ('$2^8$-1')).<br>It<br>must fit into a byte (discarding the sign and the highest (9-th) bits)\*/<br>DecodeCodeAbs8(BYTE ProCode, BYTE Code, BYTE Delta)<br>{<br>  if(Sign==2)<br>    Code=ProCode;<br>  else if(Sign==1) |

Method 8 (continued)

```
    {
        Code=ProCode-Delta;
    }
    else
    {
        Code=ProCode+Delta;
    }
}
```

Method 9

```
//for the RGB color code
DecodeColorCodeAbs8(BYTE  ColorProCode,
BYTE  ColorSign,  BYTE  ColorDelta,
BYTE ColorCode)
{
    for(int i=0;i<3;i++)
    {
        DecodeCodeAbs8(ColorProCode[i], ColorSign[i],
        ColorDelta[i], ColorCode[i])
    }
}
        //for the CMYK color image code repeat the same 4
times
```

4.1.1.1.2.1.1.2.  EncodeCodeAbs16/DecodeCodeAbs16 Algorithm for Grayscale/True-Color Code SIGN and DELTA constant arrays have 65536 items. The first item of the SIGN array is '2', next 32767 ($2^{15}-1$) items are '0' and last 32768 ($2^{15}$) items are '1'. The first 32768 ($2^{15}$) items of the DELTA array rang from '0' to '32767' ('$2^{15}-1$') in ascending order, last 32768 ($2^{15}$) items rang from '32768' ('$2^{15}$') to '1' in descending order.

Method 10

```
const BYTE SIGN[65536]={2,0,0,...,0,0,1,1,...,1,1};
const BYTE DELTA[65536]={0,1,2,3,...,32765,32766,32767,32768,32767,
32766,...,3,2,1};
/*WORD is the unsigned variable type and the signed result of ProCode-Code (which
could be negative). It must fit into two bytes (discarding the sign and the highest (17-th)
bits)*/
EncodeCodeAbs16(WORD ProCode, WORD Code, BYTE& Sign, WORD& Delta)
{
    WORD Difference=ProCode-Code;
    Sign=SIGN[Difference];
    Delta=DELTA[Difference];
}
```

Method 11

```
//for the RGB color code
EncodeColorCodeAbs16(WORD[ ] ColorProCode, WORD[ ] ColorCode, BYTE[ ]
ColorSign, WORD[ ] ColorDelta)
{
    for(int i=0;i<3;i++)
    {
        EncodeCodeAbs16(ColorProCode[i], ColorCode[i], ColorSign[i], ColorDelta[i])
    }
}
//for the CMYK color image code, repeat the same 4 times
```

Method 12

```
/*WORD is the unsigned variable type and ProCode-Delta (which could be negative)
and ProCode+Delta (which could be more than '65535' ('216-1')) . It must fit into two
bytes (discarding the sign and the highest (17-th) bits)*/
DecodeCodeAbs16(WORD ProCode, BYTE Sign, WORD Delta, WORD& Code)
{
if(Sign==2)
Code=ProCode;
else if(Sign==1)
    {
    Code=ProCode-Delta;
    }
else
    {
    Code=ProCode+Delta;
    }
}
```

| Method 13 |
| --- |

```
//for the RGB color code
DecodeColorCodeAbs16(WORD[ ] ColorProCode, BYTE[ ] ColorSign, WORD[ ]
ColorDelta, WORD[ ] ColorCode)
{
   for(int i=0;i<3;i++)
   {
      DecodeCodeAbs16(ColorProCode[i], ColorSign[i], ColorDelta[i], ColorCode[i]);
   }
}
//for the CMYK color image code repeat the same 4 times
```

4.1.1.1.2.1.1.3. EncodeCodeAbs32/DecodeCodeAbs32 Algorithm for Grayscale/True-Color Code Note for software programmers: here you must be sure that the signed result of ProCode-Code expression is stored in not 32-bit but in 64-bit integer before fitting it to the Difference variable . . . .

SIGN and DELTA constant arrays have 4294967296 items. The first item of the SIGN array is '2', next 2147483647 ($2^{31}-1$) items are '0' and last 2147483648 ($2^{31}$) items are '1'. The first 2147483648 ($2^{31}$) items of the DELTA array rang from '0' to '2147483647' ('$23^{1}-1$') in ascending order, last 2147483648 ($2^{31}$) items rang from '2147483648' ('$2^{31}$') to '1' in descending order.

| Method 14 |
| --- |

```
const BYTE SIGN[4294967296]= {2,0,0,...,0,0,1,1,...,1,1};
const BYTE DELTA[4294967296]={0,1,2,3,...,2147483645,2147483646,
2147483647,2147483648,2147483647,2147483646,...,3,2,1};
/*DWORD is the unsigned variable type and the signed result of the ProCode-Code
(which could be negative). It must fit into four bytes (discarding the sign and the highest
(33-th) bits)*/
EncodeCodeAbs32(DWORD ProCode, DWORD Code, BYTE& Sign, DWORD& Delta)
{
   DWORD Difference=ProCode-Code;
   Sign=SIGN[Difference];
   Delta=DELTA[Difference];
}
```

| Method 15 |
| --- |

```
//for the RGB color code
EncodeColorCodeAbs32(DWORD[ ] ColorProCode, DWORD[ ] ColorCode, BYTE[ ]
ColorSign, DWORD[ ] ColorDelta)
{
for(int i=0;i<3;i++)
   {
      EncodeCodeAbs32(ColorProCode[i], ColorCode[i], ColorSign[i], ColorDelta[i]);
   }
}
//for the CMYK color image code, repeat the same 4 times
```

| Method 16 |
| --- |

```
/*DWORD is the unsigned variable type and ProCode-Delta (which could be negative)
and ProCode+Delta (which could be more than '4294967295' ('2^32-1')). It must fit into
four bytes) (discarding the sign and the highest (33-th) bits)*/
DecodeCodeAbs32(DWORD ProCode, BYTE Sign, DWORD Delta, DWORD& Code)
{
if(Sign==2)
Code=ProCode;
else if(Sign==1)
   {
   Code=ProCode-Delta;
   }
else
   {
   Code=ProCode+Delta;
   }
}
```

| Method 17 |
| --- |

```
//for the RGB color code
DecodeColorCodeAbs32(DWORD[ ] ColorProCode, BYTE[ ] ColorSign, DWORD[ ]
ColorDelta, DWORD[ ] ColorCode)
{
   for(int i=0;i<3;i++)
   {
      DecodeCodeAbs32(ColorProCode[i], ColorSign[i], ColorDelta[i], ColorCode[i]);
   }
}
//for the CMYK image color code, repeat the same 4 times.
```

As stated, the present invention provides for the processing of true-color images of either the RGB or the CMYK color spaces. Similarly to the grayscale image encoding, if the mode is relative, the true-color image partition/video stream requires a palette table per sample to be constructed.

The true-color encoding is generally performed in the same manner as the encoding of the grayscale image making use of the one of four modular methods (horizontal, vertical, triangle and square) for all color samples of the stream and returning Delta and Sign values.

4.1.1.2. Encoding/Decoding of Initial Indexed-Color Stream

Codes of initial indexed-color stream may be encoded/decoded only by horizontal indexing method because initial stream does not have a previous one, but vertical and triangular indexing encoding/decoding methods of the code require a neighboring code from the previous stream. As depicted in FIG. 16.1, the first code of the initial indexed-color stream is not encoded—it hasn't its previous code to be encoded. For encoding second: Code[0][1] code of the stream, EncoderTable[Code[0][0]] must be created, then Code[0][1] must be encoded according horizontal indexing encoding method of the code 62. Then each next Index[0][0][w] must be calculated by this algorithm: if EncoderTable[Code[0][w−1]] does not exists yet, it must be created, then Code[0][w] must be encoded according horizontal indexing encoding method of the code 62, using EncoderTable[Code[0][w−1]]: Index[0][w][0]=EncoderTable[Code[0][w−1]][Code[0][w]]. After finishing to encode the last code of the stream, we will have up to 'n' encoder tables 50 (n is the number of color codes in the palette tables). These tables we need to keep for horizontal/vertical encoding of the codes of next, regular indexed-color streams described below. FIG. 16.2 is the example of encoding indexed-color stream to the encoded stream. Here are calculated values of compressible unit 18: 4=EncoderTable[1][4], 0=EncoderTable[4][4], 4=EncoderTable[4][6], 1=EncoderTable[6][2], 5=EncoderTable[2][0], etc.

Decoding codes of initial indexed-color stream is reverse algorithm, using horizontal indexing decoding method of the code 62 and decoder tables 48: Code[0][w]=DecoderTable[Code[0][w−1]][Index[0][0][w]], where w≥1.

4.1.1.3. Encoding/Decoding of Regular Indexed-Color Stream

Codes of regular indexed-color stream may be encoded/decoded by different indexing methods, except first one. First code may be encoded/decoded only by vertical indexing method 64 because it hasn't previous neighboring codes. In FIG. 17 s>0 and it is the number of partition line for an image and it is a frame number for a video. The first code of the regular indexed-color stream is encoded by vertical indexing method 64. For the rest 'w' codes if EncoderTable[Code[s][w−1]]; EncoderTable[Code[s−1][w]] or EncoderTable[Code[s][w−1],Code[s−1][w]] does not exists yet, it must be created. If scoring algorithm will not be applied, each current Code[s][w] must be encoded by one indexing method (applied 'm' methods could be same for all codes, for example all codes could be encoded by triangular indexing method), using appropriate encoder tables (EncoderTable[Code[s][w−1]] is for the horizontal, EncoderTable[Code[s−1][w]] is for the vertical and EncoderTable[Code[s][w−1],Code[s−1][w]] is for the triangular indexing methods). Else (if scoring algorithm will be applied), each current Code[s][w] must be encoded by all three indexing methods, using appropriate encoder tables (EncoderTable[Code[s][w−1]] is for the horizontal, EncoderTable[Code[s−1][w]] is for the vertical and EncoderTable[Code[s][w−1],Code[s−1][w]] is for the triangular indexing methods) for choosing the optimal one from three Index[m][s][w] values (an index value per indexing method). Optimal one may be chosen by applying scoring algorithm described below. If stream is the frame stream, scoring could be skipped and codes could be calculated only by the vertical method, because vertical one is usually the best for the video—appropriate code of the previous stream belongs to the previous frame and usually have a little difference with the current one . . . .

After finishing to encode the last code of the stream, we will have up to 'n' encoder tables 50 and up to n² encoder tables 60 ('n' is quantity of color codes in the palette tables). These tables we need to keep for encoding the rest regular indexed-color streams.

Regular indexed-color stream is decoded by reverse algorithm, using the indexing methods and decoder tables 48 and 58.

4.1.1.4. Encoding/Decoding of Initial Grayscale/Lossless True-Color Stream

If the mode is relative and once the palette tables have been created for the current image partition/video stream, grayscale/color sample codes of initial encoding stream must be replaced by their enumerations or numbers in the palette table and the initial stream must be encoded.

Codes of initial grayscale/true-color stream may be encoded/decoded only using horizontal procodes because initial stream hasn't previous one but vertical, triangular and square procoding methods of the code require neighboring code(s) from the previous stream. As depicted in FIGS. 25, 26, the first gray/color code of the initial grayscale/true-color stream is not encoded—it is impossible to calculate its (horizontal) procode. For the rest of gray/color codes of the stream must be used their horizontal procodes (which are previous gray/color code) and they must be encoded by appropriate gray/color code encoding method of the EncodeCode/EncodeColorCode family defined above (encoding method must be chosen according the mode and the type (bit depth) of the gray/color codes). The output is encoded stream.

Decoding codes of initial grayscale/true-color stream is reverse algorithm—all Sign and Delta values of the initial encoded stream must be decoded by appropriate gray/color code decoding method of the DecodeCode/DecodeColorCode family (again, the encoding method must be chosen according the mode and the type (bit depth) of the gray/color codes) for restoring the initial stream.

4.1.1.5. Encoding/Decoding of Regular Grayscale/Lossless True-Color Stream

If the mode is relative, all gray/color codes of the encoding image partition or video stream must be replaced by their enumerations or numbers in the palette table and the stream must be encoded.

The following description is encoding of gray/color sample code of the stream in an exemplary embodiment. s>0 and it is the number of partition line for an image or it is a number of the frame for a video.

Used procoding methods for the encoding of the gray/color sample codes of regular grayscale/true-color stream may be discretionary (they could use any procoding method), except for the first gray/color code. Used procode(s) of the first gray/color code may be encoded only by vertical method (it does not have a previous neighboring gray/color code). In FIGS. 27, 28 procoding method of the first gray/color code of the regular grayscale/true-color stream is a vertical one. If scoring algorithm will not be applied, each next Code[s][w] may be encoded by one procoding method (applied 'm' methods could be same for all codes, for example all codes could be encoded by square procoding method). Otherwise, if scoring algorithm will be applied, each next Code[s][w] may be encoded by all four procoding methods for the scoring algorithm (described later) for choosing the optimal {Sign[mw][s][w],Delta[mw][s][w]}/{ColorSign[mw][s][w],ColorDelta[mw][s][w]} pair. The video scoring could be skipped and codes could be calculated only by vertical procodes, because the vertical one is usually the best for the video (appropriate code of the previous stream belongs to the previous frame and it usually has a little difference with the current one). The output is encoded stream.

Decoding codes of regular grayscale/true-color stream is the reverse to the encoding algorithm—all Sign and Delta values of the encoded stream must be decoded by appropriate decoding method of the DecodeCode/DecodeColorCode family (again, encoding method must be chosen according the mode and the type (bit depth) of the gray/color codes) for restoring the regular stream.

4.1.1.6. Regularities

These regularities are found for the encoded stream(s) by the empiric way, analyzing statistical data of the encoded streams. They are defined for the true-color (and grayscale) image/frame stream(s) as well as for the compressible unit(s) 18 and they are statistically stated and demonstrated on randomly chosen pictures whose drafts are listed:

FIG. 29 (Portrait, RGB color, 1600×1200);
FIG. 30 (Landscape, RGB color, 1600×1200); and
FIG. 31 (Lena, grayscale, 512×512)

The statistics represented in tables are for an entire image because it is obvious that if these regularities are true for an encoded stream (which is an encoded line for an image), they are also true for the more than one streams (for an entire image). The image color sample codes are encoded for all horizontal, vertical, triangular and square procodes and statistics are given for each procode separately.

Regardless of the fact that the statistics for the CMYK color images and video are not represented here, the regularities are true also for the CMYK color image stream(s) and for the video stream(s).

4.1.1.6.1. Similarity of ColorSign Values

This regularity exposes the similarity of Sign values of color sample codes (values of ColorSign array) for encoded true-color stream(s).

For any respective procoding method significant percentage of ColorSign arrays of the true-color encoded image/video stream(s) has the same Sign value for all color samples. That means that a significant percentage of ColorSign arrays equal {0,0,0}; {1,1,1} or {2,2,2}. That can be otherwise stated as the vast majority of true-color codes of the stream(s) have color sample codes which change of intensity either more or less or stable for all of the sample codes regarding to their considered procodes. Further, while this regularity pattern holds true for all procodes, it is particularly true for the square procode which has demonstrated the most quantity of {2,2,2} ColorSign arrays as well as the most quantity of {0,0,0} and {1,1,1} ColorSign arrays for a given image.

Table 1 below statistically demonstrates this regularity for all four types of procodes (statistics for the vertical, triangular and square prodding methods are without the first line of an image because the initial stream can be encoded only using horizontal procode). As you see, the quantity of ColorSign arrays having the same digits ({0,0,0}, {1,1,1} and {2,2,2} ColorSign arrays) is significant for all procodes.

TABLE 1

| ColorSign | Horizontal Procode | | Vertical Procode | | Triangular Procode | | Square Procode | |
| --- | --- | --- | --- | --- | --- | --- | --- | --- |
| | Landsc. Qty | Portrait Qty | Landsc. Qty | Portrait Qty | Landsc. Qty | Portrait Qty | Landsc. Qty | Portrait Qty |
| {2,2,2} | 922296 | 248791 | 675735 | 158880 | 701718 | 139458 | 1015716 | 309933 |
| {0,0,0} | 387741 | 616259 | 483662 | 600699 | 526612 | 635672 | 353326 | 587644 |
| {1,1,1} | 396451 | 625519 | 513744 | 543779 | 377596 | 452965 | 353383 | 588515 |
| All 3 above | 1706488 | 1490569 | 1673141 | 1303358 | 1605926 | 1228095 | 1722425 | 1486092 |
| All 27 | 1920000 | 1920000 | 1918400 | 1918400 | 1918400 | 1918400 | 1918400 | 1918400 |
| Percentage | 88.88% | 77.63% | 87.22% | 67.94% | 83.71% | 64.02% | 89.78% | 77.47% |

FIG. 55 chart also demonstrates or hints this similarity. X-axis is the quantity of Sign values for all color samples of the encoded streams having the same (either '2' or '0' or '1') values uninterruptedly; Y-axis is their quantity. As you may notice, this chart has maximal values for the 'y', when the 'x' is 3, 6, 9, etc. This indicates that in the encoded streams such Sign intervals are dominating (like " . . . 221000111 . . . "; " . . . 001222000 . . . "; " . . . 222111212 . . . "; " . . . 002000000101 . . . "; " . . . 000222222012 . . . "; " . . . 120111111111210 . . . " etc.). This chart also is demonstrating this regularity as the most expressed for the square procode and the list—for the horizontal one.

4.1.1.6.2. Similarity of ColorDelta Values

This regularity exposes the similarity of Delta values of color sample codes (values of ColorDelta array) for encoded true-color code. As described below, the ColorDelta arrays have similarities associated with the individual values that make up the ColorDelta arrays. This similarity is referenced herein as regularity, which is statistically observable.

For any respective procoding method a significant percentage of ColorDelta arrays of the true color encoded image/video stream(s), associated with {0,0,0} or {1,1,1} ColorSign, have the same or slightly different non-zero values for all color samples. That can be further stated as, the vast majority of true-color codes of the stream(s) have color sample codes whose intensity are either increasing or decreasing by the same or nearly the same value for all of the sample codes regarding to their considered procodes. The vast majority of ColorDelta arrays of the encoded stream(s) have the same non-zero values for the all color samples or their differences are minimal (for example, {29,29,29}; {10,11,1} or {19,20,22}).

The Table 2 below provides statistics for this regularity regarding all four procoding methods. The rows of the table represent quantities of the appropriate ColorDelta arrays, associated with {0,0,0} or {1,1,1} ColorSign arrays and having the same value for all color samples, 'Total Quantity' is the sum of these quantities and 'All Quantity' is the quantity of all ColorDeltas arrays of an image associated with {0,0,0} or {1,1,1} ColorSign arrays. It is obvious the percentage (<Total Quantity>/<All Quantity>*100%) of such ColorDelta arrays (having equal values) is significant. and it is also important to take into consideration that the quantity of all ColorDelta values of an image associated with {0,0,0} or {1,1,1} ColorSign arrays and having nearly the same value for all color samples (like {10,10,8} or {10,12,11}) is also significant (such ColorDelta values even aren't represented in this table). As you see in the table below, this regularity is most expressed for the square procode.

TABLE 2

| ColorDelta associated with { 0,0,0 }/{ 1,1,1 } ColorSign | Horizontal Procode | | Vertical Procode | | Triangular Procode | | Square Procode | |
|---|---|---|---|---|---|---|---|---|
| | Landsc. | Portrait | Landsc. | Portrait | Landsc. | Portrait | Landsc. | Portrait |
| { 1,1,1 } | 287134 | 334435 | 291519 | 226551 | 321958 | 177543 | 291938 | 367549 |
| { 2,2,2 } | 87168 | 158566 | 156489 | 110730 | 108669 | 67837 | 88141 | 138948 |
| { 3,3,3 } | 43368 | 80963 | 89347 | 56203 | 45060 | 29499 | 45152 | 67447 |
| { 4,4,4 } | 26920 | 46590 | 54365 | 32382 | 21972 | 15250 | 28824 | 37872 |
| { 5,5,5 } | 18478 | 28303 | 34448 | 20730 | 12468 | 8810 | 19230 | 23781 |
| { 6,6,6 } | 12900 | 18021 | 22077 | 13507 | 7522 | 5391 | 13302 | 15979 |
| { 7,7,7 } | 9616 | 12174 | 15135 | 9372 | 5279 | 3486 | 9643 | 11178 |
| { 8,8,8 } | 7261 | 8520 | 10671 | 6708 | 3803 | 2466 | 7202 | 7952 |
| { 9,9,9 } | 5630 | 6238 | 7805 | 4669 | 2949 | 1856 | 5439 | 5941 |
| { 10,10,10 } | 4594 | 4853 | 5739 | 3575 | 2262 | 1414 | 4257 | 4626 |
| { 11,11,11 } | 3753 | 3713 | 4329 | 2778 | 1848 | 1124 | 3472 | 3520 |
| { 12,12,12 } | 3139 | 3068 | 3218 | 2314 | 1514 | 903 | 2695 | 2910 |
| { 13,13,13 } | 2689 | 2417 | 2532 | 1808 | 1276 | 747 | 2261 | 2306 |
| { 14,14,14 } | 2248 | 2209 | 2053 | 1446 | 1138 | 650 | 1745 | 1972 |
| { 15,15,15 } | 1923 | 1745 | 1633 | 1311 | 964 | 570 | 1556 | 1642 |
| { 16,16,16 } | 1718 | 1614 | 1376 | 1065 | 839 | 497 | 1239 | 1413 |
| { 17,17,17 } | 1559 | 1391 | 1134 | 956 | 771 | 483 | 1044 | 1277 |
| { 18,18,18 } | 1340 | 1248 | 943 | 782 | 635 | 438 | 896 | 1060 |
| { 19,19,19 } | 1225 | 1135 | 804 | 688 | 635 | 359 | 816 | 941 |
| { 20,20,20 } | 1106 | 1088 | 686 | 684 | 557 | 334 | 667 | 810 |
| { 21,21,21 } | 960 | 887 | 584 | 558 | 499 | 300 | 556 | 751 |
| { 22,22,22 } | 991 | 832 | 469 | 489 | 430 | 269 | 531 | 675 |
| { 23,23,23 } | 931 | 750 | 445 | 446 | 440 | 245 | 406 | 587 |
| { 24,24,24 } | 797 | 641 | 353 | 391 | 372 | 186 | 333 | 502 |
| { 25,25,25 } | 722 | 622 | 284 | 351 | 346 | 190 | 290 | 485 |
| { 26,26,26 } | 775 | 574 | 260 | 330 | 285 | 188 | 240 | 391 |
| { 27,27,27 } | 684 | 554 | 210 | 310 | 255 | 201 | 227 | 342 |
| { 28,28,28 } | 616 | 539 | 183 | 266 | 238 | 185 | 189 | 312 |
| { 29,29,29 } | 645 | 466 | 172 | 251 | 217 | 130 | 132 | 288 |
| { 30,30,30 } | 663 | 439 | 145 | 232 | 213 | 145 | 124 | 257 |
| { 31,31,31 } | 543 | 394 | 153 | 187 | 157 | 120 | 130 | 237 |
| { 32,32,32 } | 548 | 392 | 126 | 198 | 150 | 128 | 98 | 212 |
| { 33,33,33 } | 519 | 377 | 105 | 190 | 117 | 101 | 97 | 211 |
| { 34,34,34 } | 478 | 342 | 93 | 188 | 111 | 103 | 99 | 178 |
| { 35,35,35 } | 484 | 349 | 80 | 168 | 84 | 95 | 82 | 150 |
| { 36,36,36 } | 437 | 330 | 72 | 127 | 82 | 91 | 72 | 134 |
| { 37,37,37 } | 465 | 330 | 65 | 151 | 69 | 69 | 43 | 128 |
| { 38,38,38 } | 419 | 282 | 59 | 143 | 58 | 74 | 38 | 125 |
| { 39,39,39 } | 401 | 263 | 64 | 122 | 52 | 55 | 36 | 103 |
| { 40,40,40 } | 387 | 250 | 62 | 133 | 43 | 49 | 31 | 99 |
| { 41,41,41 } | 387 | 259 | 41 | 118 | 39 | 49 | 29 | 90 |
| { 42,42,42 } | 338 | 224 | 49 | 122 | 31 | 48 | 32 | 83 |
| { 43,43,43 } | 363 | 210 | 39 | 117 | 28 | 32 | 32 | 64 |
| { 44,44,44 } | 313 | 231 | 34 | 77 | 21 | 33 | 14 | 83 |
| { 45,45,45 } | 279 | 201 | 35 | 82 | 12 | 39 | 12 | 58 |
| { 46,46,46 } | 294 | 184 | 27 | 75 | 21 | 39 | 13 | 44 |
| { 47,47,47 } | 280 | 164 | 28 | 75 | 11 | 39 | 19 | 35 |
| { 48,48,48 } | 249 | 151 | 38 | 77 | 8 | 22 | 16 | 45 |
| { 49,49,49 } | 245 | 160 | 15 | 59 | 11 | 26 | 15 | 44 |

TABLE 2-continued

| ColorDelta associated with { 0,0,0 }/{ 1,1,1 } ColorSign | Horizontal Procode | | Vertical Procode | | Triangular Procode | | Square Procode | |
|---|---|---|---|---|---|---|---|---|
| | Landsc. | Portrait | Landsc. | Portrait | Landsc. | Portrait | Landsc. | Portrait |
| { 50,50,50 } | 228 | 158 | 26 | 63 | 11 | 28 | 8 | 32 |
| { 51,51,51 } | 222 | 149 | 19 | 56 | 11 | 23 | 8 | 34 |
| { 52,52,52 } | 218 | 134 | 13 | 51 | 4 | 22 | 6 | 39 |
| { 53,53,53 } | 198 | 125 | 15 | 50 | 5 | 21 | 3 | 29 |
| { 54,54,54 } | 204 | 112 | 11 | 56 | 7 | 11 | 7 | 19 |
| { 55,55,55 } | 178 | 121 | 5 | 40 | 6 | 20 | 6 | 26 |
| { 56,56,56 } | 176 | 117 | 9 | 56 | 4 | 13 | 2 | 10 |
| { 57,57,57 } | 150 | 98 | 13 | 43 | 2 | 18 | 4 | 16 |
| { 58,58,58 } | 146 | 105 | 11 | 38 | 3 | 11 | 1 | 19 |
| { 59,59,59 } | 137 | 83 | 7 | 47 | 1 | 10 | 2 | 16 |
| { 60,60,60 } | 124 | 70 | 5 | 30 | 3 | 6 | 3 | 14 |
| { 61,61,61 } | 119 | 80 | 3 | 38 | 0 | 8 | 1 | 11 |
| { 62,62,62 } | 103 | 90 | 8 | 31 | 1 | 7 | 2 | 16 |
| { 63,63,63 } | 81 | 83 | 4 | 29 | 3 | 10 | 2 | 9 |
| { 64,64,64 } | 95 | 65 | 3 | 24 | 0 | 5 | 1 | 8 |
| { 65,65,65 } | 82 | 69 | 4 | 32 | 3 | 4 | 0 | 6 |
| { 66,66,66 } | 71 | 66 | 2 | 23 | 1 | 2 | 0 | 7 |
| { 67,67,67 } | 78 | 69 | 7 | 20 | 0 | 1 | 1 | 7 |
| { 68,68,68 } | 56 | 47 | 2 | 15 | 0 | 6 | 1 | 9 |
| { 69,69,69 } | 55 | 57 | 0 | 21 | 1 | 6 | 0 | 6 |
| { 70,70,70 } | 62 | 54 | 1 | 26 | 0 | 1 | 1 | 6 |
| { 71,71,71 } | 39 | 36 | 3 | 23 | 0 | 1 | 2 | 4 |
| { 72,72,72 } | 49 | 35 | 0 | 12 | 0 | 3 | 1 | 5 |
| { 73,73,73 } | 44 | 49 | 1 | 13 | 0 | 4 | 0 | 4 |
| { 74,74,74 } | 46 | 42 | 1 | 11 | 0 | 1 | 1 | 4 |
| { 75,75,75 } | 32 | 48 | 0 | 20 | 0 | 3 | 0 | 2 |
| { 76,76,76 } | 28 | 31 | 0 | 14 | 0 | 4 | 0 | 4 |
| { 77,77,77 } | 26 | 24 | 0 | 11 | 0 | 3 | 0 | 2 |
| { 78,78,78 } | 23 | 36 | 3 | 7 | 0 | 0 | 0 | 2 |
| { 79,79,79 } | 25 | 33 | 0 | 8 | 0 | 2 | 0 | 1 |
| { 80,80,80 } | 23 | 37 | 1 | 15 | 0 | 3 | 0 | 1 |
| { 81,81,81 } | 11 | 31 | 2 | 12 | 0 | 1 | 1 | 2 |
| { 82,82,82 } | 13 | 22 | 2 | 3 | 0 | 1 | 0 | 3 |
| { 83,83,83 } | 13 | 28 | 0 | 7 | 0 | 1 | 0 | 0 |
| { 84,84,84 } | 10 | 18 | 1 | 9 | 0 | 1 | 0 | 3 |
| { 85,85,85 } | 15 | 22 | 0 | 5 | 0 | 0 | 0 | 0 |
| { 86,86,86 } | 15 | 17 | 0 | 5 | 0 | 1 | 0 | 2 |
| { 87,87,87 } | 8 | 25 | 0 | 11 | 0 | 0 | 0 | 0 |
| { 88,88,88 } | 11 | 18 | 0 | 9 | 0 | 2 | 0 | 2 |
| { 89,89,89 } | 5 | 13 | 0 | 8 | 0 | 0 | 0 | 1 |
| { 90,90,90 } | 11 | 27 | 0 | 6 | 0 | 0 | 0 | 2 |
| { 91,91,91 } | 6 | 18 | 0 | 5 | 0 | 1 | 0 | 1 |
| { 92,92,92 } | 8 | 23 | 1 | 3 | 0 | 0 | 0 | 1 |
| { 93,93,93 } | 7 | 14 | 0 | 5 | 0 | 1 | 0 | 1 |
| { 94,94,94 } | 4 | 12 | 0 | 7 | 0 | 1 | 0 | 0 |
| { 95,95,95 } | 5 | 15 | 0 | 2 | 0 | 0 | 0 | 2 |
| { 96,96,96 } | 7 | 10 | 0 | 5 | 0 | 0 | 0 | 0 |
| { 97,97,97 } | 6 | 7 | 1 | 6 | 0 | 0 | 0 | 0 |
| { 98,98,98 } | 3 | 9 | 0 | 5 | 0 | 0 | 0 | 1 |
| { 99,99,99 } | 7 | 13 | 0 | 7 | 0 | 1 | 0 | 0 |
| { 100,100,100 } | 6 | 11 | 0 | 6 | 0 | 0 | 0 | 0 |
| { 101,101,101 } | 1 | 10 | 0 | 4 | 0 | 0 | 0 | 1 |
| { 102,102,102 } | 2 | 5 | 0 | 4 | 0 | 0 | 0 | 0 |
| { 103,103,103 } | 3 | 11 | 0 | 1 | 0 | 0 | 0 | 0 |
| { 104,104,104 } | 2 | 6 | 0 | 5 | 0 | 0 | 0 | 1 |
| { 105,105,105 } | 0 | 8 | 0 | 2 | 0 | 0 | 0 | 0 |
| { 106,106,106 } | 2 | 8 | 0 | 3 | 0 | 0 | 0 | 0 |
| { 107,107,107 } | 0 | 3 | 0 | 2 | 0 | 0 | 0 | 1 |
| { 108,108,108 } | 2 | 6 | 0 | 3 | 0 | 0 | 0 | 0 |
| { 109,109,109 } | 2 | 1 | 0 | 4 | 0 | 1 | 0 | 0 |
| { 110,110,110 } | 2 | 4 | 0 | 3 | 0 | 0 | 0 | 0 |
| { 111,111,111 } | 1 | 3 | 0 | 1 | 0 | 0 | 0 | 0 |
| { 112,112,112 } | 0 | 1 | 0 | 3 | 0 | 0 | 0 | 0 |
| { 113,113,113 } | 0 | 6 | 0 | 3 | 0 | 0 | 0 | 0 |
| { 114,114,114 } | 0 | 1 | 0 | 3 | 0 | 0 | 0 | 0 |
| { 115,115,115 } | 0 | 1 | 0 | 3 | 0 | 0 | 0 | 0 |
| { 116,116,116 } | 0 | 4 | 0 | 2 | 0 | 0 | 0 | 0 |
| { 117,117,117 } | 0 | 2 | 0 | 1 | 0 | 0 | 0 | 0 |
| { 118,118,118 } | 0 | 1 | 0 | 1 | 0 | 0 | 0 | 0 |
| { 119,119,119 } | 0 | 5 | 0 | 1 | 0 | 0 | 0 | 0 |
| { 120,120,120 } | 0 | 3 | 0 | 0 | 0 | 0 | 0 | 0 |
| { 121,121,121 } | 0 | 2 | 0 | 1 | 0 | 0 | 0 | 0 |
| { 122,122,122 } | 0 | 3 | 0 | 1 | 0 | 0 | 0 | 0 |
| { 123,123,123 } | 0 | 1 | 0 | 0 | 0 | 0 | 0 | 0 |

TABLE 2-continued

| ColorDelta associated with { 0,0,0 }/{ 1,1,1 } | Horizontal Procode | | Vertical Procode | | Triangular Procode | | Square Procode | |
|---|---|---|---|---|---|---|---|---|
| ColorSign | Landsc. | Portrait | Landsc. | Portrait | Landsc. | Portrait | Landsc. | Portrait |
| { 124,124,124 } | 0 | 3 | 0 | 1 | 0 | 0 | 0 | 0 |
| { 125,125,125 } | 0 | 2 | 0 | 0 | 0 | 0 | 0 | 0 |
| { 126,126,126 } | 0 | 4 | 0 | 1 | 0 | 0 | 0 | 0 |
| { 127,127,127 } | 0 | 0 | 0 | 0 | 0 | 0 | 0 | 0 |
| { 128,128,128 } | 0 | 0 | 0 | 0 | 0 | 0 | 0 | 0 |
| Total Quantity | 542288 | 732468 | 710777 | 505394 | 546585 | 323177 | 533519 | 706229 |
| All Quantity | 784192 | 1241778 | 997406 | 1144478 | 904208 | 1088637 | 706709 | 1176159 |
| Percentage | 69.15% | 58.99% | 71.26% | 44.16% | 60.45% | 29.69% | 75.49% | 60.05% |

It is obvious the two similarities above (Similarity of Color Sample Sign values and Similarity of Color Sample Delta values) are expressed by 100% for the true-color stream consisting of only gray colors (like {200,200,200} ColorCode). Such true-color image have only {0,0,0}, {1,1,1} and {2,2,2} ColorSign arrays and all ColorDelta arrays have the same value for all color samples.

4.1.1.6.3. Symmetry of ColorSign Arrays

Let us define null and opposite ColorSign arrays. {2,2,2} ColorSign is null ColorSign array and ColorSign arrays are opposite to each other if they are not null ColorSign arrays and their appropriate color sample values are '2' or they represent opposite (positive and negative) Sign values (for example, {1,2,0} and {0,2,1} or {0,0} and {1,1,1}).

Quantities of opposite ColorSign arrays of true-color encoded stream(s) are nearly equal to each other, and this interesting regularity is strongly expressed for the square procode. It is also slightly expressed for the horizontal and vertical procodes.

The sequence of this regularity in true-color encoded stream(s) quantities of negative and positive ('0' and '1') Sign values are nearly equal to each other for the each color sample.

For grayscale streams this symmetry means the quantities of opposite Sign values ('0' and '1' Sign values) are nearly equal to each other, and it is also slightly expressed for the square procode and slightly expressed for the horizontal and vertical procodes.

This regularity is statistically demonstrated for true-color and grayscale images in the Tables 3 and 4 (see square procode column of the tables). As you see, differences between quantities of opposite ColorSign arrays are negligible for the square procode:

TABLE 3

| | Horizontal Procode | | Vertical Procode | | Triangular Procode | | Square Procode | | | |
|---|---|---|---|---|---|---|---|---|---|---|
| | | | | | | | Landscape | | Portrait | |
| Color Sign | Land. Qty | Portr. Qty | Land. Qty | Portr. Qty | Land. Qty | Portr. Qty | Qty | Error | Qty | Error |
| {2,2,2} | 922296 | 248791 | 675735 | 158880 | 701718 | 139458 | 1015716 | — | 309933 | — |
| {0,0,0} | 387741 | 616259 | 483662 | 600699 | 526612 | 635672 | 353326 | 0.016% | 587644 | 0.148% |
| {1,1,1} | 396451 | 625519 | 513744 | 543779 | 377596 | 452965 | 353383 | | 588515 | |
| {0,0,1} | 10065 | 28065 | 17790 | 41652 | 7337 | 20160 | 5993 | 0.432% | 20307 | 0.568% |
| {1,1,0} | 11828 | 26001 | 17631 | 38765 | 7065 | 15639 | 6019 | | 20423 | |
| {0,1,0} | 6371 | 9943 | 3586 | 19870 | 3297 | 12404 | 4822 | 1.887% | 11349 | 0.220% |
| {1,0,1} | 6417 | 12792 | 3763 | 21069 | 3450 | 13513 | 4731 | | 11324 | |
| {0,0,0} | 4976 | 27380 | 7501 | 39634 | 3733 | 24230 | 2923 | 1.574% | 17563 | 1.583% |
| {0,1,1} | 5738 | 26153 | 8623 | 36313 | 3725 | 19949 | 2877 | | 17285 | |
| {2,0,0} | 6348 | 23804 | 8654 | 37769 | 17537 | 57842 | 7015 | 0.242% | 27277 | 1.005% |
| {2,1,1} | 5958 | 29574 | 9982 | 33032 | 12343 | 41155 | 7032 | | 27003 | |
| {0,2,0} | 9449 | 31056 | 11315 | 43420 | 18137 | 55613 | 9834 | 0.977% | 33473 | 0.259% |
| {1,2,1} | 9956 | 26820 | 11427 | 38877 | 12968 | 38453 | 9931 | | 33560 | |
| {0,0,2} | 12209 | 20626 | 22007 | 32381 | 35682 | 58350 | 11981 | 1.016% | 20088 | 0.780% |
| {1,1,2} | 12918 | 22922 | 21955 | 29845 | 23896 | 39726 | 12104 | | 20246 | |
| {2,0,1} | 10083 | 11692 | 9715 | 17560 | 10084 | 15900 | 8618 | 0.325% | 13177 | 3.224% |
| {2,1,0} | 9224 | 12378 | 7369 | 17353 | 6599 | 13578 | 8590 | | 13616 | |
| {0,2,1} | 2753 | 11656 | 8084 | 16297 | 8053 | 19674 | 2003 | 1.697% | 7564 | 0.591% |
| {1,2,0} | 3245 | 10859 | 6735 | 16250 | 7466 | 18525 | 1969 | | 7609 | |
| {0,1,2} | 13505 | 24484 | 13126 | 30316 | 5921 | 15383 | 12827 | 0.320% | 23807 | 0.138% |
| {1,0,2} | 19901 | 20222 | 10793 | 31078 | 7703 | 17193 | 12786 | | 23840 | |
| {2,2,0} | 15233 | 17808 | 12354 | 23199 | 29672 | 41652 | 17734 | 0.916% | 19646 | 0.572% |
| {2,2,1} | 20195 | 14860 | 17796 | 22051 | 27537 | 36641 | 17898 | | 19759 | |
| {2,0,2} | 756 | 1435 | 797 | 2346 | 13798 | 24379 | 4890 | 1.370% | 8207 | 0.207% |
| {2,1,2} | 712 | 1515 | 871 | 2129 | 6463 | 19342 | 4823 | | 8190 | |
| {0,2,2} | 6360 | 9807 | 6954 | 11723 | 23007 | 38491 | 9294 | 0.140% | 13617 | 1.755% |
| {1,2,2} | 9312 | 7579 | 6431 | 12113 | 17001 | 32513 | 9281 | | 13378 | |

TABLE 4

| | Horizontal Procode | Vertical Procode | Triangular Procode Lena | Square Procode | |
|---|---|---|---|---|---|
| Sign | Qty | Qty | Qty | Qty | Error |
| 2 | 25738 | 33105 | 32557 | 27124 | — |
| 0 | 123029 | 114113, | 124587 | 117169 | 0.145% |
| 1 | 113377 | 114414; 0.263% | 104488 | 117339 | |

The underlying principle which allows for the achieved compression rates for true-color encoded stream(s) are these regularities found in the images.

4.1.1.6.4. ColorSign Islands

NULL or one kind of opposite to each other Signs/ColorSigns are dominating in each area of the image. That is, encoded image consists of islands of dominancy of sign pairs. Essential of this regularity—the map of islands is nearly the same for encoding by any procode or for encoding by mixed procodes, which means if the area of the image consists of mostly {1,2,0} and {0,2,1} sign pair for encoding by horizontal procode, it will consist of mostly {1,2,0} and {0,2,1} sign pair for encoding by any other procode or for encoding by mixed procodes.

4.1.1.6.5. How to Exploit Regularities

The regularities could be used for increasing lossless or lossy compression rate or for photo correction (for having more accurate images) by amplifying them:

- making the Regularity of ColorSign Islands absolute, considering not dominant signs of islands as noises and liquidating them by the replacement of dominant signs of the islands;
- making the Regularity of Similarity of ColorDelta Values absolute, equalizing Deltas of each {0,0,0}/{1,1,1} ColorSign (for having one Delta value for each {0,0,0}/{1,1,1} ColorSign);
- making the Regularity of Symmetry of ColorSign Arrays absolute, equalizing quantity of opposite ColorSign Arrays to each other.

It is interesting: these corrections would make encoded image significantly more compressible.

4.1.1.7. Lossless Compacting/Extracting of True-Color Encoded Code and Restoring True-Color Code Converter module 30 has additional algorithms for converting Sign and Delta values of encoded color code to the Set Comp (SetLossy CompLossy) set. So, the items of lossless (near-lossless) true-color compressible unit are Comp (CompLossy) sets, defined below.

Compact/Extract algorithms (CompactColorDeltaModal 78, CompactColorDeltaSigned 80, ExtractColorDeltaModal 82, ExtractColorDeltaSigned 84, (CompactColorDeltaLossy 106, ExtractColorDeltaLossy 108)) convert/extract the encoded color code to/from the Comp (CompLossy) set.

Restore algorithms (RestoreColorCodeModal 86, RestoreColorCodeSigned 88, (RestoreColorCodeLossy 110) restore color codes directly from the Comp/CompLossy sets. Lossless (near-lossless) true-color compressible unit is the sequence of Comp (CompLossy) sets.

Once encoding of the stream is done, the regularities make it possible to compact ColorDelta arrays, associated with {0,0,0} or {1,1,1} ({0,0,0,0} or {1,1,1,1} for the CMYK image) ColorSign arrays. Such compacting or further transformation of ColorSign and ColorDelta arrays to the Set Comp (SetLossy CompLossy) set reduces the amount of data to be stored.

Set (SetLossy) type is the set or container of arrays and values situated in predefined order. The next member of the Set (SetLossy) variable may be predicted if the previous ones are known. '<<' operator is used to append variable to the end of the set (if the set is in the left side of the operator) or to extract the member of the set from its beginning (if the set is in the right side of the operator). After extracting the first member of the set the next one (which was the second before extraction) becomes ready to be extracted and so on. The extracted member of the set must be assigned to the variable of the same type.

'+<<' and '-<<' operators extract current member of the Comp (CompLossy) set for appending and subtracting it respectively. The Compact algorithm transforms ColorSign and ColorDelta arrays into Comp (CompLossy) set. So, this true-color compacting algorithm inputs ColorSign and ColorDelta arrays and outputs members of the Set Comp (SetLossy CompLossy). Set (SetLossy) type has a variable structure. First and mandatory member of the Set (SetLossy) is ColorSign array. The rest structure of the Set (SetLossy) depends on the ColorSign array.

Here is algorithm of defining the structure of the Comp set:

If ColorSign array is null (if the values of the ColorSign are '2' for all color samples), Set contains only the null ColorSign array;

Otherwise, if ColorSign array is {0,0,0} or {1,1,1} ({0,0,0,0} or {1,1,1,1} for the CMYK image), Set contains 1) ColorSign array, 2) MainColorDelta value, 3) Flag array and 4) not null DifColorDelta values. The number of DifColorDelta values depends on the values of the Flag array (it could be 0; 1 or 2 (0; 1; 2 or 3 for the CMYK image));

Otherwise, Comp set members are 1) ColorSign array and 2) not null values of ColorDelta array. The number of non-null values of ColorDelta array equals to the number of not '2' values of ColorSign array.

Flag arrays reduce the number of stored data (algorithm could be without Flag arrays, storing all DifColorDelta values (even if they are '0'), but it would generate poor compression rate). There are two versions of Flag array, called Modal Flag and Signed Flag, therefore there are two equivalent algorithms for compacting of true color compressible unit, called CompactColorDeltaModal and CompactColorDeltaSigned respectively. These algorithms are composed keeping in mind the regularities. In an exemplary embodiment, the following variables are used to compact encoded color code.

4.1.1.7.1. Lossless Modal Compacting of Encoded Color Code

1) Comp.MainColorDelta (MainColorDelta member of Comp) is the lowest (non-zero) value of ColorDelta array;

2) Comp.DifColorDelta[i]=ColorDelta[i]−Comp.MainColorDelta, which is defined if the difference is non zero (positive) value (ColorDelta[i] is Delta value of the color sample 'i'); and 3) Modal Comp.Flag is an array of 3 (4 for the CMYK image) binary (2-based) values—a value per color sample, which are result of comparison the value Comp.MainColorDelta with all of the values from the ColorDelta array. 'i' binary flag has a 'true' value, if ColorDelta[i] value is greater than the Comp.MainColorDelta value, and 'false' if it is equal (ColorDelta[i] can't be less than Comp.MainColorDelta). The respective flags therefore indicate whether a corresponding Comp.DifColorDelta[i] exists—'true' value means it exists (it is bigger than zero) and must be stored in the Comp set and 'false' means it does not exist (or it has '0' value) and it must be absent in the Comp set. The number of 'true' flags of the Comp.Flag provides the quantity of existing Comp.DifColorDelta[i] values included into Comp set (the number of such Comp.DifColorDelta[i] values equals to the number of '1' values of the Comp.Flag array). Comp.Flag always has at least one 'false' value (because at least one value of ColorDelta must be equal to the Comp.MainColorDelta or at least one Comp.DifColorDelta[i] value is absent). Possible values of Comp.Flag array are {{0,0,0},{0,0,1},{0,1,0,},{0,1,1},{1,0,0},{1,0,1},{1,1,0}}, where '0' represents 'false' value and '1' is 'true' value ({{0,0,0,0},{0,0,0,1},{0,0,1,0},{0,0,1,1},{0,1,0,0},{0,1,0,1},{0,1,1,0},{0,1,1,1},{1,0,0,0},{1,0, 0,1},{1,0,1,0},{1,0,1,1},{1,1,0,0},{1,1,0,1},{1,1,1,0}} for the CMYK image).

According to the Similarity of Delta Values regularity, Comp.DifColorDelta[i] values either are absent (ColorDelta [i] values usually equal to Comp.MainColorDelta and aren't included into Comp) or they are small numbers, which means they need less bits to be stored. ColorDelta values usually equal to Comp.MainColorDelta and Comp.Flag binary arrays of the compressible unit usually include only 'false' values (Flag is usually {0,0,0} ({0,0,0,0} for the CMYK image), which usually allows 1-bit storage for them (the size of their Huffman code is usually '1' in the compressed unit) and the Comp.Flag arrays make it possible usually to store only one ColorDelta[i] value (that is Comp.MainColorDelta). Otherwise, if at least one ColorDelta[i] value does not equal to Comp.MainColorDelta, Comp.Flag arrays allow to have smaller values to be stored (Comp.DifColorDelta[i] if exists, it is always smaller than ColorDelta[i]).

The Method 18 below represents CompactColorDeltaModal algorithm of initialization of Comp for the RGB color space. It outputs one by one, by predefined order the members of Comp set of the compressible unit:

| Method 18 |
|---|

```
template<typename CodeType> CompactColorDeltaModal(BYTE[ ] ColorSign,
CodeType[ ] ColorDelta, Set& Comp)
{
  CodeType MainColorDelta,DifColorDelta[3];
  bool Flag[3];
  Comp<<ColorSign; //step 1
  if(ColorSign!={2,2,2}) //step 2
  {
    if(ColorSign=={0,0,0} || ColorSign=={1,1,1}) //step 3
    {
      MainColorDelta=ColorDelta[0]; //step 4
      Flag={0,0,0}; //step 5
      if(ColorDelta[0]!=ColorDelta[1] || ColorDelta[1]!=ColorDelta[2]) //step 6
      {
        for(int i=1;i<3;i++) //step 7
        {
          if(ColorDelta[i]<MainColorDelta)
          {
            MainColorDelta=ColorDelta[i];
          }
        }
        for(int i=0;i<3;i++) //step 8
        {
          if(ColorDelta[i]-MainColorDelta!=0)
          {
            Flag[i]=1;
          }
        }
        Comp<<MainColorDelta; //step 9
        Comp<<Flag; //step 10
        for(int i=0;i<3;i++) //step 11
        {
          if(Flag[i]) //if(Flag[i]!=0)
          {
            DifColorDelta[i]=ColorDelta[i]-MainColorDelta;
            Comp<<DifColorDelta[i];
          }
        }
      }
      else
      {
        Comp<<MainColorDelta; //step 12
        Comp<<Flag; //step 13
      }
    }
    else //step 14
    {
      for(int i=0;i<3;i++)
      {
        if(ColorSign[i]!=2) //if(ColorDelta[i]=0 || ColorDelta[i]==1)
          Comp<<ColorDelta[i];
      }
    }
  }
)
```

The algorithm for CMYK color space is the 4 color sample analog of this.

Reference is not made to FIG. 32, where a flowchart illustrating CompactColorDeltaModal algorithm 78 is shown in an exemplary embodiment for both (RGB and CMYK image) color spaces.

The CompactColorDeltaModal method 78 is for initialization of the Comp set and it receives as input the ColorSign and ColorDelta arrays. The method 78 optimizes the compressible unit reducing the storage space for it. The method 78 begins by step 1, outputting ColorSign array to the Comp set. Method 78 then proceeds to step 2 where a check is performed to determine whether ColorSign is not {2,2,2} ({2,2,2,2} for CMYK image). If the check returns a 'true' value, method 78 then proceeds to step 3, where a further check is performed to determine if the ColorSign array is equal to {0,0,0} or {1,1,1} ({0,0,0,0} or {1,1,1,1} for the CMYK image). If the check performed at this step is determined to be 'true', method 78 then proceeds to steps 4 and 5 where MainColorDelta value and Flag array are initialized. If at step 6 it is determined that ColorDelta values are different, the loop (step 7) is running for assigning the smallest value of the ColorDelta array to the MainColorDelta (MainColorDelta>0 because all values of the considered ColorDelta array are not null). Then another loop (step 8) assigns '1' or 'true' to the values of the Flag if appropriate ColorDelta values are bigger than MainColorDelta. Method 78 then outputs MainColorDelta value and Flag array to the Comp set (9 and 10 steps). The step 11 assigns and outputs to the Comp set the DifColorDelta values, which also must be more than zero.

If it is determined at step 6 that ColorDelta values are equal to each other, method 78 then precedes steps 12 and 13, which just output initial MainColorDelta value and Flag array to the Comp set.

If it is determined that the check performed in the conditional statement of the step 3 does not return a 'true' value, method 78 proceeds to step 14. At step 14, a check is performed to determine whether the value of ColorSign array is '0' or '1'—If the check performed yields 'true' result that means appropriate ColorDelta value is not zero and it must be outputted to the Comp set.

Algorithm 78 (FIG. 32, Method 18) can be slightly altered by making initializations of MainColorDelta & Flag after <All values of ColorDelta aren't the same> conditional step. In this case initializations of MainColorDelta & Flag must be done in both: Yes & No branches of the condition.

4.1.1.7.2. Lossless Signed Compacting of Encoded Color Code

1) Comp.MainColorDelta is a main color sample value of ColorDelta array. Let's consider the main color sample is the green one (it can be chosen any one)—Comp.MainColorDelta is the green color sample value of ColorDelta array: Comp.MainColorDelta=ColorDelta[1]
(Comp.MainColorDelta=ColorDelta[3] for CMYK image, if the main color sample is considered the black).

2) Signed Comp.Flag has 2 (3 for the CMYK image) values—a value per color sample excluding the main one.

3) {Comp.Flag[0],Comp.DifColorDelta[0]} and {Comp.Flag[1],Comp.DifColorDelta[2]} are {Sign,Delta} type of pair, which means the values of Comp.Flag array are 3-based numbers ('0','1','2'). Comp.DifColorDelta[i] is modulo difference of ColorDelta[i] and Comp.MainColorDelta (i={0,2}) and they are calculated by the same method of the EncodeCode family by what the values of ColorDelta and ColorSign arrays were calculated (the variable type of Comp.DifColorDelta[i] and ColorDelta[i] is the same CodeType). That means for calculating (outputting) {Comp.Flag[0],Comp.DifColorDelta[0]} we need to input to the appropriate EncodeCode method {Comp.MainColorDelta, Comp.ColorDelta[0]} variables and for calculating (outputting) {Comp.Flag[1],Comp.DifColorDelta[2]} we need to input to the appropriate EncodeCode method {MainColorDelta, ColorDelta[2]} variables (Comp.MainColorDelta acts as a procode for the ColorDelta[i]). and for decoding these ColorDelta[i] values we need to input or pass Comp.MainColorDelta, Comp.DifColorDelta[i] and the appropriate values of signed Comp.Flag to the appropriate algorithm of the DecodeCode family.

So, the number of values of signed Comp.Flag is less by one than the values of modal Comp.Flag (2 for the RGB and 3 for the CMYK image) and the values are not binary—they can be '0'; '1' or '2'. The number of '0' or '1' values of the signed Comp.Flag provides the quantity of existing Comp.DifColorDelta[i] values which need to be stored (the number of Comp.DifColorDelta[i] values equals to the number of not '2' values of the Comp.Flag array). '0'; '1' values mean Comp.DifColorDelta[i] exists and it must be in the Comp set and '2' means it does not exist or it has '0' value and it is absent in the Comp set. Possible values of signed Comp.Flag array are {{2,2},{2,1},{2,0},{0,2},{1,2},{1,1}, {1,0},{0,1},{0,0}} ({{2,2,2},{2,2,1},{2,2,0},{2,1,2},{2,0, 2},{1,2,2},{0,2,2},{2,1,1},{2,0,0},{1,2,1},{0,2,0},{1,1,2}, {0,0,2},{2,1,0},{2,0,1},{1,2,0},{0,2,1},{1,0,2},{0,1,2},{1, 1,1},{0,0,0},{1,1,0},{0,0,1},{1,0,1},{0, 1,0},{0,1,1},{1,0, 0}} for the CMYK image).

According to the Similarity of Delta Values regularity, DifColorDelta[i] values either are zero and they are absent in the Comp set or they are small values, which means they need less bits to be stored in the Comp set. ColorDelta[i] values usually equal to Comp.MainColorDelta and the Comp.Flag arrays of the optimized compressible unit usually include only '2' values (Signed Flag usually is {2,2} ({2,2, 2} for the CMYK image), which allows to store them in 1-bit (the size of their Huffman code in the compressed unit). Otherwise, if at least one ColorDelta[i] value does not equal to Comp.MainColorDelta, the Flag arrays allow it to have smaller values (if DifColorDelta[i], is always smaller than ColorDelta[i]) in the Comp set).

The Method 19 below represents CompactColorDeltaSigned algorithm 80 of initialization of Comp for the RGB color space. It outputs the members of Comp set of the compressible unit:

---

Method 19

---

```
template<typename CodeType> CompactColorDeltaSigned(BYTE[ ] ColorSign,
CodeType[ ] ColorDelta, Set& Comp)
{
    CodeType MainColorDelta, DifColorDelta[3];
    BYTE Flag[2];
    Comp<<ColorSign; //step 1
```

-continued

Method 19

```
if(ColorSign!={2,2,2}) //step 2
{
    if(ColorSign=={0,0,0} || ColorSign=={1,1,1}) //step 3
    {
        MainColorDelta=ColorDelta[1]; //step 4
        Comp<<MainColorDelta; /*ColorDelta value of the main color sample becomes
MainColorDelta member of the Comp set, step 5*/
        if(ColorDelta[0]!=ColorDelta[1] || ColorDelta[1]!= ColorDelta[2]) //step 6
        {
            for(int i=0,int j=0;i<3;i+=2,j++) //step 7
            {
                EncodeCode<CodeType>(MainColorDelta, ColorDelta[i], Flag[j], DifColorDelta[i]);
/*or any other appropriate method of EncodeCode family, step 8*/
            }
            Comp<<Flag; //step 9
            for(int i=0,int j=0;i<3;i+=2,j++) //step 10
            {
                if(Flag[j]!=2) //if(Flag[j]==0 || Flag[j]==1)
                {
                    Comp<<DifColorDelta[i];
                }
            }
        }
        else
        {
            Comp<<{2,2}; //output null Flag
        }
    }
    else
    {
        for(int i=0;i<3;i++)
        {
            if(ColorSign[i]!=2) //if(ColorDelta[i]==0 || ColorDelta[i]==1)
                Comp<<ColorDelta[i];
        }
    }
}
```

The algorithm for CMYK color space is the 4 color sample analog of this.

Reference is now made to FIG. 33, where a flowchart illustrating CompactColorDeltaSigned algorithm 80 is shown in an exemplary embodiment for both (RGB and CMYK image) color spaces.

4.1.1.7.3. Comparison of Modal and Signed Lossless Compacting Algorithms of Encoded Color Code Values of Modal Flag are binary numbers but values of Signed Flag are 3-based numbers.

Table 9 below includes some inputs and outputs for both, CompactColorDeltaModal 78 and CompactColorDeltaSigned 80 methods:

TABLE 9

| Input | CompactColorDeltaModal Output | CompactColorDeltaSigned Output |
|---|---|---|
| {{2,2,2},{0,0,0}} | {{2,2,2}} | {{2,2,2}} |
| {{1,1,1},{5,5,5}} | {{1,1,1},5,{false,false,false}} | {{1,1,1},5,{2,2}} |
| {{0,0,0},{5,8,5}} | {{0,0,0},5,{false,true,false},3} | {{0,0,0},8,{1,1},3,3} |
| {{1,1,1},{5,6,8}} | {{1,1,1},5,{false,true,true,},1,3} | {{1,1,1},6,{1,0},1,3} |
| {{0,1,0},{5,1,5}} | {{0,1,0},{5,1,5}} | {{0,1,0},{5,1,5}} |
| {{2,1,0},{0,8,5}} | {{2,1,0},8,5} | {{2,1,0},8,5} |
| {{2,2,0},{0,0,5}} | {{2,2,0},5} | {{2,2,0},5} |

The CompactColorDeltaSigned method 80 of Comp initialization differs from the analogical method 78 in few steps. For example, the way it initializes the Flag array and DifColorDelta[i] values. The initialization of the Flag[j] and DifColorDelta[i] values are different here—those initializations are already done in step 8. Also MainColorDelta is outputted immediately after its initialization because here the value of MainColorDelta always stays unchangeable.

The size of the alphabet of the Modal Flags is less than the size of the alphabet of the Signed Flags—7 vs. 9 (15 vs. 27 for the CMYK image).

Now let's compare modal and signed versions of the algorithm.

Similarities:

1) As it is illustrated with reference to both the above-mentioned methods (methods 78 and 80), {ColorSign,ColorDelta} input and Comp output are coinciding (Comp={ColorSign,ColorDelta}) if ColorSign is not {2,2,2}; {0,0,0} or {1,1,1} and it does not have a '2' value (like {0,0,1},{1,0,1}, etc.). If ColorSign is not {2,2,2}; {0,0,0} or {1,1,1} but it has '2' value (like {0,2,1},{2,0,2}, etc.), the Comp output is the same for the both methods.

2) If Comp.MainColorDelta is the same for both cases (for modal case minimal ColorDelta value is considered as Comp.MainColorDelta and for signed case green (black) ColorDelta value is chosen to consider as main sample and it is assigned to Comp.MainColorDelta), Comp set has the same DifColorDelta values, too. For example, for the ColorDelta={6,4,7} MainColorDelta=4 and saved DifColorDelta values are '2', '3' for both cases.

3) If ColorDelta[1] (ColorDelta[3] for the CMYK image) (the value of ColorDelta which is going to be as Comp.MainColorDelta for the signed case) is more than the minimal value of the ColorDelta (the value of ColorDelta which is going to be as Comp.MainColorDelta for the modal case), both algorithms are equivalent again because the sum of MainColorDelta and not zero Comp.DifColorDelta[i] values (stored in the Comp set) are the same for both cases. Equations 3 and 4 algebraic expressions (modal and signed cases respectively) show the sum is the same:

$$\text{Min(ColorDelta) is the minimal value of ColorDelta array, Min(ColorDelta)+(ColorDelta[1]-Min(ColorDelta))+(ColorDelta}[i]-\text{Min(ColorDelta))= ColorDelta[1]+ColorDelta}[i]-\text{Min(ColorDelta)} \quad \text{Equation 3}$$

$$\text{ColorDelta[1]+(ColorDelta[1]-Min(ColorDelta))+(ColorDelta}[i]-\text{ColorDelta[1])=ColorDelta[1]+ColorDelta}[i]-\text{Min(ColorDelta)}. \quad \text{Equation 4}$$

For example, ColorDelta={8,7,3} will be saved as {3,5,4} and {7,1,4} respectively (3+5+4=7+1+4).

Differences:

1) If ColorDelta[1] (ColorDelta[3] for the CMYK image) is more than all other ColorDelta values, for signed case Comp has {ColorDelta[1], ColorDelta[1]-ColorDelta[0], ColorDelta[1]-ColorDelta[2]} and for modal case—{Min(ColorDelta), ColorDelta[i1]-Min(ColorDelta), ColorDelta[i2]-Min(ColorDelta)}. As you see, second and third members are identical and equally preferable for both cases: they are none zero differences of ColorDelta values with the maximum (signed case) and minimum (modal case) value of the ColorDelta respectively. But because of the first member (which is the MainColorDelta) it is always smaller for the modal case (Min(ColorDelta)<ColorDelta[1]). A modal case is preferable than a signed one.

Because we showed that the modal version of the optimization algorithm is better (more preferable) than a signed one, the rest of the related algorithms above are considered to be more effective for the modal case than for its signed equivalent.

4.1.1.7.4. Extracting of Lossless Modal Compacted Color Code

It is obvious that reverse algorithms of CompactColorDeltaModal (CompactColorDeltaSigned) algorithm, which converts encoded code to the Comp set, is also unambiguous. These algorithms have reverse functionality—they input Comp set and output ColorSign and ColorDelta arrays.

The Method 20 below is the reverse of Method 18 and represents ExtractColorDeltaModal algorithm 82 which restores ColorSign and ColorDelta arrays from the Comp. It inputs the Comp set of the compressible unit for initializing/restoring ColorSign and ColorDelta.

---
Method 20
---

```
template<typename CodeType> ExtractColorDeltaModal(Set Comp, BYTE[ ] ColorSign,
CodeType[ ] ColorDelta)
{
   CodeType MainColorDelta, DifColorDelta;
   bool Flag[3];
   ColorSign<<Comp; //extracts ColorSign array of the Comp
   if(ColorSign=={2,2,2})
   {
      ColorDelta={0,0,0};
   }
   else if (ColorSign=={0,0,0} || ColorSign=={1,1,1})
   {
//extracts MainColorDelta value of the Comp to the MainColorDelta
      MainColorDelta<<Comp;
      for(int i=0;i<3;i++)
      {
         ColorDelta[i]=MainColorDelta;
      }
      Flag<<Comp; //extracts Flag array of the Comp to the Flag array
      if(Flag!={0,0,0}) /*if Flag has '1' value*/ /*this checking statement is optional and might
be omitted; two "for(int i=0;i<3;i++)" loops below and above could be merged*/
      {
         for(int i=0;i<3;i++)
         {
            if(Flag[i]==1)
            {
//extracts DifColorDelta values of the Comp to the DifColorDelta
               DifColorDelta<<Comp;
               ColorDelta[i]+=DifColorDelta;
//two statements above could be replaced by "ColorDelta[i]+<<Comp"
            }
         }
      }
   }
   else
```

Method 20

```
{
   for(int i=0;i<3;i++)
   {
      if(ColorSign[i]==2)
         ColorDelta[i]=0;
      else
//extracts ColorDelta values of the Comp to the ColorDelta array
         ColorDelta[i]<<Comp;
   }
  }
}
```

The algorithm 82 is the reverse algorithm of CompactColorDeltaModal 78 and does not need detailed description. The flowchart version of this algorithm for RGB and CMYK color spaces is depicted in FIG. 34.

For the CMYK color space this algorithm is working analogically.

4.1.1.7.5. Extracting of Lossless Signed Compacted Color Code

The Method 21 below is the reverse of Method 19 and represents ExtractColorDeltaSigned algorithm 84 which restores ColorSign and ColorDelta arrays from the Comp set.

This algorithm 84 is the reverse algorithm of CompactColorDeltaSigned 80 and does not need a detailed description. In the DecodeCode<CodeType>( ) method ColorDelta[i] is passes twice because it contains MainColorDelta value. The flowchart version of this algorithm for RGB and CMYK color spaces is depicted in FIG. 35.

For the CMYK color space this algorithm is working analogically.

4.1.1.7.6. Merging Extraction and Decoding of Lossless Compacted Color Code

By applying extraction algorithm to the Comp sets of the compacted true-color compressible unit, we get a usual

Method 21

```
template<typename CodeType> ExtractColorDeltaSigned(Set Comp, BYTE[ ]
ColorSign, CodeType[ ] ColorDelta)
{
   CodeType DifColorDelta;
   BYTE Flag[2];
   ColorSign<<Comp;
   if(ColorSign=={2,2,2})
   {
      ColorDelta={0,0,0};
   }
   else if(ColorSign=={0,0,0} || ColorSign=={1,1,1})
   {
      MainColorDelta<<Comp;
      for(int i=0;i<3;i++)
      {
         ColorDelta[i]=MainColorDelta;
      }
      Flag<<Comp;
      if(Flag!={2,2}) //if Flag has '0' or '1' value //this checking could be absent
      {
         for(int i=0,int j=0;i<3;i+=2,j++)
         {
            if(Flag[j]!=2)
            {
               DifColorDelta<<Comp;
               DecodeCode<CodeType>(ColorDelta[i], Flag[j], DifColorDelta, ColorDelta[i]);
/*or
any other appropriate method of DecodeCode family, ColorDelta[i]is input and output*/
            }
         }
      }
   }
   else
   {
      for(int i=0;i<3;i++)
      {
         if(ColorSign[i]==2)
            ColorDelta[i]=0;
         else
            ColorDelta[i]<<Comp;
      }
   }
}
```

(non-compacted) encoded color code, consisting of Color-Sign and ColorDelta arrays. Then the appropriate algorithm of DecodeColorCode family must be applied to the encoded code for restoring true-color code. However, these two types of algorithms (algorithm of deoptimization and decoding) could be merged into one for making extraction "on-the-fly" and restoring true-color code directly from the compacted code (from the Comp set), accelerating the process of extraction and decoding. Such merged algorithms are called RestoreColorCode algorithms. They are restoring Color-Code array directly from the Comp set. In the relative mode, the Mod( ) method is used for fitting the result back into the ColorCode values belonging to {0,Palette-1} interval. Methods 22.1 and 23.1 are algorithms for both, relative and absolute mode and Methods 22.2 and 23.2 are restoring algorithms for the absolute mode, when CodeType (described above) is BYTE; WORD or DWORD:

Method 22.1

```
template<typename CodeType> RestoreColorCodeModal(CodeType[ ] ColorProCode,
Set Comp, CodeType[ ] ColorCode)
{
  CodeType MainColorDelta, DifColorDelta;
  bool Flag[3];
  BYTE ColorSign[3];
  ColorCode=ColorProCode; //step 1
  ColorSign<<Comp; //step 2
  if(ColorSign!={2,2,2}) //step 3
  {
    if(ColorSign=={0,0,0})
    {
      MainColorDelta<<Comp;
      for(int i=0;i<3;i++)
      {
        ColorCode[i]=Mod(ColorCode[i]+MainColorDelta);
      }
      Flag<<Comp;
      if(Flag!={0,0,0}) /*if Flag has '1' value*/ /*this statement is optional and might be
omitted; two "for(int i=0;i<3;i++)" loops below and above could be merged*/
      {
        for(int i=0;i<3;i++)
        {
          if(Flag[i]==1)
          {
            DifColorDelta<<Comp;
            ColorCode[i]=Mod(ColorCode[i]+DifColorDelta);
          }
        }
      }
    }
    else if(ColorSign=={1,1,1})
    {
      MainColorDelta<<Comp;
      for(int i=0;i<3;i++)
      {
        ColorCode[i]=Mod(ColorCode[i]-MainColorDelta);
      }
      Flag<<Comp;
      if(Flag!={0,0,0}) /*if Flag has '1' value*/ /*this checking statement is optional and
might
be omitted; two "for(int i=0;i<3;i++)" loops below and above could be merged*/
      {
        for(int i=0;i<3;i++)
        {
          if(Flag[i]==1)
          {
            DifColorDelta<<Comp;
            ColorCode[i]=Mod(ColorCode[i]-DifColorDelta);
          }
        }
      }
    }
    else
    {
      for(int i=0;i<3;i++)
      {
        if(ColorSign[i]==0)
          Mod(ColorCode[i]+(<<Comp));
        else if(ColorSign[i]==1)
          Mod(ColorCode[i]-(<<Comp));
      }
    }
  }
}
```

| Method 22.2 |
|---|

```
template<typename CodeType> RestoreColorCodeModal(CodeType[ ] ColorProCode,
Set Comp, CodeType[ ] ColorCode)
{
  CodeType MainColorDelta, DifColorDelta;
  bool Flag[3];
  BYTE ColorSign[3];
  ColorCode=ColorProCode; //step 1
  ColorSign<<Comp; //step 2
  if(ColorSign!={2,2,2}) //step 3
  {
    if(ColorSign=={0,0,0})
    {
      MainColorDelta<<Comp;
      for(int i=0;i<3;i++)
      {
        ColorCode[i]+=MainColorDelta;
      }
      Flag<<Comp;
      if(Flag!={0,0,0}) */if Flag has '1' value*/ /*this checking statement is optional and might
be omitted; two "for(int i=0;i<3;i++)" loops below and above could be merged*/
      {
        for(int i=0;i<3;i++)
        {
          if(Flag[i]==1)
          {
            DifColorDelta<<Comp;
            ColorCode[i]+=DifColorDelta;
//two statements above could be replaced by "ColorCode[i]+<<Comp"
          }
        }
      }
    }
    else if(ColorSign=={1,1,1})
    {
      for(int i=0;i<3;i++)
      {
        MainColorDelta<<Comp;
        ColorCode[i]-=MainColorDelta;
      }
      Flag<<Comp;
      if(Flag!={0,0,0}) //if Flag has '1' value
/*this checking could be absent and two "for(int i=0;i<3;i++)" loops below and above
could be merged*/
      {
        for(int i=0;i<3;i++)
        {
          if(Flag[i]==1)
          {
            DifColorDelta<<Comp;
            ColorCode[i]-=DifColorDelta;
//two statements above could be replaced by "ColorCode[i]-<<Comp"
          }
        }
      }
    }
    else
    {
      for(int i=0;i<3;i++)
      {
        if(ColorSign[i]==0)
          ColorCode[i]+<<Comp;
        else if(ColorSign[i]==1)
          ColorCode[i]-<<Comp;
      }
    }
  }
}
```

| Method 23.1 |
|---|

```
template<typename CodeType> RestoreColorCodeSigned(CodeType[ ] ColorProCode,
Set Comp, CodeType[ ] ColorCode)
{
  CodeType MainColorDelta, DifColorDelta;
  BYTE Flag[2];
```

-continued

Method 23.1

```
BYTE ColorSign[3];
ColorCode=ProCode; //step 1
ColorSign<<Comp; //step 2
if(ColorSign!={2,2,2}) //step 3
{
   if(ColorSign=={0,0,0})
   {
      MainColorDelta<<Comp;
      for(int i=0;i<3;i++)
      {
         ColorCode[i]=Mod(ColorCode[i]+MainColorDelta);
      }
      Flag<<Comp;
      if(Flag!={2,2}) /*if Flag has '0' or '1' value*/ /*this checking statement is optional and
might be omitted*/
      {
         for(int i=0,int j=0;i<3;i+=2,j++)
         {
            if(Flag[i]==0)
            {
               DifColorDelta<<Comp;
               ColorCode[i]=Mod(ColorCode[i]+DifColorDelta);
            }
            else if(Flag[i]==1)
            {
               DifColorDelta<<Comp;
               ColorCode[s][w][i]=Mod(ColorCode[s][w][i]-DifColorDelta);
            }
         }
      }
   }
   else if(ColorSign=={1,1,1})
   {
      MainColorDelta<<Comp;
      for(int i=0;i<3;i++)
      {
         ColorCode[i]=Mod(ColorCode[i]-MainColorDelta);
      }
      Flag<<Comp;
      if(Flag!={2,2}) /*if Flag has '0' or '1' value*/ /*this checking statement is optional and
might be omitted*/
      {
         for(int i=0,int j=0;i<3;i+=2,j++)
         {
            if(Flag[i]==0)
            {
               DifColorDelta<<Comp;
               ColorCode[i]=Mod(ColorCode[i]-DifColorDelta);
            }
            else if(Flag[i]==1)
            {
               DifColorDelta<<Comp;
               ColorCode[i]=Mod(ColorCode[i]+DifColorDelta);
            }
         }
      }
   }
   else
   {
      for(int i=0;i<3;i++)
      {
      if(ColorSign[i]==0)
         Mod(ColorCode[i]+(<<Comp));
      else if(ColorSign[i]==1)
         Mod(ColorCode[i]-(<<Comp));
      }
   }
}
```

| Method 23.2 |
| --- |

```
template<typename CodeType> RestoreColorCodeSigned(CodeType[ ]ColorProCode,
Set Comp, CodeType[ ] ColorCode)
{
  CodeType MainColorDelta, DifColorDelta;
  BYTE Flag[2];
  BYTE ColorSign[3];
  ColorCode=ColorProCode; //step 1
  ColorSign<<Comp; //step 2
  if(ColorSign!={2,2,2}) //step 3
  {
    if(ColorSign=={0,0,0})
    {
      MainColorDelta<<Comp;
      for(int i=0;i<3;i++)
      {
        ColorCode[i]+=MainColorDelta;
      }
      Flag<<Comp;
      if(Flag!={2,2}) /*if Flag has '0' or '1' value*/ /*this checking statement is optional and
might be omitted*/
      {
        for(int i=0,int j=0;i<3;i+=2,j++)
        {
          if(Flag[i]==0)
          {
            DifColorDelta<<Comp;
            ColorCode[i]+=DifColorDelta;
//two statements above could be replaced by "ColorCode[i]+<<Comp"
          }
          else if(Flag==1)
          {
            DifColorDelta<<Comp;
            ColorCode[i]-=DifColorDelta;
//two statements above could be replaced by "ColorCode[i]+<<Comp"
          }
        }
      }
    }
    else if(ColorSign=={1,1,1})
    {
      MainColorDelta<<Comp;
      for(int i=0;i<3;i++)
      {
        ColorCode[i]-=MainColorDelta;
      }
      Flag<<Comp;
      if(Flag!={2,2}) /*if Flag has '0' or '1' value*/ /*this checking statement is optional and
might be omitted*/
      {
        for(int i=0,int j=0;i<3;i+=2,j++)
        {
          if(Flag[i]==0)
          {
            DifColorDelta<<Comp;
            ColorCode[s][w][i]-=DifColorDelta;
//two statements above could be replaced by "ColorCode[i]-<<Comp"
          }
          else if(Flag[i]==1)
          {
            DifColorDelta<<Comp;
            ColorCode[i]+=DifColorDelta;
//two statements above could be replaced by "ColorCode[i]+<<Comp"
          }
        }
      }
    }
    else
    {
      for(int i=0;i<3;i++)
      {
        if(ColorSign[i]==0)
          ColorCode[i]+<<Comp;
```

Method 23.2

```
        else if(ColorSign[i]==1)
            ColorCode[i]-<<Comp;
        }
      }
    }
}
```

Step 1 assigns ColorProCode array to the ColorCode, which means each 'i' color sample ColorProCode[i] must be assigned to the appropriate ColorCode[i]. Then, at step 2, Comp.ColorSign is assigned to the temporary ColorSign array (ColorSign is called temporary because after restoring ColorCode, the value of ColorSign could be discarded). Step 3 is for checking whether ColorSign is {2,2,2} or not. If it is {2,2,2}, the method does nothing (it returns). The rest of the algorithm is quite similar with the optimization algorithms below. The ColorDelta array variable here is absent— ColorDelta values extracted from the Comp set are directly appending/subtracting to/from appropriate ColorCode values.

It is also important to highlight that for the signed case the Comp.MainColorDelta is appended but the Comp.DifColorDelta[i] is subtracted, if ColorSign=={0,0,0} and Comp.Flag[i]==1 and, on the contrary, the Comp.MainColorDelta is subtracted but the Comp.DifColorDelta[i] is appended, if ColorSign=={1,1,1} and Comp.Flag[i]==0.

Flowchart versions of RestoreColorCodeModal 86 (Methods 22.1 and 23.1) and RestoreColorCodeSigned 88 (Methods 22.2 and 23.2) algorithms for RGB and CMYK color spaces are represented in FIGS. 36 and 37 respectively.

Methods 24.1, 24.2, 25.1 and 25.2 below are versions of RestoreColorCode algorithms when the ColorCode already has the values of its procode. Such algorithms could be used for restoring of the current stream if the used procodes are vertical and the previous stream could be considered as the stream initialized by the procodes of current stream (vertical procodes are equal to the codes of the previous stream, which is the previous line for an image and its appropriate stream in the previous frame for the video), which means the current stream ColorCode values already could have appropriate values of the previous stream. However, the real purpose of such algorithms is for decoding video streams encoded by only vertical procoding method or by vertical, triangular and horizontal procoding methods (may not be encoded by square procoding method because of absence of previous code of the previous stream . . . ). That means we can apply changes or difference of the current stream directly into previous stream which we already have encoded (without making its copy, which saves time and memory) to have decoded current stream. This significantly increases the speed of frame decoding for the video.

Method 24.1 and Method 24.2

```
template<typename CodeType> RestoreColorCodeModal(Set Comp, CodeType[ ] ColorCode)
{
/*the only difference of this algorithm from Method 22.1/22.2 is the
"ColorCode=ColorProCode;" statement is absent*/
    . . .
}
```

Method 25.1 and Method 25.2

```
template<typename CodeType> RestoreColorCodeSigned(Set Comp, CodeType[ ] ColorCode)
{
/*the only difference of this algorithm from Method 23.1/23.2 is the
"ColorCode=ProCode;" statement is absent*/
    . . .
}
```

4.1.1.8. Nearly Lossless Compacting/Extracting of True-Color Encoded Code and Restoring True-Color Code Nearly lossy compacting or RB Transform utilizes Similarity of Delta Values regularity—values of ColorDelta array are the same or nearly the same. Considering that they are always the same, we could change image/video data insignificantly but could compact encoded color codes to the sets without Modal/Signed Flag arrays and DifColorDelta values. Nearly lossy compressed unit could become significantly (averagely 20%) smaller than lossless one, because it wouldn't contain the Flag arrays and DifColorDelta values. For realizing this idea, we need to choose main or lossless color sample for considering the ColorDelta values of other color samples always equal to the ColorDelta value of main color sample. Let's choose as our main color sample as green (black for CMYK image). Instead of green (black) any other color could be chosen, but green (black) is chosen because it is the most important (visually significant) color sample. ColorDelta[s][w][1] (ColorDelta[s][w][3]) stays untouchable (lossless) and ColorDelta values of all other samples must be equalized to that one.

The pseudo code below is the realization of the idea described above. This is the simplified RB Transform algorithm for the color code, absolute mode and 8-bit channel (values of ColorCode and ColorDelta are BYTE type):

Method 26

```
SimplifiedRBTransform(BYTE[ ] ColorSign, BYTE[ ] ColorDelta)
{
  if(ColorSign=={0,0,0} || ColorSign=={1,1,1})
  {
    for(int i=0;i<3;i+=2)
    {
      if(ColorDelta[i]!=ColorDelta[1])
      {
        if(ColorSign[0]==0) //if(ColorSign[1]==0 && ColorSign[i]==0)
          ColorCode[i]-=ColorDelta[i]-ColorDelta[1];
        else //if(ColorSign[0]==1)
          ColorCode[i]+=ColorDelta[1]-ColorDelta[1];
        ColorDelta[i]=ColorDelta[1]; //this line could be skipped
      }
    }
  }
}
```

This code, however, is simplified or has a bug which makes losses of the image/video too significant and visible on the screen. FIG. 43.2 is the FIG. 43.1 image transformed by the Method 26. As you see, in some places losses are visible, and the transform algorithm above (Method 26) needs correction for avoiding to be overloaded, when slight addition or subtraction could change the value of ColorCode[i] significantly (like for the 8-bit channel and Palette=256 (for the absolute mode), 254+3=1 or 1–2=255, because the result must be fitted into {0,255} interval of values (must be fitted into BYTE variable)). Such critical ColorCode[i] codes are rare—they could be absent or they would be a few for a stream (for example, FIG. 43 encoded by chosen procoding methods has 119 such critical color codes for the whole image), but, anyway, their damage or losses are so significant (and visible, see FIG. 43.2) that we need to improve this algorithm of RB Transform for making changes of the transform really invisible. FIG. 43.3 is the FIG. 43.1 image transformed by the improved algorithm, and as you see (FIG. 43.3), the losses here are not visible. FIG. 43.2 demonstrates the simplified RB Transform is "too visible" for some pixels but improved RB Transform is "invisible" for all pixels of an image (FIG. 43.3). RB Transform doesn't touch (keeps lossless) chosen main color sample (green for RGB & black for CMYK) (FIG. 43.4). In general, for the vast majority of codes, all color samples stay unchanged (lossless) (FIG. 43.4).

Correction algorithms (Methods 27, 28 and 29) are for both (absolute and relative) modes and for any n-bit channel. In these algorithms 'Palette[i]' constant (the number of 'i' color sample codes) may be any positive integer. The correction algorithm represented in the Method 27 could work if the stream would be encoded by the single procoding method. For the stream encoded by different procoding methods, this algorithm must be split into two ones (because values of ColorCode must be changed according only one, chosen procoding method). The first one, CorrectionInit algorithm 102 (Method 28, FIG. 44) must be called before the compacting and scoring of procoding methods for color codes of regular stream because its output ('CorrectionType') may be used for the compacting and scoring (see Method 40.3). It also needs to be called before compacting of color codes of initial stream (converting of initial stream is without scoring algorithms, because it always uses horizontal procoding method). and the second one, CorrectionApply algorithm 104 (Method 29, FIG. 45) must run after choosing the procoding method, because it could change color code samples (beside the main one) and that must be done after choosing the procoding method for making changes according to the method. Both Methods 28 and 29 are universal—for relative and absolute mode of any n-bit depth:

Method 27

```
const int Palette[3];
char CorrectionType;
template<typename CodeType> Correction(BYTE[ ] ColorSign, CodeType[ ] ColorDelta)
{
  if(ColorSign=={0,0,0} || ColorSign=={1,1,1})
  {
    int terror[2]={ColorDelta[0]-ColorDelta[1], ColorDelta[2]-ColorDelta[1]};
    if(!terror[0] && !terror[1]) /*ColorSign[0]==ColorSign[1] && ColorSign[1]==ColorSign[2]*/
      CorrectionType=0;
    else if(!terror[1]) //if(terror[0] && !terror[1])
      CorrectionType=1;
    else if(!terror[0]) //if(!terror[0] && terror[1])
      CorrectionType=2;
    else //if (terror[0] && terror[1])
      CorrectionType=3;
    switch(CorrectionType)
    {
```

-continued

| Method 27 |
|---|

```
        case 0:
        break;
        case 1:
        if(ColorSign[0]==0) //if(ColorSign=={0,0,0}
        {
           if(terror[0]>0 && ColorCode[0]>=terror[0] || terror[0]<0 && ColorCode[0]-terror[0]<Palette[0])
              ColorCode[0]-=terror[0];
           else
           {
              CorrectionType=-1;
           }
        }
        else //if(ColorSign[0]==1), if(ColorSign=={1,1,1}
        {
           if(terror[0]<0 && ColorCode[0]>=-terror[0] || terror[0]>0 && ColorCode[0]+terror[0]<Palette[0])
              ColorCode[0]+=terror[0];
           else
           {
              CorrectionType=-1;
           }
        }
        break;
        case 2:
        if(ColorSign[0]==0) //if(ColorSign=={0,0,0}
        {
           if(terror[1]>0 && ColorCode[2]>=terror[1] || terror[1]<0 && ColorCode[2]-terror[1]<Palette[2])
              ColorCode[2][h]-=terror[1];
           else
           {
              CorrectionType=-1;
           }
        }
        else //if(ColorSign[0]==1), if(ColorSign=={1,1,1}
        {
           if(terror[1]<0 && ColorCode[2]>=-terror[1] || terror[1]>0 && ColorCode[2]+terror[1]<Palette[2])
              ColorCode[2]+=terror[1];
           else
           {
              CorrectionType=-1;
           }
        }
        break;
        case 3:
//the same for both
        if(ColorSign[0]==0) //if(ColorSign=={0,0,0}
        {
           if((terror[0]>0 && ColorCode[0]>=terror[0] || terror[0]<0 && ColorCode[0]-terror[0]<Palette[0])
           && (terror[1]>0 && ColorCode[2]>=terror[1] || terror[1]<0 && ColorCode[2]-terror[1]<Palette[2]))
           {
              ColorCode[0]-=terror[0];
              ColorCode[2]-=terror[1];
           }
           else
           {
              CorrectionType=-1;
           }
        }
        else //if(ColorSign[0]==1), if(ColorSign=={1,1,1}
        {
           if((terror[0]<0 && ColorCode[0]>=-terror[0] || terror[0]>0 && ColorCode[0]+terror[0]<Palette[0])
           && (terror[1]<0 && ColorCode[2]>=-terror[1] || terror[1]>0 && ColorCode[2]+terror[1]<Palette[2]))
           {
              ColorCode[0]+=terror[0];
              ColorCode[2]+=terror[1];
           }
           else
           {
              CorrectionType=-1;
           }
```

Method 27

```
            }
            break;
        }
    }
}
```

Method 28

```
const int Palette[3];
char CorrectionType[4]; //for each type of procode
int Terror[4][2]; //for each type of procode
/*ColorSign[m]and ColorDelta[m]are calculated for 'm' procoding method*/
template<typename CodeType> CorrectionInit(BYTE[ ] ColorSign[m], CodeType[ ]
ColorDelta[m], CodeType[ ] ColorCode, int m)
{
//ColorSign[m][0]==ColorSign[m][1]&& ColorSign[m][1]==ColorSign[m][2]
    Terror[m][0]=ColorDelta[m][0]-ColorDelta[m][1]; //step 1
    Terror[m][1]=ColorDelta[m][2]-ColorDelta[m][1]; //step 2
    if(!Terror[m][0]&& !Terror[m][1]) //step 3
        CorrectionType[m]=0; //step 4
    else if(!Terror[m][1]) //if(Terror[m][0] && !Terror[m][1]), step 5
    {
        CorrectionType[m]=1; //step 6
        if(ColorSign[m][0]=0) //step 7
        {
            if(!(Terror[m][0]>0 && ColorCode[0]>=Terror[m][0] || Terror[m][0]<0 && ColorCode[0]-
Terror[m][0]<Palette[0])) //step 8
            {
                CorrectionType[m]=-1; //9
            }
        }
        else //if(ColorSign[m][0]==1)//10
        {
            if(!(Terror[m][0]<0 && ColorCode[0]>=-Terror[m][0] || Terror[m][0]>0 &&
ColorCode[0]+Terror[m][0]<Palette[0])) //11
            {
                CorrectionType[m]=-1; //12
            }
        }
    }
    else if(!Terror[m][0]) //if(!Terror[m][0]&& Terror[m][1])
    {
        CorrectionType[m]=2;
        if(ColorSign[m][2]==0)
        {
            if(!(Terror[m][1]>0 && ColorCode[2]>=Terror[m][1] || Terror[m][1]<0 && ColorCode[2]-
Terror[m][1]<Palette[2]))
            {
                CorrectionType[m]=-1;
            }
        }
        else //if(ColorSign[m][0]==1)
        {
            if(!(Terror[m][1]<0 && ColorCode[2]>=-Terror[m][1] || Terror[m][1]>0 &&
ColorCode[2]+Terror[m][1]<Palette[2]))
            {
                CorrectionType[m]=-1;
            }
        }
    }
    else //if (Terror[m][0]&& Terror[m][1])
    {
        CorrectionType[m]=3;
        if(ColorSign[m][0]==0)
        {
            if(!(Terror[m][0]>0 && ColorCode[0]>=Terror[m][0] || Terror[m][0]<0 && ColorCode[0]-
Terror[m][0]<Palette[0]) &&
(Terror[m][1]>0 && ColorCode[2]>=Terror[m][1] || Terror[m][1]<0 && ColorCode[2]-
Terror[m][1]<Palette[2])))
            {
                CorrectionType[m]=-1;
            }
        }
        else //if(ColorSign[m][0]==1)
```

Method 28

```
{
        if(!((Terror[m][0]<0 && ColorCode[0]>=-Terror[m][0] || Terror[m][0]>0 && ColorCode[0]
+Terror[m][0]<Palette[0]) &&
(Terror[m][1]<0 && ColorCode[2]>=-Terror[m][1] || Terror[m][1]>0 &&
ColorCode[2]+Terror[m][1]<Palette[2])))
        {
             CorrectionType[m]=-1;
        }
      }
   }
}
```

Steps 1 and 2 initialize Terror array by the difference of ColorDelta values of not main color samples with the main one. Step 3 checks, if values of the Terror array are 0 (if values of ColorDelta array are the same), CorrectionType[m] set to '0' (step 4), else if Terror[m][0] is not zero (if ColorDelta[m][0]!=ColorDelta[m][1], step 5), CorrectionType[m] set to '1' (step 6). And if ColorSign[m][0] is '0' (step 7), it is checked the replacement of ColorDelta[m][0] by the ColorDelta[m][1] could change ColorCode[0] radically or not (step 8). For understanding what that means, two alternative statements of the step 8 statement are represented. One is common (for absolute and relative mode), and another one is for absolute mode only. These alternative statements show that if ColorProCode[m][0]+ColorDelta[m][0] fits {0,Palette[0]-1} interval, ColorProCode[m][0]+ColorDelta[m][1] also must fit that interval and on the contrary, both must not fit that interval for applying RB Transform without having radical difference or huge loss (if one fits, another does not fit, RB Transform could change ColorCode[m][0] radically—both must fit or both must not fit).

Above are the alternative statements to the "if(!(Terror[m][0]>0 && ColorCode[m][0]>=Terror[m][0] || Terror[m][0]<0 && ColorCode[m][0]-Terror[m][0]<Palette[0]))" statement (step 8) for both, relative and absolute modes. The absolute mode example (2) is given for the 'BYTE' CodeType, and it could be 'WORD', as well as 'DWORD'. '(BYTE)' operator means casting (fitting) the result to the BYTE:

1) if(!(Mode(ColorProCode[m][0]+ColorDelta[m][0])>ColorProCode[m][0] && Mode(ColorProCode[m][0]+ColorDelta[m][1])>ColorProCode[m][0] || Mode(ColorProCode[m][0]+ColorDelta[m][0])<ColorProCode[m][0] && Mode(ColorProCode[m][0]+ColorDelta[m][1])<ColorProCode[m][0]));

2) if(!((BYTE)(ColorProCode[m][0]+ColorDelta[m][0])>ColorProCode[m][0] && (BYTE)(ColorProCode[m][0]+ColorDelta[m][1])>ColorProCode[m][0] || (BYTE)(ColorProCode[m][0]+ColorDelta[m][0])<ColorProCode[m][0] && (BYTE)(ColorProCode[m][0]+ColorDelta[m][1])<ColorProCode[m][0]));

If step 8 results 'true', it is not reasonable to apply RB Transform to the ColorCode, and CorrectionType[m] is set to '-1' (step 9).

If ColorSign[m][0] is '1' (step 10), again, it checks whether the replacement of ColorDelta[m][0] by the ColorDelta[m][1] could change ColorCode[0] radically or not (step 11). For understanding what that means, here are two alternative statements of the step 11 statement—one is common (for absolute and relative mode), and another one is for absolute mode only. These alternative statements show that if ColorProCode[m][0]−ColorDelta[m][0] fits {0,Palette[0]-1} interval, ColorProCode[m][0]−ColorDelta[m][1] also must fit that interval and, on the contrary, both must not fit that interval for applying RB Transform without having radical difference or huge loss (if one fits, another does not fit, RB Transform could change ColorCode[m][0] radically—both must fit of both must not fit). The absolute mode example is given for the 'BYTE' CodeType, and it could be 'WORD', as well as 'DWORD'. '(BYTE)' operator means casting (fitting) the result to the BYTE:

1) if(!(Mode(ColorProCode[m][0]−ColorDelta[m][0])<ColorProCode[m][0] && Mode(ColorProCode[m][0]−ColorDelta[m][1])<ColorProCode[m][0] || Mode(ColorProCode[m][0]−ColorDelta[m][0])>ColorProCode[m][0] && Mode(ColorProCode[m][0]−ColorDelta[m][1])>ColorProCode[m][0]));

2) if(!((BYTE)(ColorProCode[m][0]−ColorDelta[m][0])<ColorProCode[m][0] && (BYTE)(ColorProCode[m][0]−ColorDelta[m][1])<ColorProCode[m][0] || (BYTE)(ColorProCode[m][0]−ColorDelta[m][0])>ColorProCode[m][0] && (BYTE)(ColorProCode[m][0]−ColorDelta[m][1])>ColorProCode[m][0]));

If step 11 results true, it is not reasonable to apply RB Transform to the ColorCode, and CorrectionType[m] is set to '-1' (step 12).

Then if Terror[2] is not zero, the same is done for the '2' or blue color sample, otherwise (if both values of the Terror array aren't zero), the checking must be done for both.

The CorrectionInit algorithm 102 is represented by flowchart, in the FIG. 44.

Method 29

```
char CorrectionType[4]; //for each type of procode
int Terror[2][4]; //for each type of procode
template<typename CodeType> CorrectionApply(BYTE[ ] ColorSign[m], CodeType[ ] ColorCode, int m)
{
//ColorSign[m][0]==ColorSign[m][1]&& ColorSign[m][1]==ColorSign[m][2]
/* if(CorrectionType[m]==0) //step 1
   return; //step 2
```

Method 29

```
else*/ if(CorrectionType[m]==1) //step 3
{
    if(ColorSign[m][0]==0) //step 4
    {
        ColorCode[0]-=Terror[m][0]; //step 5
    }
    else //if(ColorSign[m][0]==1) //step 6
    {
        ColorCode[0]+=Terror[m][0]; //step 7
    }
}
else if(CorrectionType[m]==2)
{
    if(ColorSign[m][2]==0)
    {
        ColorCode[2]-=Terror[m][1];
    }
    else //if(ColorSign[m][0]==1)
    {
        ColorCode[2]+=Terror[m][1];
    }
}
else// if(CorrectionType[m]==3)
{
    if(ColorSign[m][0]==0)
    {
        ColorCode[0]-=Terror[m][0];
        ColorCode[2]-=Terror[m][1];
    }
    else //if(ColorSign[m][0]==1)
    {
        ColorCode[0]+=Terror[m][0];
        ColorCode[2]+=Terror[m][1];
    }
}
}
```

This algorithm slightly changes red or green color code sample (these color samples are near-lossless) but does not touch the green one (it stays lossless always). The changing of color sample code must be done according (chosen and) applied procode. This correction is necessary because changed color sample of the current color code could define (could be) the procode for encoding color sample code of the next color code.

It is checked at step 1, if CorrectionType[m] is '1', RB Transform is lossless and method returns without any correction (step 2). If CorrectionType[m] is '1' (step 3), '0' color sample code needs to be corrected, if ColorSign[m][0] is '0' it is done in step 5 or if ColorSign[m][0] is '1' it is done in step 7. If CorrectionType[m] is '2', '2' sample code needs to be corrected by the same way, otherwise if CorrectionType[m] is '3', both, '0' and '2' sample codes are corrected.

It is interesting the CorrectionApply algorithm 104 is true for relative mode too, because statements of adding/subtracting the values of Terror array may never overload changing ColorCode value (CorrectionInit algorithm 102 already excluded such radical, CorrectionType[m]==−1 cases, when RB Transform is not allowed)—the result of addition/subtraction also always belongs to the {0,Palette [0]−1} interval.

Could be other criteria for setting CorrectionType[m] to '−1' and canceling RB (lossy) Transform. For example, the sum of the values of the Terror array, Terror[0]+Terror[1] (Terror[0]+Terror[1]+Terror[2] for the CMYK image) may be also treated as the quantification of lossyness and big values of the sum also could be reason to set CorrectionType [m] to '−1' for avoiding RB Transform for the color code (though the sum of the values of the Terror array always is zero or a small number).

It is obvious that after applying RB Transform to the bitmap and storing it in near-lossless format if we should reapply RB Transform to the RB transformed bitmap and recompress it in another file in near-lossless format, both bitmaps and files would be exactly the same.

The CorrectionApply algorithm 104 is represented by a flowchart in the FIG. 45.

The ColorSign and ColorDelta arrays are further transformed to SetLossy CompLossy set which is a light version of the Comp set and includes a series of members by predefined order. SetLossy usually does not include Flag array and DifColorDelta values and may include 'MaxDelta' constant value. MaxDelta is the delta which is (the smallest) not used in the lossless compression—it is reserved for the near-lossless compression only as an indicator that it is rejected to apply RB Transform to encoded color code for not having radical losses (and the color code is compacted by the lossless manner, by the CompactColorDeltaModal algorithm 78 and CompactColorDeltaSigned algorithm 80). MaxDelta may be '129'; '32769'; '2147483649' for 8-bit; 16-bit; 32-bit channels respectively (Tables 6; 7; 8).

Here is an algorithm for defining the structure of the CompLossy set:

If ColorSign array is null (if the values of the ColorSign are '2' for all color samples), CompLossy set contains only the null ColorSign array (the same as for the Comp set);

Otherwise, if ColorSign array is {0,0,0} or {1,1,1} ({0, 0,0,0} or {1,1,1,1} for the CMYK image): if CorrectionType is not '−1' (which means RB Transform is allowed), CompLossy set members are 1) ColorSign array, 2) MaxorMainColorDelta value, which contains ColorDelta value of chosen main (green) color sample; else (if CorrectionType is '−1'), SetLossy members are 1) ColorSign array, 2) MaxorMainColorDelta value, which contains MaxDelta value (MaxorMainColorDelta=MaxDelta), 3) MainColorDelta value (which is different for the modal and signed cases), 4) Flag array and 5) (not null) DifColorDelta values (the same as for the Comp set). The number of DifColorDelta values depends on the values of the Flag array (the number could be 0; 1 or 2 (0; 1; 2 or 3 for the CMYK image));

Otherwise, CompLossy set members are 1) ColorSign array and 2) not null values of ColorDelta (the same as for the Comp set).

4.1.1.8.1. Nearly Lossless Compacting of Encoded Color Code

The Methods 30.1, 30.2 and FIG. 46 represent CompactColorDeltaLossy algorithm 106 of initialization of CompLossy, which is much lighter than appropriate lossless algorithms (CompactColorDeltaModal 78 and CompactColorDeltaSigned 80 algorithms). It outputs the members of Set CompLossy of the compressible unit:

Method 30.1

```
const CodeType MaxDelta;
template<typename CodeType> CompactColorDeltaLossyModal(char CorrectionType,
BYTE[ ] ColorSign, CodeType[ ] ColorDelta, SetLossy& CompLossy)
{
   CompLossy<<ColorSign; //step 1
   if(ColorSign!={2,2,2}) //step 2
   {
      if(ColorSign=={0,0,0} || ColorSign=={1,1,1}) //step 3
      {
         if(CorrectionType!=-1) //step 4
         {
            CompLossy<<ColorDelta[1]; /*step 5, ColorDelta value of chosen main color sample
becomes MaxorMainColorDelta member of the CompLossy*/
         }
         else
         {
            CompLossy<<MaxDelta; //step 6
            <output to the CompLossy set MainColorDelta value, Modal Flag array and
DifColorDelta[i]values in manner of CompactColorDeltaModal( )>; //step 7
         }
      }
      else
      {
         for(int i=0;i<3;i++) //step 8
         {
            if(ColorSign[i]!=2) //if(ColorDelta[i]==0 || ColorDelta[i]==1) //step 9
               CompLossy<<ColorDelta[i]; //step 10
         }
      }
   }
}
```

Method 30.2

```
const CodeType MaxDelta;
template<typename CodeType> CompactColorDeltaLossySigned(char CorrectionType,
BYTE[ ] ColorSign, CodeType[ ] ColorDelta, SetLossy& CompLossy)
{
   CompLossy<<ColorSign; //step 1
   if(ColorSign!={2,2,2}) //step 2
   {
      if(ColorSign=={0,0,0} || ColorSign=={1,1,1}) //step 3
      {
         if(CorrectionType!=-1) //step 4
         {
            CompLossy<<ColorDelta[1]; /*step 5, ColorDelta value of chosen main color sample
becomes MaxorMainColorDelta member of the CompLossy*/
         }
         else
         {
            cout<<MaxDelta; //step 6
            <output to the CompLossy set MainColorDelta value, Signed Flag array and
DifColorDelta[i]values in manner of CompactColorDeltaSigned( )>; //step 7
         }
      }
      else
      {
         for(int i=0;i<3;i++) //step 8
         {
            if(ColorSign[i]!=2) //if(ColorDelta[i]==0 || ColorDelta[i]==1) //9
               CompLossy<<ColorDelta[i]; //10
```

Method 30.2

```
      }
    }
   }
 }
}
```

The algorithm for CMYK color space is the 4 color sample analog of this.

Reference is now made to Methods 30.1, 30.2 and FIG. 46, where CompactColorDeltaLossy algorithm 106 is shown in an exemplary embodiment.

The CompactColorDeltaLossy method 106 is for initialization of the CompLossy set and it receives as input the ColorSign and ColorDelta arrays. In the step 1 is outputted to the CompLossy set the ColorSign array as it is, regardless of the values of ColorSign. In step 2 where a check is performed to determine whether ColorSign is not {2,2,2} ({2,2,2,2} for CMYK image). If it is determined that the check returns 'true' value, the method then proceeds to step 3, where a further check is performed to determine if the ColorSign array is equal to {0,0,0} or {1,1,1} ({0,0,0,0} or {1,1,1,1} for the CMYK image).

If the check performed at this step and is determined to be 'true', the method then proceeds to the steps 4, where it is checked whether the CorrectionType is '−1' or not. If it is not '−1', ColorDelta value of chosen lossless color sample (green) is outputted (step 5). But if CorrectionType is '−1', MaxDelta is outputted and MainColorDelta, Modal/Signed Flag and DifColorDelta[i] values are outputted in manner of CompactColorDeltaModal( )/CompactColorDeltaSigned( ) methods respectively. As you noted for this special case (when CompLossy set has MaxDelta extra member) CompLossy set is bigger than could be its appropriate Comp set, but because of this special case (when CorrectionType is '−1'), is rare, it may not damage compression rate significantly. As you noted, the only difference of Methods 30.1 and 30.2 is on the step 7, where Modal/Signed Flag is outputted.

If it is determined that the check performed in the conditional statement of the step 3 does not return 'true' value, the method proceeds to step 8, where a check is performed to determine whether the value of ColorSign array is '0' or '1'. If the check performed yields a 'true' result that means appropriate ColorDelta value is not zero and it must be outputted to the CompLossy set.

4.1.1.8.2. Extracting of Nearly Lossless Modal Compacted Color Code

It is obvious that reverse algorithms of CompactColorDeltaLossy algorithm 106, which convert near-lossless compacted color codes to the encoded color codes, are also unambiguous. These algorithms input CompLossy set and output ColorSign and ColorDelta arrays.

The Method 31 below is the reverse of Method 30.1 and 30.2 respectively and FIG. 47 also represents ExtractColorDeltaLossy algorithm 108 of restoring ColorSign and ColorDelta arrays from the CompLossy. It inputs the members of SetLossy CompLossy of the compressible unit for initializing/restoring ColorSign and ColorDelta (encoded color code).

Method 31

```
const CodeType MaxDelta;
template<typename CodeType> ExtractColorDeltaLossy(SetLossy CompLossy, BYTE[ ] ColorSign, CodeType[ ] ColorDelta)
{
   CodeType MaxorMainColorDelta;
   ColorSign<<CompLossy; //step 1
   if(ColorSign=={2,2,2}) //step 2
   {
      ColorDelta={0,0,0}; //step 3
   }
   else if(ColorSign=={0,0,0} || ColorSign=={1,1,1}) //step 4
   {
      MaxorMainColorDelta<<CompLossy; //step 5
      if(MaxorMainColorDelta!=MaxDelta) /*if RB Transform is applied, step 6*/
      {
         for(int i=0;i<3;i++) //step 7
         ColorDelta[i]=MaxorMainColorDelta;
      }
      else
      {
         <input from the CompLossy set MainColorDelta value, Modal/Signed Flag array and DifColorDelta[i] values and restore ColorDelta array in manner of ExtractColorDeltaModal( )/ExtractColorDeltaSigned( ) respectively>; //step 8
      }
   }
   else
   {
      for(int i=0;i<3;i++)
      {
         if(ColorSign[i]==2)
            ColorDelta[i]=0;
         else
            ColorDelta[i]<<Comp;
```

Method 31

```
    }
  }
}
```

The algorithm 108 is the reverse algorithm of CompactColorDeltaModal 106. Step 1 extracts the first and current member of CompLossy (CompLossy.ColorSign) into ColorSign. Step 5 extracts the next member of CompLossy (CompLossy.MaxorMainColorDelta value) into MaxorMainColorDelta variable. At step 6, it is checked, if MaxorMainColorDelta is less than MaxDelta, RB Transform is applied and MaxorMainColorDelta contains ColorDelta[1] value (Delta value of the green color sample) and CompLossy.MaxorMainColorDelta is assigned to the Delta values of all color samples (step 7). But if MaxorMainColorDelta==MaxDelta, RB Transform is blocked and encoded color code is compacted in lossless manner, like in appropriate lossless ExtractColorDelta algorithms and the rest is like in those algorithms (the flowchart version of this algorithm is in FIG. 47).

For the CMYK color space this algorithm is working analogically.

4.1.1.8.3. Merging Extraction and Decoding of Nearly Lossless Compacted Color Code RestoreColorCodeLossy algorithms are near-lossless analogs of RestoreColorCode algorithms—they are restoring ColorCode array directly from the CompLossy set. Methods 32.1 and 33.1 (analogs of Methods 22.1 and 23.1) are for common EncodeColor encoding algorithm, Methods 32.2 and 33.2 (analogs of Methods 22.2 and 23.2) are restoring algorithms for the absolute mode, when CodeType (described above) is BYTE; WORD or DWORD:

Method 32.1

```
const CodeType MaxDelta;
template<typename CodeType> RestoreColorCodeLossyModal(CodeType[ ]
ColorProCode, SetLossy CompLossy, CodeType[ ] ColorCode)
{
  CodeType MaxorMainColorDelta, MainColorDelta, DifColorDelta;
  boot Flag[3];
  ColorCode=ProProCode;
  ColorSign<<CompLossy;
  if(ColorSign!={2,2,2})
  {
    if(ColorSign=={0,0,0})
    {
      MaxorMainColorDelta<<CompLossy;
      if(MaxorMainColorDelta!=MaxDelta)
      {
        for(int i=0;i<3;i++)
        {
          ColorCode[i]=Mod(ColorCode[i]+MaxorMainColorDelta);
        }
      }
      else
      {
        MainColorDelta<<CompLossy;
        for(int i=0;i<3;i++)
        {
          ColorCode[i]=Mod(ColorCode[i]+MainColorDelta);
        }
        Flag<<CompLossy;
        if(Flag!={0,0,0}) /*if Flag has '1' value*/ /*this checking statement is optional and
might be omitted; two "for(int i=0;i<3;i++)" loops below and above could be merged*/
        {
          for(int i=0;i<3;i++)
          {
            if(Flag[i]==1)
            {
              DifColorDelta<<CompLossy;
              ColorCode[i]=Mod(ColorCode[i]+DifColorDelta);
            }
          }
        }
      }
    }
    else if(ColorSign=={1,1,1})
    {
      MaxorMainColorDelta<<CompLossy;
      if(MaxorMainColorDelta!=MaxDelta)
      {
        for(int i=0;i<3;i++)
        {
          ColorCode[i]=Mod(ColorCode[i]+MaxorMainColorDelta);
```

Method 32.1

```
            }
        }
        else
        {
            MainColorDelta<<CompLossy;
            for(int i=0;i<3;i++)
            {
                ColorCode[i]=Mod(ColorCode[i]-MainColorDelta);
            }
            Flag<<CompLossy;
            if(Flag!={0,0,0}) /*if Flag has '1' value*/ /*this checking statement is optional and
might be omitted; two "for(int i=0;i<3;i++)" loops below and above could be merged*/
            {
                for(int i=0;i<3;i++)
                {
                    if(Flag[i]==1)
                    {
                        Flag<<CompLossy;
                        ColorCode[i]=Mod(ColorCode[i]-DifColorDelta[i]);
                    }
                }
            }
        }
        else
        {
            for(int i=0;i<3;i++)
            {
                if(ColorSign[i]==0)
                    Mod(ColorCode[i]+(<<CompLossy));
                else if(ColorSign[i]==1)
                    Mod(ColorCode[i]-(<<CompLossy));
            }
        }
    }
}
```

Method 32.2

```
const CodeType MaxDelta;
template<typename CodeType> RestoreColorCodeLossyModal(CodeType[ ]
ColorProCode, SetLossy CompLossy, CodeType( ) ColorCode)
{
    CodeType MaxorMainColorDelta,MainColorDelta,DifColorDelta;
    bool Flag[3];
    ColorCode=ColorProCode;
    ColorSign<<CompLossy;
    if(ColorSign!={2,2,2})
    {
        if(ColorSign=={0,0,0})
        {
            MaxorMainColorDelta<<CompLossy;
            if(MaxorMainColorDelta!=MaxDelta)
            {
                for(int i=0;i<3;i++)
                {
                    ColorCode[i]+=MaxorMainColorDelta;
                }
            }
            else
            {
                MainCompDelta<<CompLossy;
                for(int i=0;i<3;i++)
                {
                    ColorCode[i]+=MainColorDelta;
                }
                Flag<<CompLossy;
                if(Flag!={0,0,0}) /*if Flag has '1' value*/ /*this checking statement is optional
and
might be omitted; two "for(int i=0;i<3;i++)" loops below and above could be merged*/
                {
                    for(int i=0;i<3;i++)
                    {
                        if(Flag[i]==1)
```

Method 32.2

```
                {
                    ColorCode[i]+<<CompLossy;
                }
            }
        }
    }
}
else if(ColorSign=={1,1,1})
{
    MaxorMainColorDelta<<CompLossy;
    if(MaxorMainColorDelta!=MaxDelta)
    {
        for(int i=0;i<3;i++)
        {
            ColorCode[i]-=MaxorMainColorDelta;
        }
    }
    else
    {
        MainColorDelta<<CompLossy;
        for(int i=0;i<3;i++)
        {
            ColorCode[i]-=MainColorDelta;
        }
        Flag<<CompLossy;
        if(Flag!={0,0,0}) //if Flag has '1' value
/*this checking could be absent and two "for(int i=0;i<3;i++)" loops below and above
could be merged*/
        {
            for(int i=0;i<3;i++)
            {
                if(Flag[i]==1)
                {
                    ColorCode[i]-<<CompLossy;
                }
            }
        }
    }
}
else
{
    for(int i=0;i<3;i++)
    {
        if(ColorSign[i]==0)
            ColorCode[i]+<<CompLossy;
        else if(ColorSign[i]==1)
            ColorCode[i]-<<CompLossy;
    }
}
}
```

Method 33.1

```
const CodeType MaxDelta;
template<typename CodeType> RestoreColorCodeLossySigned(CodeType++
ColorProCode,SetLossy CompLossy, CodeType++ ColorCode)
{
    CodeType MaxorMainColorDelta, MainColorDelta, DifColorDelta;
    BYTE Flag[2];
    ColorCode=ColorProCode;
    ColorSign<<CompLossy;
    if(ColorSign!={2,2,2})
    {
        if(ColorSign=={0,0,0})
        {
            MaxorMainColorDelta<<CompLossy;
            if(MaxorMainColorDelta!=MaxDelta)
            {
                for(int i=0;i<3;i++)
                {
                    ColorCode[i]=Mod(ColorCode[i]+MaxorMainColorDelta);
                }
            }
```

-continued

Method 33.1

```
        else
        {
            for(int i=0;i<3;i++)
            {
                ColorCode[i]=Mod(ColorCode[i]+MainColorDelta);
            }
            Flag<<CompLossy;
            if(Flag!={2,2}) //if Flag has '0' or '1' value //this checking could be absent
            {
                for(int i=0,int j=0;i<3;i+=2,j++)
                {
                    if(Flag[i]==0)
                    {
                        DifColorDelta<<CompLossy;
                        ColorCode[i]=Mod(ColorCode[i]+DifColorDelta);
                    }
                    else if(Flag[i]==1)
                    {
                        DifColorDelta<<CompLossy;
                        ColorCode[i]=Mod(ColorCode[i]-DifColorDelta[i]);
                    }
                }
            }
        }
    }
    else if(ColorSign=={1,1,1})
    {
        MaxorMainColorDelta<<CompLossy;
        if(MaxorMainColorDeltaI=MaxDelta)
        {
            for(int i=0;i<3;i++)
            {
                ColorCode[i]=Mod(ColorCode[i]-MaxorMainColorDelta);
            }
        }
        else
        {
            MainColorDelta<<CompLossy;
            for(int i=0;i<3;i++)
            {
                ColorCode[i]=Mod(ColorCode[i]-MainColorDelta);
            }
            Flag<<CompLossy;
            if(Flag!={2,2}) /*if Flag has '0' or '1' value*/ /*this checking statement is optional
and
might be omitted*/
            {
                for(int i=0,int j=0;i<3;i+=2,j++)
                {
                    if(Flag[i]==0)
                    {
                        DifColorDelta<<CompLossy;
                        ColorCode[i]=Mod(ColorCode[i]-DifColorDelta);
                    }
                    else if(Flag[i]==1)
                    {
                        DifColorDelta<<CompLossy;
                        ColorCode[i]=Mod(ColorCode[i]+DifColorDelta);
                    }
                }
            }
        }
    }
    else
    {
        for(int i=0;i<3;i++)
        {
            if(ColorSign[i]==0)
                Mod(ColorCode[i]+(<<CompLossy));
            else if(ColorSign[i]==1)
                Mod(ColorCode[i]-(<<CompLossy));
        }
    }
}
}
```

| Method 33.2 |
|---|

```
template<typename CodeType> RestoreColorCodeLossySigned(CodeType[ ]
ColorProCode, SetLossy CompLossy, CodeType[ ]ColorCode)
{
  CodeType MaxorMainColorDelta, MainColorDelta, DifColorDelta;
  BYTE Flag[2];
  ColorCode=ColorProCode;
  ColorSign<<ConnpLossy;
  if(ColorSign!={2,2,2})
  {
     if(ColorSign=={0,0,0})
     {
        MaxorMainColorDelta<<CompLossy;
        if(MaxorMainColorDelta1=MaxDelta)
        {
           for(int i=0;i<3;i++)
           {
              ColorCode[i]+=MaxorMainColorDelta;
           }
        }
        else
        {
           MainColorDelta<<CompLossy;
           for(int i=0;i<3;i++)
           {
              ColorCode[i]+=MainColorDelta;
           }
           Flag<<CompLossy;
           if(Flag!={2,2}) //if Flag has '0' or '1' value //this checking could be absent
           {
              for(int i=0,int j=0;i<3;i+=2,j++)
              {
                 if(Flag[i]==0)
                 {
                    DifColorDelta<<CompLossy;
                    ColorCode[i]+=DifColorDelta;
//two statements above could be replaced by "ColorCode[i]+<<DifColorDelta"
                 }
                 else if(Flag[i]==1)
                 {
                    DifColorDelta<<CompLossy;
                    ColorCode[i]-=DifColorDelta;
//two statements above could be replaced by "ColorCode[i]-? DifColorDelta"
                 }
              }
           }
        }
     }
     else if(ColorSign=={1,1,1})
     {
        MaxorMainColorDelta<<CompLossy;
        if(MaxorMainColorDelta!=MaxDelta)
        {
           for(int i=0;i<3;i++)
           {
              ColorCode[i]-=MaxorMainColorDelta;
           }
        }
        else
        {
           MainColorDelta<<CompLossy;
           for(int i=0;i<3;i++)
           {
              ColorCode[i]-=MainColorDelta;
           }
           Flag<<CompLossy;
           if(Flag!={2,2}) //if Flag has '0' or '1' value //this checking could be absent
           {
              for(int i=0,int j=0;i<3;i+=2,j++)
              {
                 if(Flag[i]==0)
                 {
                    DifColorDelta<<CompLossy;
                    ColorCode[i]-=DifColorDelta;
//two statements above could be replaced by "ColorCode[i]-<<DifColorDelta"
                 }
                 else if(Flag[i]==1)
                 {
                    DifColorDelta<<CompLossy;
                    ColorCode[i]+=DifColorDelta;
```

| Method 33.2 |
|---|

```
//two statements above could be replaced by a "ColorCode[i]+<<DifColorDelta"
              }
            }
          }
        }
      }
      else
      {
        for(int i=0;i<3;i++)
        {
          if(ColorSign[i]==0)
            ColorCode[i]+<<CompLossy;
          else if(ColorSign[i]==1)
            ColorCode[i]-<<CompLossy;
        }
      }
    }
}
```

Flowchart version of RestoreColorCodeLossyModal (Methods 32.1 and 33.1) and RestoreColorCodeLossySigned (Methods 32.2 and 33.2) algorithms is represented in FIG. 48 (RestoreColorCodeLossy Algorithm 110).

Methods 34.1, 34.2, 35.1 and 35.2 are near-lossless analogs of Methods 24.1, 24.2, 25.1 and 25.2, when the ColorCode already has the values of its procode. Such algorithms could be used for restoring of the current stream if the used procodes are vertical (or vertical, triangular and horizontal) and the previous stream could be considered as current stream initialized by vertical procodes (vertical procodes are equal to the codes of the previous stream, which is the previous line for an image and it is the appropriate stream in the previous frame for the video), which means current stream ColorCode values already could have appropriate values of the previous stream. The real purpose of such algorithms is for decoding video streams encoded by vertical (or preferably vertical) procoding method. That means we can apply changes or difference of the current stream directly into previous stream which we already have encoded (without making its copy, which saves time and memory). This significantly increases the speed of frame decoding for the video.

4.1.1.9. Scoring Algorithms

Additional scoring algorithms are optional and they may be used for choosing the most effective indexing/procoding method for encoding the gray/color code of the regular stream. Scoring algorithms quantify indexing/procoding methods to choose the best (the most efficient) one for application to the gray/color code of the regular stream. Therefore, each gray/color code must be encoded by all indexing/procoding methods for each method to be quantified by the scoring algorithms. Optionally, the regular stream may be encoded without applying scoring algorithms. That is, all codes of the regular stream may be encoded by the same indexing/procoding method for the fast encoding or decoding (the optimal indexing/procoding method is the triangular/square one for the image and the vertical one for the video). Another example, all codes of the regular stream may be encoded/decoded by horizontal indexing/procoding method in memory-critical systems like fax machines, for not utilizing additional memory for storing the previous encoded/decoded line.

The purpose of scoring algorithms is to quantify efficiency of all indexing (indexed-color) or procoding (grayscale and true-color) methods for encoding/compacting the Code/ColorCode for choosing the best one to apply for

| Method 34.1 and Method 34.2 |
|---|

```
template<typename CodeType> RestoreColorCodeLossyModal(SetLossy CompLossy,
CodeType[ ] ColorCode)
{
/*the only difference of this algorithm from Method 32.1/32.2 is the absence of
"ColorCode=ColorProCode;" statement*/
  . . .
}
```

| Method 35.1 and Method 35.2 |
|---|

```
template<typename CodeType> RestoreColorCodeLossySigned(SetLossy CompLossy,
CodeType[ ] ColorCode)
{
/*the only difference of this algorithm from Method 33.1133.2 is the absence of
"ColorCode=ProCode;" statement*/
  . . .
}
``` regular (not initial) compressible unit (the beginning of initial compressible unit (associated with initial stream) may be encoded only by horizontal indexing/procoding method). Each Code/ColorCode of indexed-color, grayscale and true-color stream must be encoded in accordance with one of the methods, and the purpose of scoring algorithms is to find the optimal method for the encoding. Scoring algorithms are discretionary and they are not the part of the algorithms of encoding of stream or compressing of compressible unit. Their definition is not even included into the format of compressed image/video file. It means advanced or improved (more effective) scoring algorithm could replace the old ones for achieving a better compression rate, without making any changes in encoding algorithm or the file format (new scoring algorithms could be embedded into decoder algorithm for generating improved sequence of applied methods for the codes).

There may be different kind of scoring algorithms. The algorithms represented here are individual scoring algorithms—they must be applied to each encoded/compacted Code/ColorCode individually. These algorithms are not perfect but they are effective tools for choosing indexing or procoding method for each Code/ColorCode of the stream.

The values of encoded/compacted Code/ColorCode are recommended to take into consideration in scoring algorithms. According these algorithms would be chosen the indexing/procoding method having the least score, which means the codes encoded by the chosen method, may require the least bits for the storage.

DeltaScore algorithm/DeltaScore method returns the score for the 'delta' value equal to the group number of the 'delta' according to the table for the channel (bit-depth) of the 'delta', described later in the Optimization 90 of Compressor module 20. For example, if 'delta' is an index, its appropriate table is Table 5 or if it is 16-bit channel Delta, its appropriate table is Table 7, etc. In other words, Delta Score method returns the group number of the 'delta' (see appropriate tables). 'delta' is an index; Delta or CompDelta (defined later for the true-color) value of indexed-color; grayscale or true-color compressible unit respectively. The calculated score is bigger if the 'delta' is bigger. If 'delta' is an index, it should be computed by 'm' indexing method, m={0;1;2}, where '0' is horizontal, '1' is vertical and '2' is triangular indexing method, If 'delta' is Delta or CompDelta (grayscale or true-color respectively), it should be computed by 'm' procoding method, m={0;1;2,3}, where '0' is horizontal, '1' is vertical, '2' is triangular and '3' is square procoding method. Additionally, if the 'delta' is an index of indexed-color or Delta of grayscale, it, as well as returned value (score) of the DeltaScore( ) also could be '0', but the CompDelta of the true-color never has '0' value, therefore, the returned value of the DeltaScore( ) never could be '0' for the CompDelta.

Score(int m, int s, int w) method calculates and returns the score for the 'm' indexing/procoding method of the encoded and compacted Code[s][w]/ColorCode[s][w] ('s' is the number of the stream, 'r' is the number of the code in the stream), taking into consideration also Sign values. Because of encoded/optimized indexed-color Code[s][w] hasn't Sign component, DeltaScore and Score methods are identical for the indexed color encoded and optimized Code. Score method is defined below for indexed-color, grayscale and true-color compressible units individually.

ChoseMethod(int s, int w) algorithm 96 is for choosing the optimal indexing/procoding method for the encoded and compacted Code[s][w]/ColorCode[s][w], taking into consideration calculated scores for all methods. The method having minimal score must be chosen. 'M' variable contains current chosen indexing/procoding method, which is the optimal method to be applied to the current encoded (and compacted) Code[s][w]/ColorCode[s][w].

If the current scoring encoded (and compacted) Code[s][w]/ProCode[s][w] is not the first one of the stream (if s≠0), initially 'M' contains the chosen indexing/procoding method for the previous code of the stream (the method for the Code[s][w−1]/ColorCode[s][w−1]), and ChooseMethod( ) is for choosing the method for the current code and assigning it to the 'M'. But if current code is the first one of the stream (if w=0), 'M' has its default initial value: it is '1' (first code of the stream can use only vertical indexing/procoding method). The most efficient methods are: '2' for the indexed-color stream of the image and '3' for the grayscale and true-color stream of the image and '1' for the video stream.

Generally, default initial 'M' could be the most efficient indexing/procoding method for each type of stream. For example, for the grayscale and true-color stream of the image initial 'M' is '3' because usually square procoding method is the optimal one for the most encoded (and compacted) gray/color codes of the stream. For any type of video streams the best indexing/procoding method is the vertical one, because in that case the procode is the appropriate gray/color code of the previous frame (usually having the same or nearly the same value with the gray/color code). MStorage array includes chosen methods for all codes of the stream. So, ChoseMethod( ) is for initializing the MStorage array. Priority array includes indexing/procoding methods situated according their efficiency.

For the indexed-color image/video streams Priority[3]={2,0,1}/Priority[3]={1,2,0} respectively; for image streams '2' indexing method is statistically the most efficient method, then comes '0', then '1', for video streams '1' indexing method is statistically the most efficient method, then comes '2', then '0'.

For grayscale and true color image/video streams Priority[4]={3,2,0,1}/Priority[4]={1,3,2,0}; for image streams '3' procoding method is statistically the most efficient method,

---

Method 36

---

```
//delta[m] computed by the m indexing/procoding method
//definitions and tables of 'group number' and 'extra bits' are given later
int template<typename CodeType> DeltaScore(CodeType delta[m], int m)
{
  if(<delta[m] hasn't extra bits>)
     return <group number of the delta[m]>;
  else
     return <group number of the biggest delta which hasn't extra bits> + <extra bits of
         delta[m]>;
}
``` then come '2', '0', '1' respectively, for video streams it is an image Priority array shifted to the right by one: '1' procoding method is statistically the most efficient method, then come '3', '2', '0' respectively. 'Q' is the quantity of indexing/procoding methods or it is the size of Priority array (Q=3 for the indexed-color and it is '4' for the grayscale and true-color).

---
Method 37
---
```
int M;
int MStorage[ ][ ];
const int Priority[ ];
const int Q;
ChooseMethod(int s, int w)
{
  int score;
  int min=Score(M,s,w); //step 1
  if(!min) //if Score(M,s,w) returned 0 //step 2
  {
    MStorage[s][w]=M;
    return;
  }
  min-=2; //step 3
  for(int i=0;i<Q;i++) //step 4
  {
    int j=Priority[i];
    if(j!=M)
    {
      scores=Score(j,s,w);
      if(!scores) //if Score(j,s,w) returned 0
      {
        M=j;
        MStorage[s][w]=M;
        return;
      }
      else
      {
        if(scores<min)
        {
          min=scores;
```

---
Method 37
---
```
          M=j;
        }
      }
    }
  }
  MStorage[s][w]=M;
}
```

At step 1, the first calculated score is for current (M) indexing/procoding Method (if w>0, M=MStorage[s][w−1]: 'M' includes the method chosen for the previous code of the stream), and the calculated score is assigned to the 'min' variable. Step 2 checks, if the value of the 'min' is '0', 'M' stays unchanged and it is also assigned to the current position of the MStorage array (MStorage[s][w]==MStorage[s][w−1]). Step 3 decreases the value of 'min' by 2, for changing current Method by the new one only if its calculated score is less than the score of current Method at least by 3 (because new chosen Method must be stored, and the new Method must be efficient enough for overlapping the growth of size for its storage). Then the loop (step 4) calculates scores for other indexing/procoding methods by the order of their priority (the order is given in Priority array). If the calculated score is '0', 'M' gets its new value and it assigns to the current position of the MStorage array and method returns, otherwise if the score is less than the value of 'min', the score is assigned to the 'min'. Score( ) method is specified for each type of the Code/ColorCode later. The flowchart of the ChoseMethod( ) is represented in the FIG. 40.

4.1.1.9.1. Indexed-Color Scoring Algorithm

Scoring algorithm for the indexed-color stream coincides with the DeltaScore algorithm—Score( ) encapsulates DeltaScore( ). 'Index[m][s][w]' is computed by the 'm' indexing method:

---
Method 38
---
```
int Score(int m, int s, int w)
{
  return DeltaScore(Index[m][s][w],m); rindex[m][s][w]is computed for 'm' indexing method*/
}
```

4.1.1.9.2. Grayscale Scoring Algorithm

Scoring algorithm for the grayscale stream takes into consideration also the Sign value: if Delta[m][s][w]!=0, grayscale stream needs a bit for storing the Sign. That is why if score is not zero (if Sign must be stored), it is increased by '1'. 'Delta[m][s][w]' is computed by the 'm' procoding method:

---
Method 39
---
```
int Score(int m, int s, int w)
{
  int score=DeltaScore(Delta[m][s][w],m); /*Delta[m][s][w] is computed for 'm' procoding method*/
  if(score)
    return score+1;
  else
    return 0;
}
```

4.1.1.9.3. Lossless and Nearly Lossless True-Color Scoring Algorithm

In the true-color scoring algorithm 98 described here, all color samples must be encoded by the same (common) procoding method. But the invention reserves the right to use another type of scoring algorithms, particularly where procoding method for the each sample of the color code could be chosen individually (the color samples could be encoded by different chosen procoding methods). 'Comp[m][s][w]' is computed by the 'm' procoding method.

Because of '3' or square procoding method usually is the best for the vast majority of codes of the compressible unit, the square procoding method would be chosen in the vast majority of the codes. That's why the regularities defined for the streams encoded by the square method are also true for the streams encoded by mixed procoding methods (chosen by scoring). The algorithm of scoring for the true-color is developed having in mind the regularities. Method 40.1 is for the Modal Flag, Method 40.2 is for the Signed Flag (FIG. 41.1) and Methods 40.3, 40.4 are their near-lossless analogs (FIG. 41.2):

Method 40.1

```
int Score(int m, int s, int w)
{
   int score;
   if(Comp[m][s][w].ColorSign=={2,2,2}) /*step 1, Comp[m][s][w] is computed for 'm' procoding method*/
      return 0;
   else if(Comp[m][s][w].ColorSign=={0,0,0} || Comp[m][s][w].ColorSign=={1,1,1}) //step 2
   {
      score=DeltaScore(Comp[m][s][w].MainColorDelta,m); //step 3
      if(Comp[m][s][w].Flag=={0,0,0}) //step 4
         score+=1; //step 5
      else
      {
         score+=3; //step 6
         for(int i=0;i<3;i++) //step 7
         {
            if(Comp[m][s][w].Flag[i]==1) //if Comp[s][w].Flag[i]!=0
            {
               score+=DeltaScore(Comp[m][s][w].DifColorDelta[i],m);
            }
         }
      }
   }
   else
   {
      score=4; //step 8
      for(int i=0;i<3;i++) //step 9
      {
         if(Comp[m][s][w].ColorSign[i]!=2)
            score+=DeltaScore(Comp[m][s][w]. ColorDelta[i], m);
      }
   }
   return score;
}
```

Method 40.2

```
int Score(int m, int s, int w)
{
   int score;
   if(Comp[m][s][w].ColorSign=={2,2,2}) //step 1
      return 0;
   else if(Comp[m][s][w].ColorSign=={0,0,0}II ComP[m]+sliwiColorSign=={1,1,1}) //step 2
   {
      score=DeltaScore(Comp[m][s][w].MainColorDelta,m); //step 3
      if(Comp[m][s][w].Flag=={2,2}) //step 4
         score+=1; //step 5
      else
      {
         score+=3; //step 6
         for(int i=0,int j=0;i<3;i+=2,j++) //step 7
         {
            if(Comp[m][s][w].Flag0=2) //if Comp[m][s][w].Flag[j]==0 or 1
            {
               score+=DeltaScore(Comp[m][s][w].DifColorDelta[i],m);
            }
         }
      }
   }
   else
   {
```

Method 40.2

```
    score=4; //step 8
    for(int i=0;i<3;i++) //step 9
    {
      if(Comp[m](sINIColorSign+ill=2)
        score+=DeltaScore(Cornp[m][s][w].ColorDelta[i],m);
      }
    }
  }
  return score;
}
```

Step 1 of Methods 40.1 and 40.2 checks, if ColorSign member of the Comp set is null, method returns '0'. Step 2 checks, if it is {0,0,0} or {1,1,1}, step 3 assigns the group number of MainColorDelta of the Comp set to the score. Then step 4 checks, if Flag of the Comp set is null (null modal flag is {0,0,0} and null signed flag is {2,2}), score increases by '1' (step 5), else it increases by '3' (step 6). Then increases the score by the group numbers of DifColorDelta values of Comp set (the returning values of DeltaScore( ), step 7). But if ColorSign array of the Comp is neither null nor {0,0,0}/{1,1,1}, assigns '4' to the score (step 8) and increases score by the group numbers of ColorDelta values of Comp set (the returning values of DeltaScore( ), step 9).

Method 40.3

```
int Score(int m, int s, int w)
{
  int score;
  if(CompLossy[m][s][w].ColorSign=={2,2,2}) /*step 1, CompLossy[m][s][w]is computed
for 'm' procoding method*/
      return 0; //step 2
  else if(CompLossy[m][s][w].ColorSign=={0,0,0}||
CompLossy[m][s][w].ColorSign=={1,1,1}) //step 3
    {
      if(CorrectionType[m]!=-1) //step 4
      {
        score=DeltaScore(CompLossy[m][s][w].MaxorMainColorDelta,m); //step 5
      }
      else
      {
        score=DeltaScore(MaxDelta); //step 6
        score+=DeltaScore(CompLossy[m][s][w].MainColorDelta,m);
        score+=3;
        for(int i=0;i<3;i++)
        {
          if(CompLossy[m][s][w].DifColorDelta[i]!=0)
          {
            score+=DeltaScore(CompLossy[m][s][w]. DifColorDelta[i], m);
          }
        }
      }
    }
    else
    {
      score=4;
      for(int i=0;i<3;i++)
      {
        if(CompLossy[m][s][w].ColorSign[i]!=2)
          score+=DeltaScore(CompLossy[m][s][w]. ColorDelta[i], m);
      }
    }
  return score;
}
```

Method 40.4

```
int Score(int m, int s, int w)
{
  int score;
  if(CompLossy[m][s][w].ColorSign=={2,2,2}) //step 1
     return 0; //step 2
  else if(CompLossy[m][s][w].ColorSign=={0,0,0}||
```

-continued

Method 40.4

```
CompLossy[m][s][w].ColorSign=={1,1,1}) //step 3
{
    if(CorrectionType[m]!=-1) //step 4
    {
        score=DeltaScore(CompLossy[m][s][w].MaxorMainColorDelta,m); //step 5
    }
    else
    {
        score=DeltaScore(MaxDelta); //step 6
        score+=DeltaScore(CompLossy[m][s][w].MainColorDelta,m);
        score+=3;
        for(int i=0,int j=0;i<3;i+=2,j++)
        {
            if(CompLossy[m][s][w].Flag[jp=2) //if CompLossy[m][s][w].Flag[j]=0 or 1
            {
                score+=DeltaScore(CompLossy[m][s][w].DifColorDelta[i],m);
            }
        }
    }
}
else
{
    score=4;
    for(int i=0;i<3;i++)
    {
        if(CompLossy[m][s][w].ColorSign[i]!=2)
            score+=DeltaScore(CompLossy[m][s][w].ColorDelta[i],m);
    }
}
return score;
}
```

Methods 40.3 and 40.4 differ from Methods 40.1 and 40.2 in the step 4, where it is checked, if RB Transform is allowed, score set to DeltaScore(CompLossy[m][s][w] .MaxorMainColorDelta,m), which appears to be the only CompDelta of the CompLossy set. Else extra DeltaScore (MaxDelta) is added to the score (step 6).

It is interesting that CompLossyDelta values (the delta values of CompLossy) are scoring the same manner as CompDelta values (the delta values of Comp).

4.1.1.9.4. Method of Storing Sequence of Chosen Indexing/Procoding Methods

This method is for storing the 'MStorage' sequence of indexing/procoding methods of the compressible or compressed unit, chosen for each Code/ColorCode by the scoring algorithms (this method may be applied if the scoring algorithms were applied).

The decoder needs the sequence of applied indexing/procoding methods for each code, so 'MStorage' must be stored in the compressed unit.

MStorage array is stored by run-length coding, where the length is the number of codes of the compressible unit encoded by the same indexing/procoding method uninterruptedly. In the ChooseMethod algorithm 96 current method has priority—its score is calculated first and if the score is zero for the current and also for another method, the current one would be chosen. That makes it possible to switch 'M' less frequently and have longer lengths for the chosen methods.

StoreMethods 100 algorithm is for converting MStorage array to two, DMStorage and LStorage queues. Initial 'M' always is '1' (vertical one). And so, indexing/procoding method of the first code of the compressible unit is pre-defined, algorithm does not store that in DMStorage and the size of DMStorage queue is less by one than the size of LStorage queue. First value of the LStorage queue stores the number of the codes in the beginning of compressible unit having vertical (initial M) indexing/procoding method and after each switch of the method the new value is appended to the DMStorage and LStorage queues.

'S' is the number of streams of compressible unit (S21) and 'W' is number of gray/color code of the stream. Initial 'M' is always '1'—it is not stored. RPriority array is the reversed version of the Priority array—RPriority[M] value is the index of 'M' in the Priority array and Priority[i]=M means RPriority[M]=i (for example, for the grayscale and true-color images RPriority={2,3,1,0}).

StoreMethodsSingle(int s) method (Method 41.1) is for image compressible unit containing single stream (line of partition) or for video compressible unit. StoreMethodsMultiple( ) (Method 41.2) is for image compressible unit containing a partition (streams of the partition):

Method 41.1

```
deque<int>DMStorage;
deque<int>LStorage;
const int RPriority[ ];
int MStorage[ ][ ];
const int W;
StoreMethodsSingle(int s)
{
    int M=1; //step 1
    Length=1; //step 2
    for(int w=1;w<W;w++) //step 4
    {
        if(MStorage[s][w]==M) //M is the current method
        {
            Length++;
        }
        else
        {
            if(RPriority[MStorage[s][w]]<RPriority[M])
```

-continued

Method 41.1

```
        DMStorage.push_back(RPriority[MStorage[s][w]]);
      else //if(RPriority[MStorage[s][w]]>RPriority[M])
        DMStorage.push_back(RPriority[MStorage[s][w]]-1);
      M=MStorage[s][w];
      LStorage.push_back(Length);
      Length=0;
      }
    }
  }
}
```

Method 41.2

```
deque<int> DMStorage;
deque<int> LStorage;
const int RPriority[ ];
int MStorage[ ][ ];
const int S;
const int W;
StoreMethodsMultiple( )
{
  int M=1; //step 1
  Length=1; //step 2
  for(int s=1;s<S;s++) //step 3
    for(int w=1;w<W;w++) //step 4
    {
      if(MStorage[s][w]==M) //M is the current method
      {
        Length++;
      }
      else
      {
        if(RPriority[MStorage[s][w]]<RPriority[M])
          DMStorage.push_back(RPriority[MStorage[s][w]]);
        else //if(RPriority[MStorage[s][w]]>RPriority[M])
          DMStorage.push_back(RPriority[MStorage[s][w]]-1);
        M=MStorage[s][w];
        LStorage. push_back(Length);
        Length=0;
      }
    }
  }
}
```

'M' and 'Length' are initialized by '1' because all gray/color code of regular stream always encodes by vertical ('1') method (steps 1 and 2). Because of that all streams skip storing the method of the first gray/color code of the stream (Method 41.2, step 4). 's' is also initialized by '1' (Method 41.2, step 3) because initial ('0') stream uses only horizontal ('0') method and it does not need to be stored in MStorage array. This algorithm is checking, if the next method stored in MStorage array equals the 'M' (or the previous one), Length is increasing by '1', else the current chosen method is stored by described algorithm, and begins counting of the next chosen method.

The flowchart version of the StoreMethods algorithm 100 is given in the FIG. 42.1. The FIG. 42.2 is an example of transferring MStorage array into DMStorage and LStorage queues.

The reverse of the StoreMethods Algorithm 100 (ReStoreMethods algorithm) inputs DMStorage and LStorage queues and restores (outputs) the applied 'M' values for the codes of compressible unit for its decoding (applied method must be known for the decoding the Code/ColorCode):

For indexed-color image compressible units RPriority[3]={1,2,0} (Priority[3]={2,0,1}), for indexed color video compressible units image Priority array is shifted by one to the right, RPriority[3]={2,0,1} (Priority[3]={1,2,0}). For the grayscale/true-color image compressible units square method is added: RPriority[4]={2,3,1,0} (Priority[4]={3,2,0,1}), for grayscale/true-color video compressible units image Priority array is shifted by one to the right, RPriority[4]={3,0,2,1} (Priority[4]={1,3,2,0}).

DMStorage array stores not the methods but 0-based indexes of the methods in the Priority array, without taking into consideration the current method. For example, for the grayscale/true-color images instead of storing {[1 . . . ], 3, 2, 3, 2, 1, 0, . . . } sequence of procoding methods it is stored {0, 0, 0, 0, 2, 2, . . . } ('3' has '0' index, '2' has '0' index ('3' is not considered), '3' has '0' index, '2' has '0' index ('3' is not considered), '1' has '2' index ('2' is not considered), '0' has '2' index in the Priority array, etc.). That decreases by one the size of the alphabet of the symbols stored in the DMStorage. For the indexed-color that means size of the alphabet is not '3' but '2', therefore lengths of their Huffman codes could be {1,1} instead of {1,2,2} and for the grayscale/true-color that means size of the alphabet is not '4' but '3'—therefore lengths of their Huffman codes could be {1,2,2} instead of {2,2,2,2} or {1,2,3,3} (see Huffman coding below).

Because usually the most frequently chosen procoding method is '3' for the grayscale/true-color units, '2' is the next (nearly the most procoding methods are 3 or 2), could be used predefined Huffman table for the Huffman coding of the items of DMStorage array. That may increase the speed of encoding/decoding algorithm and does not require Huffman table—it is enough to reserve just 2 bits for storing the size of the alphabet (the variety of codes) of the DMStorage array).

For indexed-color image DMStorage:
1) size '3' does not exist; size '2' means Priority[3]={2,0,1} and predefined Huffman codes are {0,1};
2) size '1' means Priority[2]={2,0} ('1' indexing method is not used for encoding the stream) and predefined Huffman code is {0} (which will not be stored in the compressed unit); and
3) size '0' means Priority[1]={2} (only '2' indexing method is used for encoding the stream) and the Huffman codes are absent.

For indexed-color video DMStorage:
1) size '3' does not exist, size '2' means Priority[3]={1,2,0} and predefined Huffman codes are {0,1};
2) size '1' means Priority[2]={1,2} ('0' indexing method is not used for encoding the stream) and predefined Huffman code is {0} (which will not be stored in the compressed unit) and
3) size '0' means Priority[1]={1} (only '1' indexing method is used for encoding the stream) and Huffman codes are absent.

For grayscale/true-color image DMStorage:
1) size '3' means Priority[4]={3,2,0,1} and predefined Huffman codes are {1,01,00}/{0,10,11};
2) size '2' means Priority[3]={3,2,0} ('1' procoding method is not used for encoding the stream) and predefined Huffman codes are {0,1};
3) size '1' means Priority[2]={3,2} ('0', '1' procoding methods aren't used for encoding the stream) and predefined Huffman code is {0} (which will not be stored in the compressed unit) and
4) size '0' means Priority[1]={3} (only '3' procoding method is used for encoding the stream) and Huffman codes are absent.

For grayscale/true-color video DMStorage:
1) size '3' means Priority[4]={1,3,2,0} and predefined Huffman codes are {1,01,00}/{0,10,11};

2) size '2' means Priority[3]={1,3,2} ('0' procoding method is not used for encoding the stream) and predefined Huffman codes are {0,1};
3) size '1' means Priority[2]={1,3} ('2', '0' procoding methods aren't used for encoding the stream) and predefined Huffman code is {0} (which will not be stored in the compressed unit) and
4) size '0' means Priority[2]={1} (only '1' procoding method is used for encoding the stream) and Huffman codes are absent.

The change of the M value (change of the current method) grows DMStorage queue by one (it appends the new method to it), but because of new chosen method has a big probability of being more efficient, it could compensate the growth of DMStorage (storing the new DMStorage member). The first processed method in the ChoseMethod algorithm 96 is the current method because in case of having equal scores for the current and another method current method has priority—current method stays unchanged for not appending the new member to the DMStorage and having longer lengths in the LStorage.

The methods are situated in the Priority according to their efficiency and they are processing by that order in the ChoseMethod algorithm 96 because of two reasons:
1) A more efficient method also has a bigger probability of equalizing the Sign/ColorSign of the encoded Code/ColorCode of the stream to null (2/{2,2,2}), so, processing more efficient method it is likely that could have null score in the ChoseMethod( ) earlier and could terminate the ChoseMethod( ) faster.
2) For grayscale/true color compressible units we could need only 1-bit Huffman code for representing most common switch between the most superior procoding methods in the DMStorage queue—from '3' to '2' and from '2' to '3'. For example, {[1 . . . ], 3, 2, 3, 2, 1, 0, . . . } sequence of procoding methods could be represented by {0, 0, 0, 0, 11, 11, . . . } Huffman codes in the DMStorage queue.

4.1.1.10. Creation of Compressible Units

FIG. 54 demonstrates the input of the Converter module 30 is stream(s) (one or more stream) and the output is a lossless/near-lossless compressible unit (near-lossless is for the true-color only). 's' is the number of the stream and 'w' is the number of the encoded/compacted gray/color code of the stream. Convert algorithms/methods below convert (encode (and compact)) gray/color code to the either encoded code (indexed-color and grayscale) or Comp/CompLossy set (true-color). Convert algorithms/methods could be applied to the gray/color code of the stream(s) with or without scoring algorithms. Version with scoring algorithm makes conversion of the gray/color code for all methods and chooses the best one. Version without scoring algorithm deals only with one indexing/procoding method. For example all gray/color codes could be converted using only triangle (2) indexing/procoding method. There are two ways of reversing to the convert algorithms for the restorer module 32 for getting gray/color code for the converted one:
1) using algorithms of extract, then decode family (defined above);
2) using algorithms of restore family (defined above).

Conversion of the initial stream is also an example of applying convert methods/algorithms without scoring—only horizontal (0) method could be applied for converting the gray/color codes of an initial stream. True-color case also has an additional two versions—near-lossless with or without scoring algorithms.

4.1.1.10.1. Converting Indexed-Color Code

Encode(BYTE code, BYTE& index, int m) algorithm/method encodes indexed-color code by given ('m') indexing method and stores the result in the index variable.

Methods 42.1 and 42.2 are Convert algorithm versions for the indexed-color code with and without scoring respectively:

| Method 42.1 |
| --- |
| /*for conversion of initial streams and regular<br>streams without scoring (using the only<br>and predefined indexing method)*/<br>ConvertWithoutChoose(int s, int w, int m)<br>{<br>  Encode(Code[s][w], Index[m][s][w], m);<br>} |

As you see, converting indexed-color code without choosing the method means just encoding it by the predefined indexing method.

| Method 42.2 |
| --- |
| //for conversion of regular streams with scoring<br>ConvertWithChoose(int s, int w)<br>{<br>  for(int m=0;m<3;m++)<br>    Encode(Code[s][w], Index[m][s][w], m);<br>  ChoseMethod(s,w);<br>} |

As you see, converting indexed-color code with choosing the method means to encode it by all indexing methods, then to apply ChooseMethod Algorithm 96 for choosing the encoding method for the code. The flowchart of this algorithm is shown in FIG. 49.

4.1.1.10.2. Converting Grayscale Code
1) Encode algorithm/method encapsulates appropriate algorithm/method of the encode family: EncodeCode( ), EncodeCodeAbs8( ), EncodeCodeAbs16( ), EncodeCodeAbs32( ), etc.

Methods 43.1 and 43.2 are Convert algorithm versions for the grayscale code with and without scoring respectively:

| Method 43.1 |
| --- |
| /*for conversion of initial streams and regular<br>streams without scoring (using the only<br>and predefined procoding method)*/<br>ConvertWithoutChoose(int s, int w, int m)<br>{<br>  Encode(ProCode[m][s][w],Code[s][w],<br>  Sign[m][s][w],Delta[m][s][w]);<br>} |

As you see, converting grayscale code without choosing the method means just encoding it by the predefined procoding method.

| Method 43.2 |
| --- |
| //for conversion of regular streams with scoring<br>ConvertWithChoose(int s, int w)<br>{<br>  for(int m=;m<4;m++)<br>    Encode(ProCode[m][s][w],Code[s][w],<br>    Sign[m][s][w],Delta[m][s][w]);<br>  ChoseMethod(s,w);<br>} |

As you see, converting grayscale code with choosing the method means to encode it by all procoding methods, then to apply ChooseMethod Algorithm 96 for choosing the encoding method for the code. The flowchart of this algorithm is shown in FIG. 49.

4.1.1.10.3. Converting True-Color Code

1) Encode algorithm/method encapsulates appropriate algorithm/method of the encode family: EncodeColorCode( ), EncodeColorCodeAbs8( ), EncodeColorCodeAbs16( ), EncodeColorCodeAbs32( ), etc.

2) Compact algorithm/method is encapsulating CompactColorDeltaModal( ); CompactColorDeltaSigned( ); CompactColorDeltaLossyModal( ); CompactColorDeltaLossySigned( ). If the Compact algorithm/method is near-lossless, the encoded stream/compressible unit is near-lossless too.

Methods 44.1 and 44.2 are lossless Convert algorithm versions for the color code with and without scoring respectively and Methods 44.3 and 44.4 are near-lossless Convert algorithm versions for the color code without and with scoring respectively:

Method 44.1

```
/*for lossless conversion of initial streams and regular
streams without scoring (using
the only and predefined procoding method)*/
ConvertWithoutChoose(int s, int w, int m)
{
    Encode(ProCode[m][s][w], ColorCode[s][w],
    ColorSign[m][s][w], ColorDelta[m][s][w]);
    Compact(ColorSign[m][s][w],ColorDelta[m][s][w],Comp[m][s][w]);
}
```

As you see, lossless conversion of the true-color code without choosing the method means to encode, then to compact it by the predefined procoding method. The flowchart of this algorithm is shown in FIG. 50.

Method 44.2

```
//for lossless conversion of regular streams with scoring
ConvertWithChoose(int s, int w)
{
    for(int m=0;m<4;m++)
    {
        Encode(ProCode[m][s][w], ColorCode[s][w],
        ColorSign[m][s][w],ColorDelta[m][s][w]);
        Compact(ColorSign[m][s][w],ColorDelta[m][s][w],Comp[m][s][w]);
    }
    ChoseMethod(s,w);
}
```

As you see, lossless converting true-color code with choosing the method means to encode and compact it by all procoding methods, then to apply ChooseMethod Algorithm 96 for choosing the encoding method for the color code. The flowchart of this algorithm is shown in FIG. 51.

Method 44.3

```
/*for near-lossless conversion of true color initial
streams and regular streams without
scoring (using the only and predefined procoding method)*/
ConvertWithoutChooseLossy(int s, int w, int m)
{
Encode(ProCode[m][s][w], ColorCode[s][w],
ColorSign[m][s][w], ColorDelta[m][s][w]);
//step 1
if(ColorSign[m][s][w]=={0,0,0} ||
```

Method 44.3 -continued

```
ColorSign[m][s][w]=={1,1,1}) //step 2
{
    CorrectionInit(ColorSign[m][s][w],
    ColorDelta[m][s][w], m); //step 3
    Compact(ColorSign[m][s][w],ColorDelta[m][s][w],
    Comp[m][s][w]); //step 4
    if(CorrectionType[m]>0) //step 5
        CorrectionApply(ColorSign[m][s][w],
        ColorCode[s][w], m); //step 6
}
else
{
    for(int i=0;i<3;i++) //step 7
    {
        if(ColorSign=[i]!=2) //if(ColorDelta[i]==0 || ColorDelta[i]==1) //8
            CompLossy<<ColorDelta[i]; //9
    }
}
}
```

Nearly lossless converting true-color code without choosing the method means to encode it by 'm' predefined procoding method (step 1). Then, if ColorSign array of the encoded color code is {0,0,0}/{1,1,1} (step 2), CorrectionInit( ) method is called (step 3), which, in particular, initializes CorrectionType[m] (CorrectionInit Algorithm 102). Then the encoded code is compacted (step 4). Then if CorrectionType[m] is not zero (step 5), CorrectionApply algorithm 104 is called (step 4), which changes one or more color code samples (main sample may not be changed). Otherwise, if ColorSign array of the encoded color code is not {0,0,0}/{1,1,1}, just the encoded code is compacted in the manner of Contact(ColorSign[m][s][w], ColorDelta[m][s][w], Comp[m][s][w]) when "ColorSign[m][s][w]!={0,0,0} && ColorSign[m][s][w]!={1,1,1}".

The flowchart of this algorithm is shown in FIG. 52.

Method 44.4

```
//for near-lossless conversion of true-color regular streams with scoring
ConvertWithChooseLossy(int s, int w)
{
    for(int m=0;m<4;m++) //step 1
    {
        Encode(ProCode[m][s][w], ColorCode[s][w],
        ColorSign[m][s][w], ColorDelta[m][s][w]);
//step 2
        if(ColorSign[m][s][w]=={0,0,0} || ColorSign[m][s][w]==
        {1,1,1}) //step 3
        {
            CorrectionInit(ColorSign[m][s][w],
            ColorDelta[m][s][w], m); //step 4
        }
        else
        {
            CorrectionType[m]=-2; //step 5
        }
        Compact(ColorSign[m][s][w],ColorDelta[m][s][w],
        Comp[m][s][w]); //step 6
    }
    ChoseMethod(s,w); //step 7
    if(CorrectionType[M]>0) //step 8, 'M' is chosen procoding method
        CorrectionApply(ColorSign[M][s][w],
        ColorCode[M][s][w],M); //step 9
}
```

Nearly lossless converting color code with choosing the method means to encode it by all procoding methods (step 2). Then if ColorSign array of the encoded color code is {0,0,0}/{1,1,1} (step 3) CorrectionInit( ) method is called for all procoding methods (step 4), which, in particular, initializes CorrectionType[m] (CorrectionInit Algorithm 102), else '−2' is assigned to CorrectionType[m] (step 5) as an indicator that ColorSign[m][s][w] is not {0,0,0}/{1,1,1} (and RB Transform can't be applied). Then the encoded code is compacted for all procoding methods (step 6). Then ChooseMethod(s,w) is called for choosing the best method to be applied (step 7). Then it is checked, if CorrectionType [M] is more than zero (if ColorSign[m][s][w] is {0,0,0}/{1, 1,1} and all ColorDelta values aren't the same) ('M' is chosen method) (step 8), CorrectionApply algorithm 104 is called (step 9), which changes one or more color code samples (main sample may not be changed) (the passed ColorSign is calculated by the chosen 'M' method (applied procode is ProCode[M][s][w]). The flowchart of this algorithm is shown in FIG. 53.

4.1.1.10.4. Converting Initial Stream

First gray/color code of the initial stream may not be converted. The rest gray/color codes may be converted by '0' predefined method (for the initial stream predefined method may be only '0'). 'W' is the number of codes/procodes of the '0' (initial) stream.

In the FIG. 54 are demonstrated converted initial streams.

---
Method 45.1
---
```
//for lossless conversion of initial stream
ConvertInitialStream( )
{
    for(int w=1;w<W;w++)
    {
        ConvertWithoutChoose(0,w,0);
    }
}
```
---

---
Method 45.2
---
```
//for near-lossless conversion of true-color initial stream
Convert InitialStreamLossy( )
{
for(int w=1;w<W;w++)
    {
        ConvertWithoutChooseLossy(0,w,0);
    }
}
```
---

4.1.1.10.5. Converting Regular Streams

First gray/color code of the regular stream may be converted by '1' (vertical) method. The rest gray/color codes may be converted by any predefined method or by the methods chosen by scoring. 'W' is the number of codes/procodes of the 's' (s>0) regular stream. In the FIG. 54 are demonstrated converted regular streams, where if the method is predefined (predefined method could be '2'/'3' indexing/procoding method), the 'm' values are equal to each other, else they are selected (chosen) by the scoring algorithms.

The methods below are for converting regular streams using appropriate convert algorithms for the gray/color codes:

---
Method 46.1
---
```
//for lossless conversion of 's' regular
stream by 'm' predefined method
ConvertStreamWithoutChoose(int s, int m)
{
    for(int w=1;w<W;w++)
    {
        ConvertWithoutChoose(s,w,m);
    }
}
```
---

---
Method 46.2
---
```
/*for near-lossless conversion of 's' true-color
regular stream by 'm' predefined method*/
ConvertStreamWithoutChooseLossy(int s, int m)
{
    for(int w=1;w<W;w++)
    {
        ConvertWithoutChooseLossy(s,w,m);
    }
}
```
---

---
Method 46.3
---
```
//for lossless conversion of 's' regular stream with scoring
ConvertStreamWithChoose(int s)
{
    for(int w=1;w<W;w++)
    {
        ConvertWithChoose(s,w);
    }
}
```
---

---
Method 46.4
---
```
//for near-lossless conversion of 's' true-color
regular stream with scoring
ConvertStreamWithChooseLossy(int s)
{
    for(int w=1;w<W;w++)
    {
        ConvertWithChooseLossy(s,w);
    }
}
```
---

4.1.1.10.6. Creating Compressible Units

In FIG. 54 are demonstrated converted regular streams treated as compressible units. 'r' is the index of converted gray/color code of 'c' compressible unit (c=s and r=w, if each compressible unit includes only one encoded stream (like video stream)). 'S' is the number of streams of compressible unit (S≥1).

The methods below are for converting regular streams using appropriate convert algorithms for the streams for single and multiple kind of compressible units. Single compressible unit is image compressible unit containing single stream (line of partition) or it is video compressible unit. Multiple compressible unit is an image compressible unit containing a partition (containing more than one streams).

4.1.1.10.6.1. Creating Initial and Regular Single Compressible Units

---
Method 47.1
---
```
//for lossless conversion of initial single compressible unit
ConvertInitialSingle( )
{
   ConvertInitialStream( );
}
```
---

---
Method 47.2
---
```
//for near-lossless conversion of true color initial single compressible unit
ConvertInitialSingleLossy( )
{
  ConvertInitialStreamLossy( );
}
```
---

---
Method 47.3
---
```
/*for lossless conversion of 'c' regular compressible
unit by 'm' predefined method, c>0*/
ConvertSingleWithoutChoose(int c, int m)
{
   ConvertStreamWithoutChoose(c,m);
}
```
---

---
Method 47.4
---
```
/*for near-lossless conversion of 'c' true color
regular compressible unit by 'm'
predefined method, c>0*/
ConvertSingleWithoutChooseLossy(int c, int m)
{
   ConvertStreamWithoutChooseLossy(c,m);
}
```
---

---
Method 47.5
---
```
//for lossless conversion of 'c' regular compressible
unit with scoring, c>0
deque<int> DMStorage;
deque<int> LStorage;
int MStorage[ ][ ];
ConvertSingleWithChoose(int c, int m)
{
   ConvertStreamWithChoose(c,m);
   StoreMethodsSingle( );
}
```
---

---
Method 47.6
---
```
/*for near-lossless conversion of 'c' true color
regular compressible unit with scoring,
c>0*/
deque<int> DMStorage;
deque<int> LStorage;
int MStorage[ ][ ];
ConvertSingleWithChooseLossy(int c, int m)
{
   ConvertStreamWithChooseLossy(c, m);
   StoreMethodsSingle( );
}
```
---

4.1.1.10.6.2. Creating Initial Multiple Compressible Units

Here converting the initial stream is the same for both choose and without choose cases.

---
Method 48.1
---
```
/*for lossless conversion of initial multiple compressible
unit containing 'S' streams (the
first one is initial one, the rest S-1 are
encoded by 'm' predefined method*/
ConvertInitialMultipleWithoutChoose(int m)
{
  ConvertInitialStream( );
  for(int s=1;s<S;s++)
     ConvertStreamWithoutChoose(s,m);
}
```
---

---
Method 48.2
---
```
/*for near-lossless conversion of true color initial
multiple compressible unit containing
'S' streams (the first one is initial one, the rest S-1
are encoded by 'm' predefined
method*/
ConvertInitialMultipleWithoutChooseLossy(int m)
{
   ConvertInitialStreamLossy( );
   for(int s=1;s<S;s++)
      ConvertStreamWithoutChooseLossy(s,m);
}
```
---

---
Method 48.3
---
```
/*for lossless conversion of initial multiple compressible
unit containing 'S' streams (the
first one is initial one, the rest S-1 are
encoded with scoring*/
deque<int> DMStorage;
deque<int> LStorage;
int MStorage[ ][ ];
ConvertInitialMultipleWithChoose( )
{
  ConvertInitialStream( );
  for(int s=1;s<S;s++)
     ConvertStreamWithChoose(s);
  StoreMethodsMultiple( );
}
```
---

---
Method 48.4
---
```
/*for near-lossless conversion of true color initial
multiple compressible unit containing
'S' streams (the first one is initial one, the rest S-1 are
encoded with scoring*/
deque<int> DMStorage;
deque<int> LStorage;
int MStorage[ ][ ];
ConvertInitialMultipleWithChooseLossy( )
{
   ConvertInitialStreamLossy( );
   for(int s=1;s<S;s++)
      ConvertStreamWithChooseLossy(s);
   StoreMethodsMultiple( );
}
```
---

4.1.1.10.6.3. Creating Regular Multiple Compressible Units

---
Method 49.1

---
```
/*for lossless conversion of regular multiple
compressible unit without scoring containing
'S' regular streams, s1>0*/
ConvertMultipleWithoutChoose(int s1, int m)
{
   for(int s=s1;s<S;s++)
      ConvertStreamWithoutChoose(s,m);
}
```
---

---
Method 49.2

---
```
/*for near-lossless conversion of true color regular
multiple compressible unit without
scoring containing 'S' regular streams, s1>0*/
ConvertMultipleVVithoutChooseLossy(int s1, int m)
{
for(int s=s1;s<S;s++)
ConvertStreamWithoutChooseLossy(s,m);
}
```
---

---
Method 49.3

---
```
/*for lossless conversion of regular multiple
compressible unit with scoring containing 'S'
regular streams, s1>0*/
deque<int> DMStorage;
deque<int> LStorage;
int MStorage[ ][ ];
ConvertMultipleWithChoose(int s1)
{
   for(int s=s1;s<S;s++)
      ConvertStreamWithChoose(s);
      StoreMethodsMultiple( );
}
```
---

---
Method 49.4

---
```
/*for near-lossless conversion of true color regular
multiple compressible unit with
scoring containing 'S' regular streams, s1>0*/
deque<int> DMStorage;
deque<int> LStorage;
int MStorage[ ][ ];
ConvertMultipleWithChooseLossy(int s1)
{
   for(int s=s1;s<S;s++)
      ConvertStreamWithChooseLossy(s);
      StoreMethodsMultiple( );
}
```
---

4.2. Compressor/Decompressor Module

FIG. 6 demonstrates the encoded (and compacted) streams outputted by the encoder module 16 are considered as compressible units 18 for inputting them to the compressor module 20 and outputting compressed units 8. It was also stated that compressible unit consists of one or more encoded streams. As is demonstrated in FIG. 39, compressor module 20 applies 1) optimization 90, 2) run-length coding 92 and 2) Huffman coding 94, for converting compressible units 18 to compressed units 8. All these three functionalities of compressor module are described below, in details.

4.2.1. Optimization

Optimization 90 is the first manipulation which compressor module 20 must apply to the compressible unit 18, to produce compressible unit. Optimization algorithm 90 just represents index, Delta or CompDelta/CompLossyDelta values by two components—group numbers and extra bits.

As you saw in FIG. 54, initial compressible unit includes initial encoded stream and first gray/color code of the initial grayscale/true-color stream neither is encoded nor is compacted—the first gray/color code stays as it is in initial compressible unit and also in initial compressed unit. Regular compressible units contain only regular streams.

4.2.1.1. Optimization of Indexed-Color Compressible Unit

Index values may be computed for all indexing methods (for choosing the best one by the scoring algorithms). Index values are found in the 0 to 255 range. Null indexes must be excluded because they will be stored by run-length coding 92 method, that's why stored indexes can't be null. Each index must be represented using a group number and if required, the extra bits (which is dependent on where in the 1-255 range the index is found) as represented by the following table (Table 5):

TABLE 5

| Group Number | Extra Bits | Index |
|---|---|---|
| 1 | 0 | 1 |
| 2 | 0 | 2 |
| 3 | 0 | 3 |
| 4 | 0 | 4 |
| 5 | 1 | 5, 6 |
| 6 | 1 | 7, 8 |
| 7 | 2 | 9-12 |
| 8 | 2 | 13-16 |
| 9 | 3 | 17-24 |
| 10 | 3 | 25-32 |
| 11 | 4 | 33-48 |
| 12 | 4 | 49-64 |
| 13 | 5 | 65-96 |
| 14 | 5 | 97-128 |
| 15 | 7 | 129-255 |

Each index must be represented by two parts: group number and extra bits. Extra bits occupy the number of bits defined by the Table 5 above. In the compressed unit 8 group number and extra bits of a delta may be stored one after another. The extra bits should be interpreted as a machine integer, for example, '1110' bits represent decimal value '14'.

For example, 515=<13, 000000000> and 518=<13, 000000011>.

4.2.1.2. Optimization of Grayscale Compressible Unit

Once again, in a similar manner to the optimizing the indexed-color indexes described above, Delta values of the grayscale (which may be computed by all procoding methods for choosing the best one by the scoring algorithms) are optimized. Null Delta values must be excluded by run-length coding 92 method, that's why stored Delta values can't be null. Each Delta value must be represented using a group number and, if required, the extra bits as represented by the following tables. The invention permits a flexible range of grayscale codes. As such, the corresponding range for delta may vary from 0 to $2^n-1$, where 'n' is a bit depth of grayscale code and it equals to or is larger than 8 (usually 'n' is 8; 10 or 16). In a similar manner to the indexes for the indexed color compressible unit and by analogy with 8-bit channel could be defined table of delta values for 10-bit, 16 bit or 32-bit or any channels and each Delta value may be represented using a group number and, if required, a series of extra bits as depicted in the following tables:

TABLE 6

| gr. num. | ex. bits | delta |
|---|---|---|
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 1 | 7, 8 |
| 8 | 1 | 9, 10 |
| 9 | 2 | 11-14 |
| 10 | 2 | 15-18 |
| 11 | 3 | 19-26 |
| 12 | 3 | 27-34 |
| 13 | 4 | 35-50 |
| 14 | 4 | 51-66 |
| 15 | 6 | 67-128/129 |

('129' is MaxDelta and it is reserved only for near-lossless compression (RB Transform))

TABLE 7

| gr. num. | ex. bits | delta |
|---|---|---|
| 1 | 1 | 1-2 |
| 2 | 2 | 3-6 |
| 3 | 2 | 7-10 |
| 4 | 3 | 11-18 |
| 5 | 4 | 19-34 |
| 6 | 5 | 35-66 |
| 7 | 6 | 67-130 |
| 8 | 7 | 131-258 |
| 9 | 8 | 259-514 |
| 10 | 9 | 515-1026 |
| 11 | 10 | 1027-2050 |
| 12 | 11 | 2051-4098 |
| 13 | 12 | 4099-8194 |
| 14 | 13 | 8195-16386 |
| 15 | 14 | 16387-32768/32769 |

('32769' is MaxDelta and it is reserved only for near-lossless compression (RB Transform))

TABLE 8

| gr. num. | ex. bits | delta |
|---|---|---|
| 1 | 1 | 1-2 |
| 2 | 2 | 3-6 |
| 3 | 2 | 7-10 |
| 4 | 3 | 11-18 |
| 5 | 4 | 19-34 |
| 6 | 5 | 35-66 |
| 7 | 6 | 67-130 |
| 8 | 7 | 131-258 |
| 9 | 8 | 259-514 |
| 10 | 9 | 515-1026 |
| 11 | 10 | 1027-2050 |
| 12 | 11 | 2051-4098 |
| 13 | 12 | 4099-8194 |
| 14 | 13 | 8195-16386 |
| 15 | 14 | 16387-32770 |
| 16 | 15 | 32771-65538 |
| 17 | 16 | 65539-131074 |
| 18 | 17 | 131075-262146 |
| 19 | 18 | 262147-524290 |
| 20 | 19 | 524291-1048578 |
| 21 | 20 | 1048579-2097154 |
| 22 | 21 | 2097155-4194306 |
| 23 | 22 | 4194307-8388610 |
| 24 | 23 | 8388611-16777218 |
| 25 | 24 | 16777219-33554434 |
| 26 | 25 | 33554435-67108866 |
| 27 | 26 | 67108867-134217730 |
| 28 | 27 | 134217729-268435458 |
| 29 | 28 | 268435459-536870914 |
| 30 | 29 | 536870915-1073741826 |
| 31 | 30 | 1073741827-2147483648/2147483649 |

('21483649' is MaxDelta and it is reserved only for near-lossless compression (RB Transform))

Table 6 is for 8-bit channel codes (n=8), Table 7 is for 16-bit channel codes (n=16) and Table 8 is for 32-bit channel codes (n=32). For any 'n' there can be a table developed similar to those ones.

Each Delta value must be represented by two parts: group number and extra bits. Extra bits occupy number of bits defined by the tables above.

4.2.1.3. Optimization of True-Color Compressible Unit

MainColorDelta, DifColorDelta[i] and ColorDelta[i] values of the Comp set are called CompDelta values and MaxorMainColorDelta, MaxDelta, MainColorDelta, DifColorDelta[i] and ColorDelta[i] values of the CompLossy set are called CompLossyDelta values. CompDelta/CompLossyDelta values are non-zero, positive integers ('1' is the smallest possible value for any CompDelta/CompLossyDelta).

Once again, in a similar manner to the optimization of the grayscale Delta values described above, CompDelta/CompLossyDelta values of the true-color (which may be computed by all procoding methods, then the best one may be chosen by the scoring algorithms) are calculated. Null Comp/CompLossy sets (containing {2,2,2} ({2,2,2,2} for the CMYK image) ColorSign arrays) must be excluded by run-length coding method 92. Each CompDelta/CompLossyDelta value is not null and it must be represented using a group number and if required the extra bits as represented in the appropriate tables. The invention permits a flexible range of CompDelta/CompLossyDelta. As such, their corresponding range may vary from 0 to $2^n-1$, where 'n' is a bit depth of color sample code ('n' could be equal to 5; 6; 8; 10; 16 or 32). In a similar manner to the Delta values for the grayscale, each CompDelta/CompLossyDelta value may be represented using a group number and, if required, a series of extra bits as depicted in the Tables 6, 7 and 8 above (for 8-bit, 16-bit and 32-bit channels respectively) and also the following 10 and 11 Tables (for 5-bit and 6-bit channels respectively (in the 16-bit true-color bitmap red and blue color samples use 5-bit channels and green color sample uses 6-bit channel)):

TABLE 10

| gr. num. | ex. bits | delta |
|---|---|---|
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 1 | 7, 8 |
| 8 | 1 | 9, 10 |
| 9 | 2 | 11-14 |
| 10 | 2 | 15-16/17 |

('17' is MaxDelta and it is reserved only for near-lossless compression (RB Transform))

TABLE 11

| gr. num. | ex. bits | delta |
|---|---|---|
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 1 | 7, 8 |
| 8 | 1 | 9, 10 |
| 9 | 2 | 11-14 |

TABLE 11-continued

| gr. num. | ex. bits | delta |
|---|---|---|
| 10 | 2 | 15-18 |
| 11 | 3 | 19-26 |
| 12 | 3 | 27-32/33 |

('33' is MaxDelta and it is reserved only for near-lossless compression (RB Transform))

Each CompDelta value must be represented by two parts: group number and extra bits. Extra bits occupy number of bits defined by the tables above.

4.2.2. Run-Length Coding Algorithms

Items are indexes; {Sign,Delta} pairs or Comp/CompLossy sets for indexed color; grayscale or true-color compressible unit 18 respectively. So, null items are '0' indexes; {2,0} pairs or {2,2,2} sets for indexed color; grayscale or true-color compressible unit 18 respectively (Comp/CompLossy set is null if it contains null ColorSign array: Comp={{2,2,2}}). These algorithms can be applied only if the compressible unit includes at least one none zero item. Run-length coding algorithm 92 has 3 variations described above (4.2.2.1, 4.2.2.2 & 4.2.2.3).

4.2.2.1. Run-Length Coding Algorithm of Null and not Null Items

This variation of run-length coding is for storing sequence of interval lengths of null and not null items of the compressible unit. The purpose is to exclude null items from farther coding processes.

Compressible unit, which is the sequence of items (encoded (and compacted) codes), consists of two types of intervals. The first type of interval must contain only null items, and the second type must contain only not null items. Here is an example for indexes (indexed-color):

. . . 7 0000 2154 0 32 000 3423 0 . . .

Then the lengths (the number of items) of each type of intervals must be collected into separate sequence, without breaking their order. For the previous example we get these two sequences:

. . . 4 1 3 . . . for null items; and
. . . 4 2 4 . . . for not null items.

FIG. 38 demonstrates such differentiation of compressible unit into two components: 1) the lengths of null and not null items and 2) not null items of the compressible unit (where null items are excluded, and the order of not null items is kept).

Then each length must be represented by two parts: group number and extra bits. Extra bits occupy number of bits defined by the Table 12 below. In the compressed unit 8 group number and extra bits of a delta must be written one after another:

length=<group number, extra bits>:

TABLE 12

| gr. num. | ex. bits | length |
|---|---|---|
| 1 | 0 | 1 |
| 2 | 0 | 2 |
| 3 | 0 | 3 |
| 4 | 0 | 4 |
| 5 | 1 | 5, 6 |
| 6 | 2 | 7-10 |
| 7 | 3 | 11-18 |
| 8 | 4 | 19-34 |
| 9 | 5 | 35-66 |
| 10 | 6 | 67-130 |
| 11 | 7 | 131-258 |
| 12 | 8 | 259-514 |

TABLE 12-continued

| gr. num. | ex. bits | length |
|---|---|---|
| 13 | 9 | 515-1026 |
| 14 | 10 | 1027-2050 |
| 15 | 11 | 2051-4098 |

Length=4098 does not represent the real length. It is preserved for lengths greater than 4097. Those lengths must be divided into parts equal to 4097 and must be written as 4098, without the remainder. All parts must be written one after another.

For example, 10000 length would be represented like this (10000 is decimal number, others are binary): 10000=<1111, 11111111111>+<1111, 11111111111>+<1110, 1100001011> (decimal equivalent of this: 10000=<15, 2047>+<15, 2047>+<14, 779>).

In the compressed unit the lengths and not null items may be represented in the following sequence:

. . . , <length of a null item interval>, <length of a not null item interval>, <not null items (their quantity is equal to the value of the previous member of the sequence)>, <length of a null item interval>, <length of a not null item interval>, <not null items (their quantity is equal to the value of the previous member of the sequence)>, . . .

For the example above we get:

. . . 7 4 4 2 1 5 4 1 2 3 2 3 4 3 4 2 3 . . . (FIG. 38).

The one of purposes of the run-length coding is to exclude null items to be Huffman coded and stored. Because null items are excluded this way, extracting, decoding and restoring algorithms don't deal with null items and the appropriate extracting, decoding and restoring algorithms could be without "Sign/ColorSign is not null" kind of checking statement.

4.2.2.2. Run-Length Coding Algorithm of Similar Items

This variation of run-length coding is for storing sequence of interval lengths of similar items of grayscale/true-color compressible unit. Similar items are items having the same Sign/ColorSign (for grayscale/true-color compressible unit).

Compressible unit, which is the sequence of items (encoded (and compacted) codes), includes sequence of the same Signs/ColorSigns as:

Code of Signs/ColorSigns and their lengths (the number of items) as one number, according Table 13;

A bit oppositeness, indicating Sign/ColorSign is which one between two opposite ones. This bit is absent if Sign/ColorSign is NULL or if previous interval's Sign/ColorSign is the opposite one. So, for the grayscale it's present only if previous interval's Sign is the Null.

Run-Length Code, then follows by the length. This is present if the length of the same Signs/ColorSigns exceeds the length, represented in Table 13. This must follow the Code, representing 'one' length ('1'; '9'; etc., see Table 13), indicating the Sign/ColorSign of the interval & actual length of the interval for the true-color would be represented by the number less by eight for NULL intervals or less by three for {0,0,0}/{1,1,1} intervals or less by one for the rest intervals & for the grayscale would be represented by the number less by eight for NULL (2) intervals or less by three for the rest (0/1) intervals.

TABLE 13

| Code | |
|---|---|
| | Signs and Their Lengths (for grayscale) |
| 0 | Run-Length Code |
| 1 | one 2 (NULL Sign) |
| 2 | two 2 |
| 3 | three 2 |
| 4 | four 2 |
| 5 | five 2 |
| 6 | six 2 |
| 7 | seven 2 |
| 8 | eight 2 |
| 9 | one 0/1 |
| 10 | two 0/1 |
| 11 | three 0/1 |
| | ColorSigns and Their Lengths (for true-color) |
| 0 | Run-Length Code |
| 1 | one {2, 2, 2} |
| 2 | two {2, 2, 2} |
| 3 | three {2, 2, 2} |
| 4 | four {2, 2, 2} |
| 5 | five {2, 2, 2} |
| 6 | six {2, 2, 2} |
| 7 | seven {2, 2, 2} |
| 8 | eight {2, 2, 2} |
| 9 | one {0, 0, 0}/{1, 1, 1} |
| 10 | two {0, 0, 0}/{1, 1, 1} |
| 11 | three {0, 0, 0}/{1, 1, 1} |
| 12 | one {0, 0, 1}/{1, 1, 0} |
| 13 | one {0, 1, 0}/{1, 0, 1} |
| 14 | one {1, 0, 0}/{0, 1, 1} |
| 15 | one {2, 0, 0}/{2, 1, 1} |
| 16 | one {0, 2, 0}/{1, 2, 1} |
| 17 | one {0, 0, 2}/{1, 1, 2} |
| 18 | one {2, 0, 1}/{2, 1, 0} |
| 19 | one {0, 2, 1}/{1, 2, 0} |
| 20 | one {0, 1, 2}/{1, 0, 2} |
| 21 | one {2, 2, 0}/{2, 2, 1} |
| 22 | one {2, 0, 2}/{2, 1, 2} |
| 23 | one {0, 2, 2}/{1, 2, 2} |

Example

{2,2,2}{2,2,2}{2,2,2}{2,2,2}{2,2,2}{2,2,2}{1,1,1}{1,1,1}{0,0,0}{1,1,1}{1,1,1}{1,1,1}{1,1,1}{1, 1,1}{1,1,1}{1,1,1}{0,2,2}{1,2,2}{0,2,2}{0,2,2}{2,2,2}{2,2,2}{2,2,2}{2,2,2}{2,2,2}{2,2,2}{2,2, 2} sequence of ColorSigns would be represented as:

6 10 1 (true) 9 9 0 4 23 0 (false) 23 23 0 1 7

Then each length must be represented by two parts: group number and extra bits. Extra bits occupy number of bits defined by the Table 13 below. In the compressed unit 8 group number and extra bits of a delta must be written one after another:

length=<group number, extra bits>:

TABLE 13

| gr. num. | ex. bits | length |
|---|---|---|
| 1 | 0 | 1 |
| 2 | 0 | 2 |
| 3 | 0 | 3 |
| 4 | 0 | 4 |
| 5 | 1 | 5, 6 |
| 6 | 2 | 7-10 |
| 7 | 3 | 11-18 |
| 8 | 4 | 19-34 |
| 9 | 5 | 35-66 |
| 10 | 6 | 67-130 |
| 11 | 7 | 131-258 |
| 12 | 8 | 259-514 |

TABLE 13-continued

| gr. num. | ex. bits | length |
|---|---|---|
| 13 | 9 | 515-1026 |
| 14 | 10 | 1027-2050 |
| 15 | 11 | 2051-4098 |

Length=4098 does not represent the real length. It is preserved for lengths greater than 4097. Those lengths must be divided into parts equal to 4097 and must be written as 4098, without the remainder. All parts must be written one after another.

For example, 10000 length would be represented like this (10000 is decimal number, others are binary): 10000=<1111, 11111111111>+<1111, 111111111111>+<1110, 1100001011> (decimal equivalent of this: 10000=<15, 2047>+<15, 2047>+<14, 779>).

The algorithm for CMYK true-color is the analog of algorithm for RGB, represented here.

4.2.2.3. Run-Length Coding Algorithm of NULL Items

This variation of run-length coding is for storing sequence of interval lengths of NULL or similar items of grayscale/true-color compressible unit. Similar items are items having the same Sign/ColorSign (for grayscale/true-color compressible unit).

Compressible unit, which is the sequence of items (encoded (and compacted) codes), includes sequence of NULL or the same Signs/ColorSigns as:

Code of Signs/ColorSigns and their lengths (the number of items) as one number, according Table 14;

A bit oppositeness, indicating Sign/ColorSign is which one between two opposite ones. This bit is absent if Sign/ColorSign is NULL or if previous interval's Sign/ColorSign is the opposite one. So, for the grayscale it's present only if previous interval's Sign is the Null.

Run-Length Code, then follows by the length for the NULL items only. This is present if the length of the same Signs/ColorSigns exceeds the length, represented in Table 14. This must follow the Code, representing any length ('1'; '2'; '3'; '4'; '5'; '6'; '7'; '8' '9'; '10', etc., see Table 14), indicating the Sign/ColorSign of the interval & the actual length of NULL interval would be represented by its Code plus the length number following the Run-Length code multiplied by four. The actual length of the {0,0,0}/{1,1,1} intervals would be represented by its Code plus the quantity of following Run-Length codes multiplied by 3 and the actual length of the rest intervals (for the true-color only) would be represented by their Code plus the quantity of following Run-Length codes.

TABLE 14

| Code | |
|---|---|
| | Signs and Their Lengths (for grayscale) |
| 0 | Run-Length Code |
| 1 | one 2 (NULL Sign) |
| 2 | two 2 |
| 3 | three 2 |
| 4 | four 2 |
| 5 | one 0/1 |
| 6 | two 0/1 |
| 7 | three 0/1 |
| | ColorSigns and Their Lengths (for true-color) |
| 0 | Run-Length Code |
| 1 | one {2, 2, 2} |
| 2 | two {2, 2, 2} |

TABLE 14-continued

| Code | |
|---|---|
| 3 | three {2, 2, 2} |
| 4 | four {2, 2, 2} |
| 5 | one {0, 0, 0}/{1, 1, 1} |
| 6 | two {0, 0, 0}/{1, 1, 1} |
| 7 | three {0, 0, 0}/{1, 1, 1} |
| 8 | one {0, 0, 1}/{1, 1, 0} |
| 9 | one {0, 1, 0}/{1, 0, 1} |
| 10 | one {1, 0, 0}/{0, 1, 1} |
| 11 | one {2, 0, 0}/{2, 1, 1} |
| 12 | one {0, 2, 0}/{1, 2, 1} |
| 13 | one {0, 0, 2}/{1, 1, 2} |
| 14 | one {2, 0, 1}/{2, 1, 0} |
| 15 | one {0, 2, 1}/{1, 2, 0} |
| 16 | one {0, 1, 2}/{1, 0, 2} |
| 17 | one {2, 2, 0}/{2, 2, 1} |
| 18 | one {2, 0, 2}/{2, 1, 2} |
| 19 | one {0, 2, 2}/{1, 2, 2} |

Example

{2,2,2}{2,2,2}{2,2,2}{2,2,2}{2,2,2}{2,2,2}{1,1,1}{1,1,1}{0,0,0}{1,1,1}{1,1,1}{1,1,1}{1,1,1}{1, 1,1}{1,1,1}{1,1,1}{0,2,2}{1,2,2}{0,2,2}{0,2,2}{2,2,2}{2,2,2}{2,2,2}{2,2, 2}{2,2,2}{2,2,2}{2,2, 2} sequence of ColorSigns would be represented as:

2 0 1 6 1 (true) 5 5 0 0 23 32 23 0 3 0 1

Then each length must be represented by two parts: group number and extra bits. Extra bits occupy number of bits defined by the Table 15 below. In the compressed unit 8 group number and extra bits of a delta must be written one after another:

length=<group number, extra bits>:

TABLE 15

| gr. num. | ex. bits | length |
|---|---|---|
| 1 | 0 | 1 |
| 2 | 0 | 2 |
| 3 | 0 | 3 |
| 4 | 0 | 4 |
| 5 | 1 | 5, 6 |
| 6 | 2 | 7-10 |
| 7 | 3 | 11-18 |
| 8 | 4 | 19-34 |
| 9 | 5 | 35-66 |
| 10 | 6 | 67-130 |
| 11 | 7 | 131-258 |
| 12 | 8 | 259-514 |
| 13 | 9 | 515-1026 |
| 14 | 10 | 1027-2050 |
| 15 | 11 | 2051-4098 |

Length=4098 does not represent the real length. It is preserved for lengths greater than 4097. Those lengths must be divided into parts equal to 4097 and must be written as 4098, without the remainder. All parts must be written one after another.

For example, 10000 length would be represented like this (10000 is decimal number, others are binary): 10000=<1111, 11111111111>+<1111, 11111111111>+<1110, 1100001011> (decimal equivalent of this: 10000=<15, 2047>+<15, 2047>+<14, 779>).

The algorithm for CMYK true-color is the analog of algorithm for RGB, represented here.

4.2.3. Huffman Coding

The last action of the compressor module 20 is the Huffman coding 94 of the compressible units. Huffman coding of the items of compressible unit converts compressible unit 18 to the compressed unit 8. Compressible units, passed by the run-length coding 92 component to the Huffman coding component of the compressor module 20, contains the sequence of lengths of null and not null intervals, sequence of applied methods (DMStorage queue) and their lengths (LStorage queue) and not null items (converted codes). The present invention also contemplates replacement of Huffman coding by other techniques of the coding, like entropy based coding techniques.

4.2.3.1. Introduction to Huffman Coding

The Huffman coding technique has two rules:
1) all codes of a given bit length have lexicographically consecutive values, in the same order as the numbers they represent, and
2) shorter codes lexicographically precede longer codes.

For example, let's assume that we are trying to encode four numbers—1, 2, 3, 4, and Huffman algorithm gives them these bit lengths: 1—2, 2—1, 3—3, 4—3. By applying those two rules we get:

| Number | Huffman Code |
|---|---|
| 1 | 10 |
| 2 | 0 |
| 3 | 110 |
| 4 | 111 |

For example, '0' precedes '10' which proceeds '11x', and '110' and '111' are lexicographically consecutive.

Given these rules, we can define the Huffman code for a set of numbers just by giving the bit lengths of the codes for each number of the set in order. In our example, the code is completely defined by the sequence of bit lengths {2,1,3,3}. We'll store code lengths in the same order as the numbers (group numbers) they represent.

If a number doesn't have a Huffman code, (i.e. it's absent in the compressed unit), the corresponding code length must be equal to '0'. All last '0' code lengths may be dropped. Even the last not '0' code length may be dropped too, because one can unambiguously restore it, knowing all other code lengths.

If there is one Huffman code, it represents 1 group number. So there is no need to store Huffman codes of that single number.

Below are defined the methods of generating the compressed unit from the compressible unit for all type of images.

4.2.3.2. Huffman Coding of Indexed-Color Compressible Unit

Here is defined the method of generating indexed-color compressed unit from the compressible unit.

Huffman coding must be applied and appropriate Huffman tables must be defined for each of these members of the compressible unit:
1) lengths of intervals of null indexes;
2) lengths of intervals of not null indexes and
3) group numbers of not null indexes (extra bits aren't Huffman coded: they occupy exactly the number of bits defined in the tables).

Each compressed unit conveys detailed information such as the size of the compressed unit, the sequence of applied indexing methods that were used to encode the all (null and not null) items of the compressible unit (null item of the indexed-color compressible unit has '0' index), Huffman codes of the members enumerated above and their Huffman tables in the header of the compressed unit. It is determined by the run-length coding that the stored indexes aren't null.
4.2.3.3. Huffman Coding of Grayscale Compressible Unit Huffman coding must be applied and appropriate Huffman tables must be defined for each of these members of the compressible unit:
1) lengths of null ({Sign,Delta}={2,0}) items & lengths of not null (not {2,0}) items of Run-Length Coding Algorithm of Null and Not Null Items (4.2.2.1.) & the Codes and the lengths of Run-Length Coding Algorithm of Similar Items (4.2.2.2.) & Run-Length Coding Algorithm of Similar Items (4.2.2.3.);
2) group numbers of not null Delta values (extra bits aren't Huffman coded: they occupy exactly the number of bits defined in the tables).

Each compressed unit conveys detailed information such as the size of the compressed unit, the sequence of applied procoding methods for all (null and not null) items of the compressible unit (null item of the grayscale compressible unit has '2' Sign and '0' Delta values).

Run-length coding of Run-Length Coding Algorithm of Null and Not Null Items (4.2.2.1.) excludes {2,0} Sign and Delta values to be stored. Because '2' Sign values aren't stored, the rest, '0' and '1' Sign values (the Sign values associated with not null Delta) are stored without Huffman coding, in 1-bit.

Compressed unit also includes Huffman codes of the members enumerated above and their Huffman tables in the header of the compressed unit. It should be noted that since Sign/Delta values that represent the value '2'/'0' must be discarded since null intervals are stored by the run-length coding. This ability to discard redundant information also contributes to the compression rates.

The Delta values that have been determined through application of one of the respective procoding methods may range from 0 to $2^n-1$, where 'n' is a bit depth of grayscale code and it equals to or is larger than '8'. It is determined by the run-length coding that the stored Delta values don't equal zero (and the stored Sign values don't equal '2')

4.2.3.4. Huffman Coding of Lossless True-Color Compressible Unit

Compressed unit stores Huffman coded members of Comp sets of the compressible unit (the members of the Comp set are compressed using the Huffman coding). ColorlSign arrays, Flag arrays and group numbers of CompDelta values (MainColorDelta, DifColorDelta and ColorDelta values) of the compressed unit use own Huffman coding to be stored. MainColorDelta, DifColorDelta and ColorDelta values of the Comp set, called CompDelta values, tend to be small and they use common Huffman coding, making storage of the delta values more efficient.

Here is defined the method of generating true-color compressed unit from the compressible unit.

Huffman coding must be applied and appropriate Huffman tables must be defined for each of these members of the compressible unit:
1) lengths of null (Comp={2,2,2}/{2,2,2,2}) items and the lengths of not null (not {2,2,2}/{2,2,2,2}) items of Run-Length Coding Algorithm of Null and Not Null Items (4.2.2.1.) & the Codes and the lengths of Run-Length Coding Algorithm of Similar Items (4.2.2.2.) & Run-Length Coding Algorithm of Similar Items (4.2.2.3.);
2) ColorSign arrays of not null Comp sets of Run-Length Coding Algorithm of Null and Not Null Items (4.2.2.1.) (Similarity of ColorSign Values regularity claims that the most ColorSign arrays are {0,0,0}, {1,1,1} and {2,2,2} ({0,0,0,}, {1,1,1,1} and {2,2,2,2} for the CMYK image). Null ColorSign values or null Comp sets ({2,2,2}/{2,2,2,2}) are excluded by the run-length coding, which makes possible to store {0,0,0}, {1,1,1} ColorSign arrays usually by 1-bit and 2-bit Huffman coding;
3) Flag arrays of Comp set (Comp set has Flag array, if its ColorSign member has only '0' or only '1' Sign values) and
4) group numbers of CompDelta values (MainColorDelta, DifColorDelta[i] and ColorDelta[i]) of not null Comp sets (the values aren't zero) (extra bits aren't Huffman coded: they occupy exactly the number of bits defined in the tables).

Each compressed unit conveys detailed information such as the size of the compressed unit, the sequence of applied procoding methods that were used to encode the all (null and not null) items of the compressible unit (null item of the true-color compressible unit is the Comp set containing null ColorSign array (the ColorSign array which contains only '2' values)) and Huffman codes of the members enumerated above and their Huffman tables in the header of the compressed unit. It is determined by the run-length coding that the stored Comp sets aren't null (that's why in the flowcharts the statements of checking ColorSign is null or not are taken into brackets).

The methods and systems described herein allow for a flexible range of color sample codes to be used. As such the corresponding range for the CompDelta variables may vary from 0 to $2^n-1$, where 'n' is bit depth of the color sample code and it equals to '5'; '6' or '8' or it is larger than '8' (the methods and systems described herein also permit 15-bit and 16-bit RGB bitmap images).

4.2.3.5. Huffman Coding of Nearly Lossless True-Color Compressible Unit

Compressed unit stores Huffman coded members of CompLossy sets of the compressible unit (the members of the CompLossy set are compressed using the Huffman coding). ColorlSign arrays and group numbers of CompLossyDelta values (MaxorMainColorDelta (MaxDelta), DifColorDelta and ColorDelta values) of the compressed unit use their own Huffman coding to be stored. MaxorMainColorDelta, MaxDelta, MainColorDelta, DifColorDelta and ColorDelta values of the CompLossy set, called CompLossyDelta values, are tend to be small and they use common Huffman coding, making storage of the delta values more efficient. But Flag arrays of the CompLossy set don't use Huffman coding because of 2 reasons:
1) the null Flag array (null Modal Flag array contains only '0' values and null Signed Flag array contains only '2' values) which is the most frequently used flag for the lossless (which usually occupied 1 bit for the lossless) is absent for the near-lossless and
2) Flag arrays are rare or even can be absent in the compressed unit and their Huffman coding and keeping their Huffman table could increase the size of the compressed unit rather than decrease it.

So, Flag arrays required for the critical color codes (RB Transform is canceled for such color codes) may be stored without Huffman coding, which means RGB Modal Flag requires exactly 3 bits (1 bit for each color samples) and signed flag—4 bits (2 bits for 2 color samples) to be stored.

Here is defined the method of generating true-color near-lossless compressed unit from the compressible unit.

Huffman coding must be applied and appropriate Huffman tables must be defined for each of these members of the compressible unit:
1) lengths of null (Comp={2,2,2}/{2,2,2,2}) items and the lengths of not null (not {2,2,2}/{2,2,2,2}) items of Run-Length Coding Algorithm of Null and Not Null Items (4.2.2.1.) & the Codes and the lengths of Run-Length Coding Algorithm of Similar Items (4.2.2.2.) & Run-Length Coding Algorithm of Similar Items (4.2.2.3.);

2) ColorSign arrays of not null CompLossy sets of Run-Length Coding Algorithm of Null and Not Null Items (4.2.2.1.) (Similarity of ColorSign Values regularity claims that the most ColorSign arrays are {0,0,0}, {1,1,1} and {2,2,2} ({0,0,0,0}, {1,1,1,1} and {2,2,2,2} for the CMYK image). Null ColorSign values or null CompLossy sets ({2,2,2}) are excluded by the run-length coding, which makes it possible to store {0,0,0}, {1,1,1} ColorSign arrays usually by 1-bit and 2-bit Huffman coding;

3) group numbers of CompLossyDelta values (MaxorMainColorDelta, MainColorDelta, DifColorDelta[i], ColorDelta [i]) of not null CompLossy sets (the values aren't zero) (extra bits aren't Huffman coded: they occupy exactly the number of bits defined in the tables).

Each compressed unit conveys detailed information such as the size of the compressed unit, the sequence of applied procoding methods that were used to encode the all (null and not null) items of the compressible unit (null item of the true-color compressible unit is the CompLossy set containing null ColorSign array (the ColorSign array which contains only '2' values)) and Huffman codes of the members enumerated above and their Huffman tables in the header of the compressed unit. It is determined by the run-length coding that the stored CompLossy sets aren't null (that's why in the flowcharts the statements of checking whether the ColorSign is null are taken into brackets).

The methods and systems described herein allow for a flexible range of color sample codes to be used. As such the corresponding range for the CompLossyDelta variables may vary from 0 to $2^m-1$, where 'm' is bit depth of the color sample code and it equals to '5'; '6' or '8' or it is larger than '8' (the methods and systems described herein also permit 15-bit and 16-bit RGB bitmap images).

4.2.4. Compressed Units and Compression Efficiency

As demonstrated in the FIG. 6, compressor module 20 inputs compressible units 18 with its LStorage and DMStorage queues (outputted by Encoder module 16) (if scoring algorithms were applied) and outputs compressed units 8 (it generates a compressed unit per compressible unit). Each compressed unit has a header which stores information detailing the compression technique that was used to compress the compressible unit.

A compressed image partition or video frame includes one or more compressed units. Each compressed unit of an image contains either an image partition in its entirety or an image partition line as described earlier. But in one particular embodiment, the palette table (relative mode) corresponding to an image partition/video stream is not compressed, therefore, if the mode is relative, it is not recommended to have an image partition that corresponds to only small part of an image, regardless whether the compressible unit is associated with entire image partition or the line of an image partition.

Since the underlying compressible unit contains either a line of the image partition or an entire image partition thereof, this flexibility may allow for the compress/decompress functionality of the invention to possess.

Advantages of dividing an image to many compressible units (in particular, advantages of lines of image partitions as compressible units):

1) memory efficiency—capable of efficient operation on small arrays of data;

2) parallel processing capability—for systems having up to 'k' processors where 'k' is the number of compressible units;

3) reduced size of the compressed image—if compressible units aren't too small (in particular, if lines of image partitions are long), Huffman coding is effective enough for overlapping the size of the header of compressed unit and making compressed image partition smaller than if it would be compressed as entire partition as compressible unit; and 4) illusion of real time compression (and transmission) of compressible units and decompression of compressed (and transmitted) units.

Advantages of considering an image partition as compressible unit (in particular, advantages of image as compressible unit):

1) reduced size of compressed image, if image partitions are small (in particular, if lines of image partitions are short, for example, thumbnail or icon image), because number of compressed unit headers (whose size is significant for the smaller partitions) is fewer and 2) reduced speed of compressing/decompressing of an image, because compressible unit compressing algorithm runs fewer times (quantity of running compressing algorithm equals to quantity of compressible/compressed units of an image).

Compressed unit stores Huffman coded members of Comp/CompLossy set of the compressible unit.

For the compression of true-color compressible units are exploited the regulations or natural properties defined above.

As shown with respect to the above mentioned optimization algorithms, the number of Comp/CompLossy sets having not {0,0,0} or not {1,1,1} ColorSign arrays, according to the Similarity of ColorSign Values regularity, is not significant—the majority of Comp sets have {2,2,2}; {0,0,0} or {1,1,1} ColorSigns and they are optimized for being stored in compact.

Due to the Similarity of ColorDelta Values regularity with which Modal/Signed Flags usually include only '1'/'2' values respectively, which allows to have 1-bit storage for the Flags in the compressed unit (the size of Huffman code of the {0,0,0}/{2,2} (null) Flag is just '1' bit because it is the most common Flag array (according to Similarity of ColorDelta Values regularity)). This use of the Flag for the lossless true-color case allows to constrict and decrease the variety of stored delta values, making their Huffman coding more effective:

1) if the Flag is {0,0,0}/{2,2}, to store only one ColorDelta value, which is the MainColorDelta Value;

2) if the Flag is not {0,0,0}/{2,2}, instead of storing all ColorDelta values to store either their differences or if the differences are zero, they're not stored at all. Not storing ColorDelta values (the ColorDelta values equal to MainColorDelta Value) or storing their differences (which are significantly smaller than ColorDelta values) reduces the size of compressed unit.

The one of purposes of Run-Length Coding Algorithm of Similar Items (4.2.2.2.) & Run-Length Coding Algorithm of NULL Items (4.2.2.3.) are to exploit Symmetry of ColorSign Arrays & Islands regularities: according Symmetry of ColorSign Arrays regularity quantity of opposite to each other Signs/ColorSigns is nearly the same in the compressible unit, so, they could be considered as one code in the Huffman Coding & according to ColorSign Islands regularity the bit of oppositeness would be present only for the first interval of long chain of intervals, consisting of opposite to each other Signs/ColorSigns.

4.2.5. Compression Design

Because of compressed image may consist of partitions and compressed unit of an image can include partition as well as partition line, it is possible to design compressed image structure according to purpose of its exploitation. It's possible to compress/decompress (access) not the entire image but only some of its required parts. Flexible structure for compressed images includes definition of partitions or segments of an image based on the application (i.e. a compressed image having small width (thumbnail or icon) or photo image can consist of only one compressed unit, or in the case of document management projects the image may include multiple compressed units of an image for faster access and image mining: in document management projects it is reasonable to design compressed image structure such way that it could include all or some (required) fields of documents as compressed units).

Based upon the requirements of the individual and the aforementioned advantages, the image partition is encoded/compressed using a line of image partition as the compressible unit or using the entire partition as the compressible unit.

The compressible unit before compressing it must be encoded. The algorithm of encoding and scoring of an image partition by indexing/procoding methods is common—it does not depend compressible unit will be considered image partition or its lines. Each compressible/compressed unit can be independently and parallel processed (accessed, encoded/decoded, compressed/decompressed, etc.). The first line of the image partition can be encoded/decoded only by horizontal indexing/procoding method (as described later). Each compressed unit of an image (which may be an image partition line or an image partition), will possess information in its header defining the coding method, Huffman trees, etc. As mentioned, the compression of the image file is very flexible and can accommodate a wide range of bitmap images and modes.

Video frames also can be partitioned for compressing, then storing/transmitting selectively (only required (important) parts of it). But compressible unit of a video can consist of video stream belonging to the frame (compressible unit of an image can consist of either an image partitions or its lines).

4.3. Smooth Near-Lossless Transform

Smooth near-lossless transform is preliminary transform—may be applied to the image/video stream, before handing it to encoder. The RB Transform is a universal transform (for any kind of images) but smooth transform is only for document imaging.

4.3.1. Smooth Transform Algorithm for Grayscale and True-Color Images

Smooth Transform algorithm is "smoothing the relief" of an image. The idea is to close the values of the neighboring codes for having smaller delta values. For photo images this algorithm is not effective but it is useful for document imaging. Smooth Transform algorithm is applied to the line of an image and it does not require pre-scanning or buffering of an image (it just needs 2 neighbor lines below and above for comparing and transforming the line). It may be used in scanners, fax machines and digital senders, which could scan, buffer and process (save or transfer) documents in line-by-line principle.

Here is Smooth Transform algorithm for the grayscale/true-color image partition represented by C++ programming language. Here 'Codes' are absolute grayscale or true color sample codes. As you could see, first and last pixels of the lines aren't transformed. Hereby incorporated by reference is the material contained in the ASCII text file titled 'Method 50', created Feb. 5, 2019, having a size of 24,576 bytes.

From the code above it is obvious that each changing code changes only in one direction (the code is only decreasing or only increasing) and it is never ceases to change (it never stops then continues to change again). You also can see when horizontal condition of the code to be changed expires; it switches to the vertical one (keeping the previous direction to be changed). This algorithm also takes care of keeping the balance of brightness (black & white) by changing the code only when its neighbor code has the potential to be changed in the opposite direction.

4.3.2. Smooth Transform Algorithm for Grayscale and True-Color Video Streams

Smooth Transform algorithm is applied to the video stream and it requires previous and next streams. The idea is to equalize pixel of the frame with the appropriate pixel of the previous frame. Here is Smooth Transform algorithm for the video stream by C++ programming language for the grayscale or true color video streams. Here 'Codes' are absolute grayscale or true color sample codes.

---

Method 51

```
void VideoSmoothTransform( )
{
  extern BYTE SIGN[ ];
  const int max=255;
  for(int w=0;w<Width;w++)
  {
    if(Codes[h][w]==Codes[h-1][w] || (Codes[h][w]==Codes[h+1][w])
      continue;
    if(SIGN[(BYTE)(Codes[h][w]-Codes[h-1][w]==0 && SIGN[(BYTE)(Codes[h][w]-Codes[h+1][w]==0)
    {
      if(Codes[h][w]>Codes[h-1][w])
      {
      if(Codes[h][w]>Codes[h+1][w])
      {
          Codes[h][w]=Codes[h-1][w]>=Codes[h+1][w]?Codes[h-1][w]:Codes[h+1][w];
      }
      }
      else if(Codes[h][w]>Codes[h+1][w])
        Codes[h][w]=Codes[h+1][w];
      else
        Codes[h][w]=0;
    }
    else if(SIGN[(BYTE)(Codes[h][w]-Codes[h-1][w]==1 && SIGN[(BYTE)(Codes[h][w]-
```

| Method 51 |
| --- |
| ```
       Codes[h+1][w]==1)
    {
  if(Codes[h][w]<Codes[h-1][w])
    {
      if(Codes[h][w]<Codes[h+1][w])
      {
      Codes[h][w]=Codes[h-1][w]<=Codes[h+1][w]?Codes[h-1][w]:Codes[h+1][w]
      }
    }
  else if(Codes[h][w]<Codes[h+1][w])
      Codes[h][w]=Codes[h+1][w];
    else
      Codes[h][w]=max;
      }
    }
}
``` |

What is claimed is:

1. A method of encoding an image, the method performed by one or more processors, the method comprising:
receiving a block of color codes representing a partition of the image, each color code representing a pixel of the partition;
designating an anchor color code, the anchor color code being the first color code of the block of color codes or being a predefined color code;
determining a set of separated sign-delta representations, the set of sign-delta representations including one sign-delta representation for each non-anchor color code of the block of color codes, a first sign-delta representation representing the difference between a first encoded color code and the anchor color code and each subsequent sign-delta representation representing a difference between the corresponding color code and at least one neighbouring color code; and
applying a compression encoding to bitmap the set of sign-delta representations for storage or transmission.

2. The method of claim 1, wherein the anchor color code is the first color code of the block of color codes.

3. The method of claim 1, wherein the compression encoding is a Huffman encoding, and is applied independently to a set of sign representations and to a set of delta representations of the set of sign-delta representations.

4. The method of claim 1, wherein the at least one neighbouring color code is a horizontally preceding color code, a vertically preceding color code, a triangular set of preceding color codes, or a square set of preceding color codes, the at least one neighbouring color code of the sign-delta representations of the color codes of a first row of the partition being restricted to the anchor color code or a horizontally preceding color code.

5. The method of claim 1, further comprising, prior to applying a compression encoding, applying a run-length encoding to a sub-set of the set of sign-delta representations, the sub-set having a sign representation commonality.

6. The method of claim 1, wherein each sign-delta representation includes a sign code and a delta code separated from each other.

7. The method of claim 6, wherein the sign code shows a sign of the difference and the delta code shows a magnitude of the difference.

8. The method of claim 7, wherein the magnitude is encoded as a compact set if the sign code is uniformly positive or uniformly negative and the image is a true-color image.

9. The method of claim 8, wherein the compact set includes a base value corresponding to the minimum magnitude of the delta code, a flag array of flag values representing whether the corresponding delta value is equal to the base value or not, and a deviation magnitude for each non-equal flag value, the deviation magnitude being the positive difference between the base value and the corresponding delta value.

10. The method of claim 6, wherein the delta code is not included if the sign code shows no change.

11. The method of claim 1, wherein the block of color codes is a block of greyscale color codes each color code having one value, or a block of true-color color codes each color code having at least three values.

12. The method of claim 1, wherein the image is a video and the at least one neighbouring color code may include at least one neighbouring color code of a preceding image in the video.

13. A system for encoding an input image, comprising:
a memory configured to buffer a set of pixels of the input image; and
at least one processor coupled to the memory and configured to process the input image based on the set of pixels buffered in the memory, the at least one processor implementing:
an encoder module configured to:
receive a block of color codes representing a partition of the image, each color code representing a pixel of the partition;
designate an anchor color code, the anchor color code being the first color code of the block of color codes or being a predefined color code;
determine a set of separated sign-delta representations, the set of sign-delta representations including one sign-delta representation for each non-anchor color code of the block of color codes, a first encoded sign-delta representation representing the difference between a first color code and the anchor color code if the anchor code is the predefined color code or the difference between a second color code and the first color if the first color code is the anchor code, each subsequent sign-delta representation representing a difference between the corresponding color code and at least one neighbouring color code; and a compressor module configured to:
apply a compression encoding to bitmap the set of sign-delta representations for storage or transmission.

14. The system of claim 13, wherein the encoder module is configured to define the anchor color code as the first color code of the block of color codes.

15. The system of claim 13, wherein the compressor module is configured to apply Huffman encoding, and to independently apply Huffman encoding to each of a set of sign representations and a set of delta representations of the set of sign-delta representations.

16. The system of claim 13, wherein the at least one neighbouring color code is a horizontally preceding color code, a vertically preceding color code, a triangular set of preceding color codes, or a square set of preceding color codes.

17. The system of claim 13, wherein the image is a true-color image or a greyscale image.

18. The method of claim 13, the encoder module further configured, prior to applying a compression encoding, applying a run-length encoding to a sub-set of the set of sign-delta representations, the sub-set having a sign representation commonality.

19. The system of claim 13, wherein, for a true-color image, the encoder module is further configured to encode each sign-delta representation as a sign code, and, for each sign code which has only positive or only negative sign values, a base value representing the minimum delta magnitude, a bitmap flag representing whether the corresponding delta value is equal to the base value or not, and, a deviation magnitude for each non-zero bit of the flag which shows a positive change from the base value, the deviation magnitude being the difference between the base value and the corresponding delta value.

20. The system of claim 13, wherein the image is a video and the at least one neighbouring color code may include at least one neighbouring color code of a preceding image in the video.

* * * * *